US006909810B2

United States Patent
Maeda

(10) Patent No.: US 6,909,810 B2
(45) Date of Patent: Jun. 21, 2005

(54) IMAGE PROCESSING APPARATUS AND METHOD, AND ITS COMPUTER PROGRAM AND STORAGE MEDIUM

(75) Inventor: Mitsuru Maeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 756 days.

(21) Appl. No.: 09/873,291

(22) Filed: Jun. 5, 2001

(65) Prior Publication Data

US 2001/0048770 A1 Dec. 6, 2001

(30) Foreign Application Priority Data

Jun. 6, 2000 (JP) ........................................ 2000-169672
Feb. 22, 2001 (JP) ........................................ 2001-047031

(51) Int. Cl.[7] ................................................ G06K 9/36
(52) U.S. Cl. ...................... 382/243; 382/232; 382/236; 382/239; 382/240
(58) Field of Search ................................ 382/240, 166, 382/243, 236, 232, 233, 239; 375/240.02, 240.08, 240.11; 358/539

(56) References Cited

U.S. PATENT DOCUMENTS 5,345,517 A 9/1994 Katayama et al. ............. 382/54
5,448,654 A 9/1995 Katayama et al. .......... 382/298
5,701,106 A * 12/1997 Pikkarainen et al. ........ 332/100
6,041,143 A * 3/2000 Chui et al. .................. 382/232
6,141,446 A * 10/2000 Boliek et al. ............... 382/233

OTHER PUBLICATIONS

Coding of Still Pictures, JPEG2000 requirements and profiles version 6.3; Contact: ISO/IEC JTC 1/SC 29/WG 1, N1803, Hewlett–Packard Company, Cupertino, CA., Jul. 2000. <www.jpeg.org/public/wg1n1803.pdf>.
"Special Report JPEG2000 Explore Next Generation Image Technique", C Magazine, November, 1999, pp. 6–10.
"Outline of MPEG–4 International Standards Determined", Nikkei Electronics, Sep. 22, 1997 issue, pp. 147–168.

* cited by examiner

*Primary Examiner*—Anh Hong Do
(74) *Attorney, Agent, or Firm*—Fitzpatrick, Cella, Harper & Scinto

(57) ABSTRACT

MPEG-4 encoded data is input, and a shape code decoder decodes shape data contained in the encoded image data to obtain ROI information contained in that image. The frequency transforms of the decoded image data are computed to generate transform coefficients. A bit shift unit bit-shifts transform coefficients, corresponding to the ROI, of the generated transform coefficients, to upper bit planes, stuffs "0"s in blank fields outside the ROI, which are generated by the bit shift process, and stuffs audio data from an audio buffer in blank fields within the ROI, which are generated by the bit shift process.

60 Claims, 37 Drawing Sheets

IMAGE PROCESSING APPARATUS AND METHOD, AND ITS COMPUTER PROGRAM AND STORAGE MEDIUM

FIELD OF THE INVENTION

The present invention relates to an image processing apparatus and method for encoding/decoding data, and its computer program and storage medium.

BACKGROUND OF THE INVENTION

As a still image encoding scheme, JPEG is currently prevalent. JPEG was standardized by ISO (International Organization for Standardization). As a moving image encoding scheme, Motion JPEG that exploits JPEG as intra-frame coding is known. Furthermore, as the Internet proliferates, coding that can assure higher functions and higher image quality than JPEG used so far is demanded. For this reason, ISO is laying down new still image coding standards. This activity is generally called "JPEG2000". Refer to Toda, "Special Report JPEG2000 Explore Next Generation Image Technique", *C MAGAZINE* November 1999, pp. 6–10, for an outline of JPEG2000. An ROI (Region of Interest) in this report is a new function, and is a helpful technique.

An image encoding apparatus that can implement the ROI will be explained below with reference to FIG. 13.

Referring to FIG. 13, reference numeral 1001 denotes an image input unit; numeral 1002 denotes a discrete wavelet transformer; numeral 1003 denotes a quantizer; numeral 1004 denotes an entropy encoder; numeral 1005 denotes a code output unit; and numeral 1011 denotes a region designation unit.

The image input unit 1001 outputs image data that form an image to be encoded in the raster scan order. The image signal output from the image input unit 1001 is input to the discrete wavelet transformer 1002. The discrete wavelet transformer 1002 executes a two-dimensional wavelet transformation process for the input image signal, and computes and outputs transform coefficients.

FIG. 14 shows an example of the configuration of transform coefficient groups of two levels obtained by the two-dimensional discrete wavelet transformation process. An image signal is decomposed into coefficient sequences HH1, HL1, LH1, . . . , LL in different frequency bands. Note that these coefficient sequences will be referred to as subbands hereinafter. The coefficients of the individual subbands are output to the quantizer 1003.

The region designation unit 1011 determines a region (ROI) to be decoded to have higher image quality than the surrounding portions in an image to be encoded, and generates mask information indicating coefficients that belong to the ROI upon computing the discrete wavelet transforms of the image to be encoded.

FIG. 15A shows an example of a mark information generation process.

When a star-shaped region is designated in an image by a predetermined instruction input, as shown in the left image of FIG. 15A, the region designation unit 1011 computes those portions of respective subbands that include the designated region upon computing the discrete wavelet transforms of the image including this designated region. The region indicated by this mask information corresponds to a range including transform coefficients of the surrounding region required for reconstructing an image signal on the boundary of the designated region.

The right image of FIG. 15A shows an example of mask information computed in this way. In this example, mask information upon discrete wavelet transformation of the left image in FIG. 15A is computed, as shown therein. In FIG. 15A, a star-shaped portion corresponds to the designated region, bits of the mask information corresponding to this designated region are set at "1", and other bits of the mask information are set at "0". Since the entire mask information has the same format as transform coefficients of two-dimensional discrete wavelet transformation, whether or not a transform coefficient at a given position belongs to the designated region can be identified by checking the corresponding bit in the mask information. The mask information generated in this manner is output to the quantizer 1003.

The quantizer 1003 quantizes the input coefficients by a predetermined quantization step, and outputs indices corresponding to the quantized values. The quantizer 1003 changes quantization indices based on the mask information input from the region designation unit 1011 by:

$$q'=q\times 2^8; \text{ inside region} \quad (1)$$

$$q'=q; \text{ outside region} \quad (2)$$

With the aforementioned process, only quantization indices that belong to the designated region designated by the region designation unit 1011 are shifted up (to the MSB side) by 8 bits.

FIGS. 15B and 15C show a change in quantization indices by this shift-up process. Referring to FIG. 15B, quantization indices are included in subbands, and change after the shift-up process, as shown in FIG. 15C. The quantization indices changed in this way are output to the entropy encoder 1004.

The entropy encoder 1004 decomposes the input quantization indices into bit planes, executes binary arithmetic coding in units of bit planes, and outputs code streams.

FIG. 16 is a view for explaining the operation of the entropy encoder 1004. In this example, a 4×4 subband region includes three nonzero indices, which respectively have values "+13", "−6", and "+3". The entropy encoder 1004 scans this region to obtain a maximum value M, and computes the required number S of bits.

In FIG. 16, since the maximum coefficient value M is "13", the number S of bits required for expressing this value is "4". Sixteen quantization indices in the sequence are processed in units of four bit planes, as indicated by the right side in FIG. 16.

The entropy encoder 1004 makes binary arithmetic coding of bits of the most significant bit plane (indicated by MSB in FIG. 16) first, and outputs the coding result as a bitstream. Then, the encoder 1004 lowers the bit plane by one level, and encodes and outputs bits of each bit plane to the code output unit 1005 until the bit plane of interest reaches the least significant bit plane (indicated by LSB in FIG. 16). At this time, a code of each quantization index is entropy-encoded immediately after the first nonzero bit is detected upon scanning the bit plane.

Parallel to laying down of the still image international standards, MPEG-4 is being examined as a moving image coding scheme, and its international standardization is in progress. Conventional moving image coding represented by MPEG-2 encodes data in units of frames or fields, but MPEG-4 encodes using video and audio data as objects to implement re-use and editing of contents. Furthermore, an object contained in video data is also independently encoded, and can be processed as an object. Details of MPEG-4 are described in, e.g., "Outline of MPEG-4 International Standards Determined", *Nikkei Electronics*, 1997.9.22 issue, p. 147–168, international standard ISO14496-2, and the like.

The standardization of MPEG-4 has advanced, and an encoding technique of an image having an arbitrary shape or the like has been added. Also, a copyright protection mechanism of object data is undergoing standardization to allow re-use of contents. Furthermore, standardization of a data description for data search (MPEG-7) is also underway. This standardization pertains to a description for appending meta information to facilitate a search.

When meta information, copyright information, or the like is to be appended in JPEG2000, such information must be separately appended in addition to JPEG2000 encoded data, resulting in complicated management and the like.

Upon encoding in units of frames using JPEG2000, audio data must be separately appended, resulting in a complicated sync process and data management.

SUMMARY OF THE INVENTION

The present invention has been made in consideration of the aforementioned prior arts, and has as its object to provide an image processing apparatus and method which can append required information while maintaining compatibility to conventional JPEG2000, and its computer program and storage medium.

It is another object of the present invention to provide an image processing apparatus and method which can convert object-encoded image data into object-encoded data while maintaining independence of objects, and its computer program and storage medium.

It is still another object of the present invention to provide an image processing apparatus and method which can easily and reliably generate encoded data having an object structure in intra-frame coding, and its computer program and storage medium.

In order to attain the above described object, an image processing apparatus of the present invention comprising the structure as follows.

An image processing apparatus comprises: image input means for inputting image data; information input means for inputting information data; region of interest setting means for setting a region of interest on the basis of the image data; transformation means for generating transform coefficients by computing frequency transforms of the image data; and control means for bit-shifting transform coefficients, which correspond to the region of interest, of the transform coefficients generated by said transformation means to upper bit planes, stuffing zeros in blank fields outside the region of interest, which are generated by the bit shift process, and stuffing the information data in blank fields within the region of interest, which are generated by the bit shift process.

According to an image processing method of the present invention comprising the steps as follows.

An image processing method comprises: an image input step of inputting image data; an information input step of inputting information data; a region of interest setting step of setting a region of interest on the basis of the image data; a transformation step of generating transform coefficients by computing frequency transforms of the image data; and a control step of bit-shifting transform coefficients, which correspond to the region of interest, of the transform coefficients to upper bit planes, stuffing zeros in blank fields outside the region of interest, which are generated by the bit shift process, and stuffing the information data in blank fields within the region of interest, which are generated by the bit shift process.

According to one aspect of the present invention, a quantization step for quantizing transform coefficients may be further comprised. In this way, the information volume can be effectively reduced.

According to one aspect of the present invention, the frequency transformation step executes discrete wavelet transformation. In this way, shape information can be reflected in the frequency domain.

According to one aspect of the present invention, information data to be appended is audio data.

According to one aspect of the present invention, information data to be appended is meta data that pertains to an image description.

According to one aspect of the present invention, information data to be appended is an Intellectual Property right information.

According to one aspect of the present invention, the method comprises the encoding step of decomposing the output of the stuffing step into bit planes, and encoding the bit planes. In this way, the information volume can be reduced.

In order to attain the above described object, an image processing apparatus of the present invention comprising the structure as follows.

An image processing apparatus comprises: shape information extraction means for extracting shape information of an object from image data; object texture information extraction means for extracting texture information of the object from the image data;

background texture information extraction means for extracting texture information of a background from the image data; first frequency transformation means for computing frequency transforms of the texture information of the object and the texture information of the background on the basis of the shape information extracted by said shape information extraction means; second frequency transformation means for computing frequency transforms of the texture information of the background; stuffing means for stuffing zeros in a region outside a region of the object on the basis of an output from said first frequency transformation means, and the shape information; and bit plane encoding means for decomposing an output from said stuffing means into bit planes and encoding the bit planes, and decomposing an output from said second frequency transformation means into bit planes and encoding the bit planes.

According to one aspect of the present invention, the first and second frequency transformation means execute discrete wavelet transformation. In this way, shape information can be reflected in the frequency domain.

According to one aspect of the present invention, the apparatus comprises shape information change means for changing shape information to expand on the basis of that shape information and a frequency transformation scheme. In this way, a natural image can be reproduced around the edge of an object without any special process.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

DESCRIPTION OF THE PREFERRED EMBODIMENTS

Preferred embodiments of the present invention will be described in detail hereinafter with reference to the accompanying drawings.

[First Embodiment]

Figure 1:
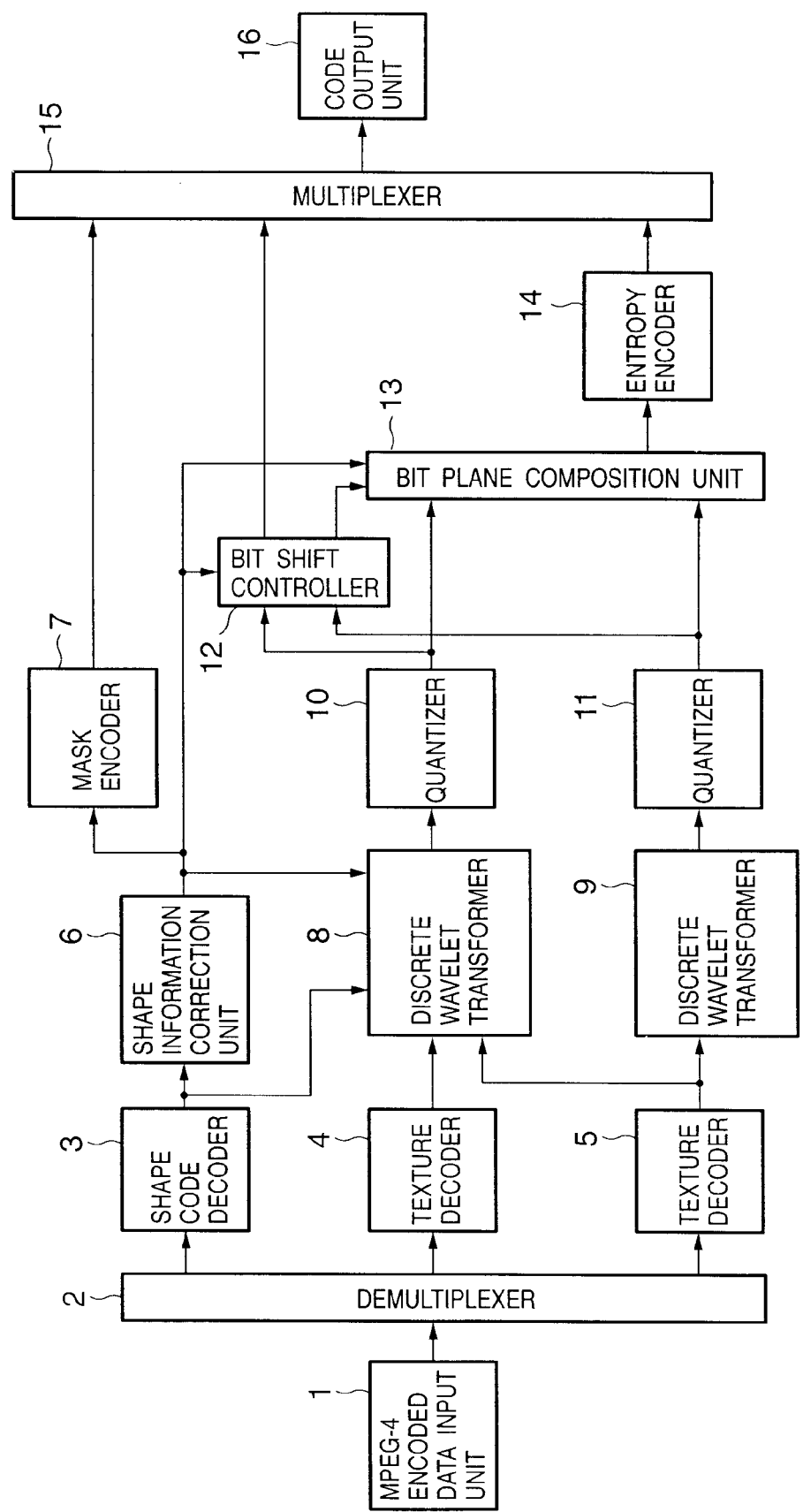
FIG. 1 is a block diagram showing the arrangement of an image processing apparatus according to the first embodiment of the present invention.

FIG. 1 is a block diagram showing the arrangement of an image processing apparatus according to the first embodiment of the present invention. Note that this embodiment will explain a case wherein MPEG-4 encoded data is input and encoded, and encoded data similar to JPEG2000 encoded data is output.

Referring to FIG. 1, reference numeral 1 denotes an MPEG-4 encoded data input unit for inputting MPEG-4 encoded data. Reference numeral 2 denotes a demultiplexer for demultiplexing input MPEG-4 encoded data, and inputting demultiplexed data to respective units. Reference numeral 3 denotes a shape code decoder for receiving and decoding shape encoded data of an object, which is encoded by MPEG-4 and is demultiplexed by the demultiplexer 2. Reference numeral 4 denotes a texture decoder for decoding the texture of an object demultiplexed by the demultiplexer 2. Reference numeral 5 denotes a texture decoder for decoding the texture of encoded data of a background image demultiplexed by the demultiplexer 2. Reference numeral 6 denotes a shape information correction unit for correcting shape information decoded by the shape code decoder 3. Reference numeral 7 denotes a mask encoder for encoding mask information indicating the shape and position of an ROI. Reference numerals 8 and 9 denote discrete wavelet transformers for respectively computing the discrete wavelet transforms of input image data. Reference numerals 10 and 11 denote quantizers for receiving and quantizing transform coefficients computed by the discrete wavelet transformers 8 and 9. Reference numeral 12 denotes a bit shift controller for controlling by determining the number of bits which form a bit plane and a bit plane composition method on the basis of the quantization results of the quantizers 10 and 11. Reference numeral 13 denotes a bit plane composition unit for compositing bit planes in accordance with an instruction from the bit shift controller 12. Reference numeral 14 denotes an entropy encoder for encoding in units of bit planes. Reference numeral 15 denotes a multiplexer for shaping outputs from the mask encoder 7, bit shift controller 12, and entropy encoder 14 into encoded data according to the format of JPEG2000. Reference numeral 16 denotes a code output unit for outputting generated encoded data.

The operation of the aforementioned arrangement will be explained below.

The MPEG-4 encoded data input unit 1 inputs MPEG-4 encoded data consisting of one object and background image in a core profile. The input encoded data is input to the demultiplexer 2, and is demultiplexed into encoded data that pertains to a shape code of the object, encoded data that pertains to texture, and encoded data that pertains to background texture. The encoded data that pertains to the shape code of the object is input to the shape code decoder 3, the encoded data that pertains to texture of the object to the texture decoder 4, and the encoded data that pertains to background texture to the texture decoder 5.

Figure 17A:
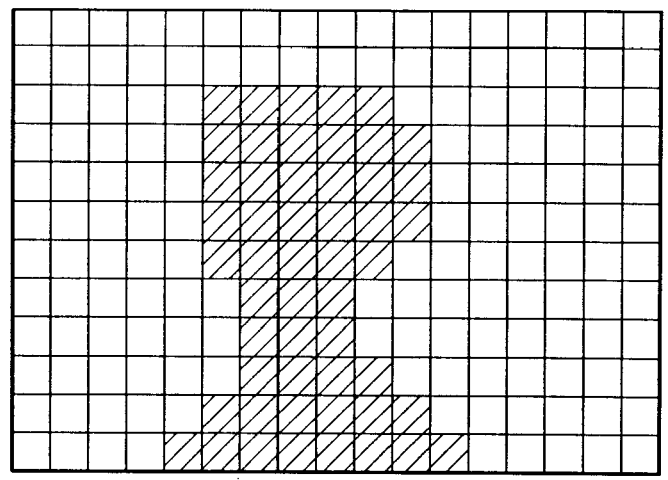
FIGS. 17A to 17C are views for explaining an outline of an image to be encoded.
Figure 17B:
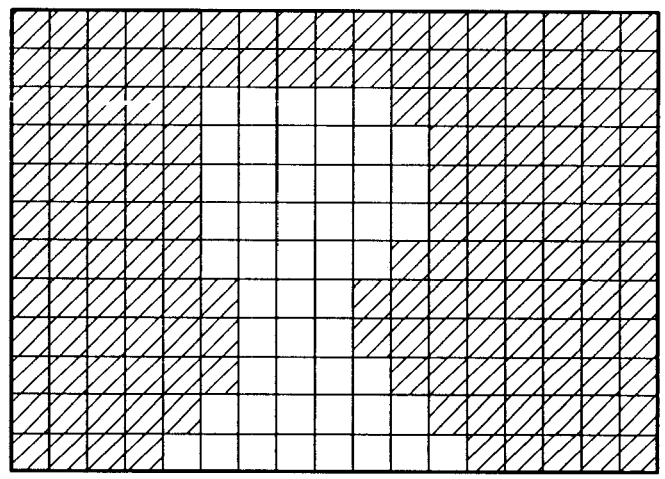
Figure 17C:
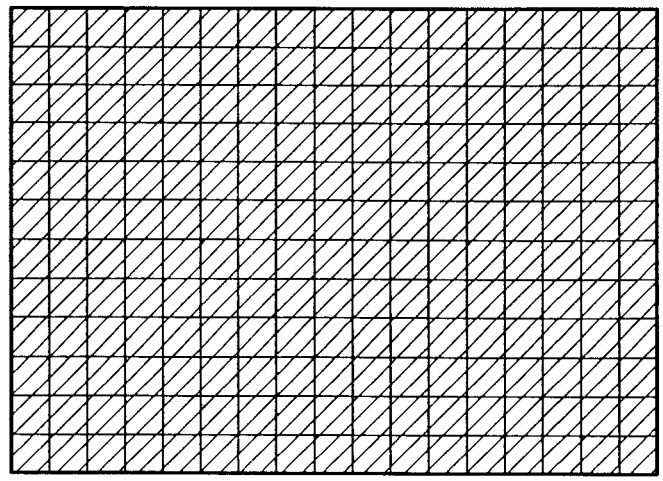

The shape code decoder 3 decodes binary information that represents the object shape. In this embodiment, shape data shown in, e.g., FIG. 17B will be exemplified as such shape information.

This shape information is decoded and input to the shape information correction unit 6. The shape information correction unit 6 enlarges a region to the outside this shape in consideration of the number of taps of discrete wavelet transformation. That is, the unit 6 corrects the shape information to that which includes the affected range of pixel values in the object by discrete wavelet transformation. Such information can be uniquely determined by the number of taps and the number of subbands of wavelet transformation. Since the corrected shape information serves as mask information of an ROI, it is input to the mask encoder 7, and is encoded according to the format of JPEG2000.

The texture decoder 4 decodes the texture of the object. The texture decoder 5 decodes the texture of the background. The discrete wavelet transformer 8 receives and transforms the outputs from the texture decoders 4 or 5 in accordance with the shape information, i.e., receives the output from the texture decoder 4 for pixels which are determined based on the shape information decoded by the shape code decoder 3 that they fall within the object, and receives the output from the texture decoder 5 for the region corrected and expanded by the shape information correction unit 6, and computes their discrete wavelet transforms. The discrete wavelet transformer 9 receives the background texture as the output from the texture decoder 5, and computes the discrete wavelet transforms.

The quantizer 10 receives the output from the discrete wavelet transformer 8 and quantizes the output by predetermined quantization coefficients. Likewise, the quantizer 11 quantizes the output from the discrete wavelet transformer 9 by predetermined quantization coefficients. The quantization results of these quantizers 10 and 11 are input to the bit shift controller 12 and bit plane composition unit 13.

The bit shift controller 12 computes the number Bb of bits required for expressing quantization values of transform coefficients at positions of the background texture occluded by the object, and the number Bo of bits required for expressing quantization values of the texture of the object, and determines the number of bit planes and composition method for bit plane composition. The controller 12 generates a signal for controlling the bit plane composition unit 13 in accordance with the determination results. For example, when the maximum value of the quantization result of the background texture is equal to or smaller than "63" based on the output from the quantizer 10, and the maximum value of the quantization result of the background texture at the object position is equal to or smaller than "31", the number Bb of bits is "5". Also, when the maximum value of the quantization result of the texture of the object is equal to or smaller than "63" based on the output from the quantizer 11, the number Bo of bits is "6". Therefore, the number Bt of bit planes used in bit plane encoding is the sum of the numbers Bb and Bo of bits, i.e., 11 bits.

In this way, the bit shift controller 12 controls to output the quantization result of the background texture in the lower 6 bits for a region that does not overlap the object, and stuffs "0"s in the upper 5 bits on the basis of the shape information. As for an overlapping region, the controller 12 controls the bit plane composition unit 13 to output the quantization result of the object in the upper 6 bits, and to composite the quantization result of the background texture in the lower 5 bits. Also, the controller 12 encodes the number Bt of bit planes, and the number Bo of bits of the object, and inputs them as a BITS code to the multiplexer 15.

Figure 2:
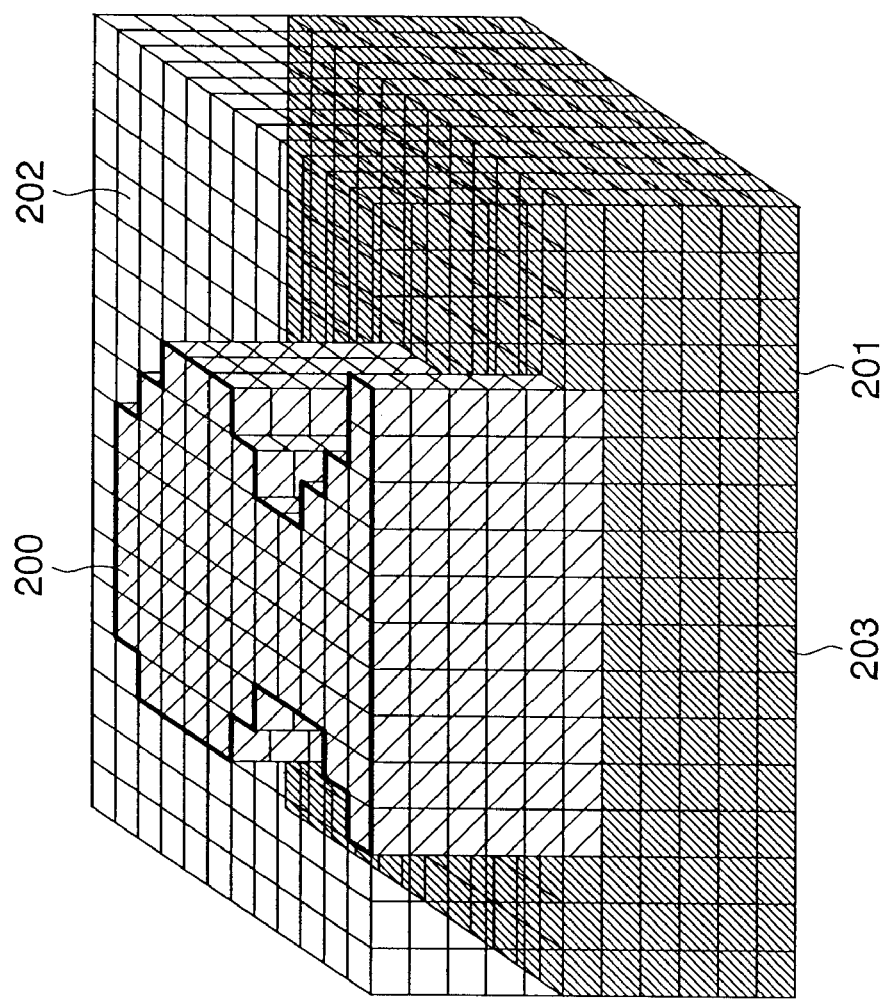
FIG. 2 is a view for explaining a bit plane composition process in an embodiment of the present invention.

The bit plane composition unit 13 composites bit planes under the control of the bit shift controller 12. FIG. 2 shows this process.

Referring to FIG. 2, the least significant bits of the object are composited in the lower 6th bits for a portion 200 where the object is present. The composition result is input to the entropy encoder 14. In FIG. 2, bits representing the background texture corresponding to a region outside the region of the object 200 are present in a region 201. Reference numeral 202 denotes blank fields where "0" bits are stuffed; and numeral 203 denotes an empty region after the object has undergone the bit shift process.

A process until the bit data shown in FIG. 2 is generated will be briefly explained below. In order to encode both the object and its background (including background regions inside and outside the object), the object and background texture corresponding to the region outside the object region undergo frequency transformation to generate first transform coefficients (the outputs from the discrete wavelet transformer 8 and quantizer 10), and the background texture corresponding to a region inside the object image region undergoes frequency transformation to generate second transform coefficients (the outputs from the discrete wavelet transformer 9 and quantizer 11). Of the first transform coefficients, bits corresponding to the object region are bit-shifted to an upper bit plane, bits "0" are stuffed in blank fields (202 in FIG. 2) formed after the bit shift process, and the second transform coefficients corresponding to the region inside the object region are stuffed in blank fields (203 in FIG. 2) within the object region formed by the bit shift process.

The entropy encoder 14 encodes bit planes in turn from the MSB side, and supplies the encoded results to the multiplexer 15. The multiplexer 15 shapes the input data to encoded data according to the JPEG2000 format.

Figure 23:
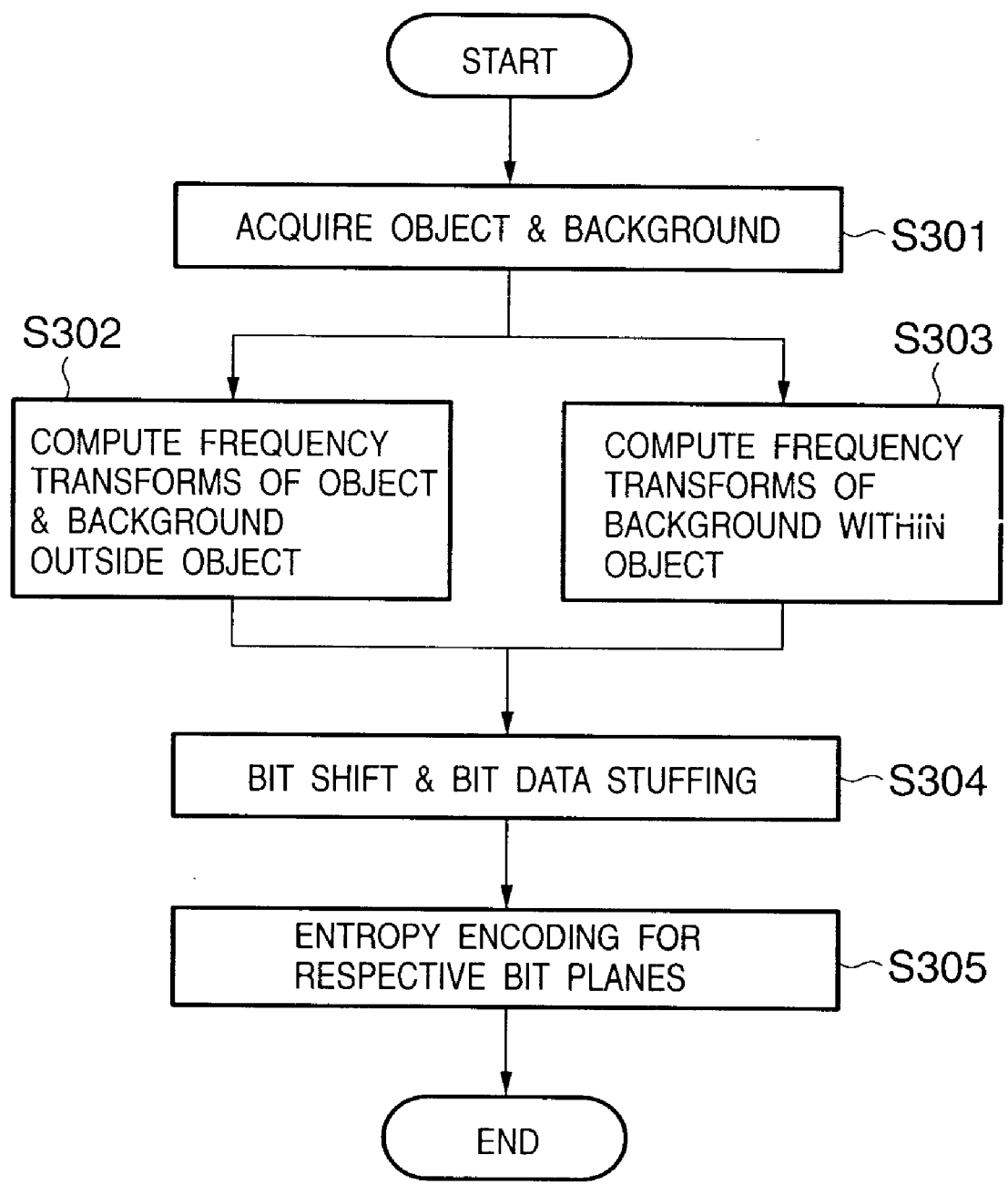
FIG. 23 is a flow chart briefly showing the flow of process until encoding.

The flow of the processes until encoding will be briefly explained below using FIG. 23. In step S301, MPEG-4 encoded data is decoded to obtain the object and its background (including background regions inside and outside the object). In step S302, the object and the background corresponding to a region outside the object region undergo frequency transformation to generate first transform coefficients. In step S303, the background texture corresponding to the region inside the object image undergoes frequency transformation to generate second transform coefficients. Note that the processing order of steps S302 and S303 is not particularly limited as long as both of them can be done (two transformation processes may be sequentially done by a single transformer/two transformation processes may be parallelly done by two transformers). In step S304, bits corresponding to the object region of the first transform coefficients are bit-shifted to an upper bit plane, bits "0" are stuffed in blank fields (202 in FIG. 2) formed after the bit shift process, and the second transform coefficients corresponding to the region inside the object region are stuffed in blank fields (203 in FIG. 2) within the object region formed by the bit shift process. Finally, in step S305, the obtained bit data shown in FIG. 2 is entropy-encoded in turn from upper bit planes.

Figure 3:
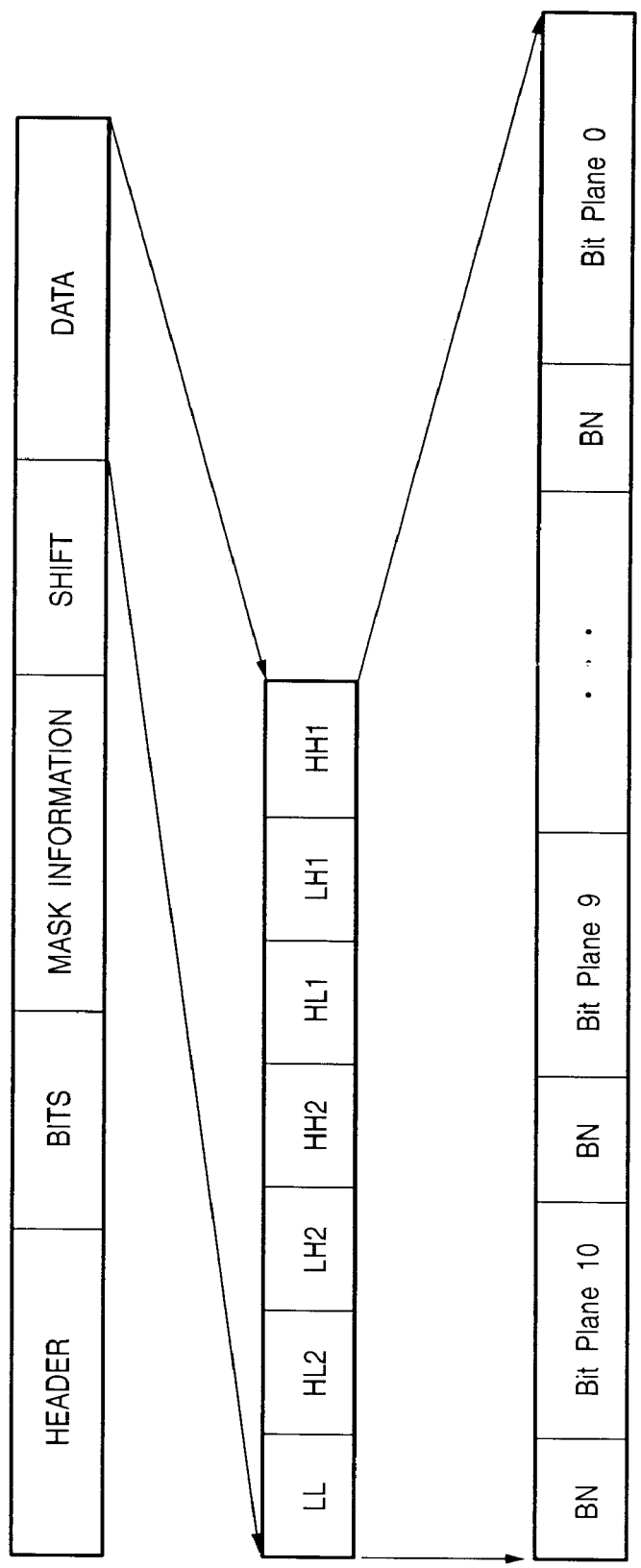
FIG. 3 is a view for explaining encoded data in an embodiment of the present invention.

FIG. 3 shows an output example of encoded data obtained by the aforementioned encoding process.

In FIG. 3, a header including a code which indicates information of the size of the encoded image or the like is followed by a BITS code as the encoding result of the number Bt of bit planes and the number Bo of bits of the object. Then, the encoding result of mask information output from the mask encoder 7 follows. Furthermore, a SHIFT code indicating the presence of the background texture in the lower bits of the object follows. Finally, the entropy encoding result (data) appears. The entropy encoding result is separated into subbands (LL to HH1), each of which consists of encoded data for 11 bit planes. The multiplexed encoded data is externally output via the code output unit 16.

With a series of operations, encoded data, which preserves background image data lost by stuffing "0"s in the conventional process, can be generated. Since bit plane composition is done by detecting the number of bits required for a portion that overlaps the object, the coding efficiency can be improved by reducing the number of bit planes.

In this embodiment, MPEG-4 encoded data is input, and JPEG2000 encoded data is output. However, the present invention is not limited to such specific data.

In this embodiment, quantizers are provided to improve coding efficiency. However, the quantizers may be omitted to obtain reversible codes free from any deterioration.

[Second Embodiment]

Figure 4:
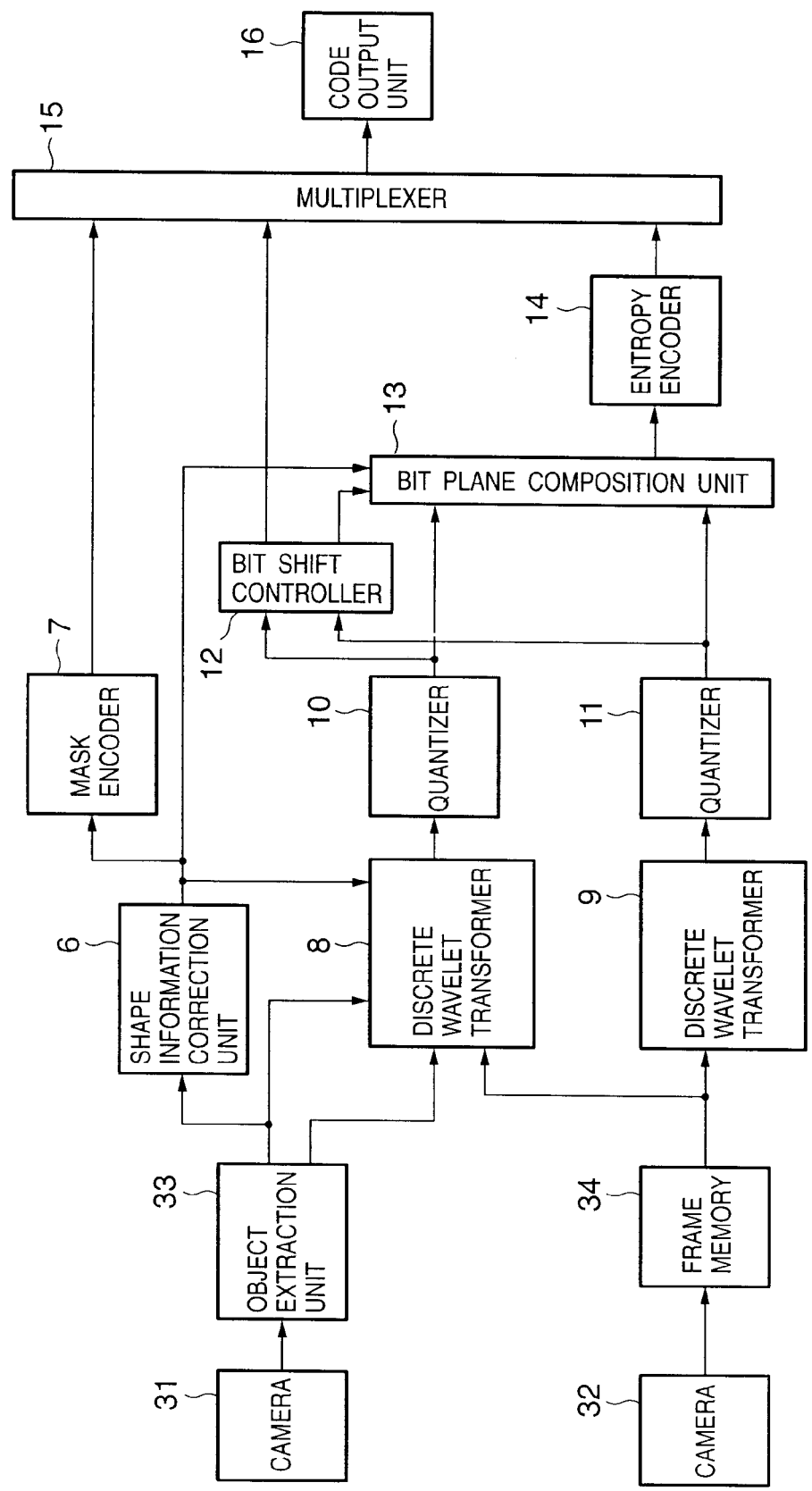
FIG. 4 is a block diagram showing the arrangement of an image processing apparatus according to the second embodiment of the present invention.

FIG. 4 is a block diagram showing the arrangement of an image processing apparatus according to the second embodiment of the present invention. Note that the same reference numerals denote the same building components as those in the first embodiment, and a detailed description thereof will be omitted. The second embodiment will exemplify a case wherein image data sensed by cameras 31 and 32 are input, and are encoded and output.

Referring to FIG. 4, reference numerals 31 and 32 denote cameras for sensing an image and generating video signals. Reference numeral 33 denotes an object extraction unit for extracting an object from the captured video signal in accordance with a known algorithm. For example, extraction is attained by, e.g., chroma-key. Reference numeral 34 denotes a frame memory for holding image data captured by the camera 32.

Image data captured by the camera 31 is input to the object extraction unit 33 in units of frames. The object extraction unit 33 cuts out an object, extracts its shape as binary mask information, and outputs the cut-out image data as texture data of the object.

On the other hand, the camera 32 captures background image data, and stores the image data in the frame memory 34 so as to execute a process in synchronism with the object extraction unit 33.

In the second embodiment, subsequent processes are the same as those in the first embodiment. That is, the shape information correction unit 6 receives the mask information from the object extraction unit 33, and corrects the mask information by expanding its edge. The correction result is encoded by the mask encoder 7, and is input to the multiplexer 15. The discrete wavelet transformer 8 stuffs "0"s in a region outside the object, and reads out the corresponding image data from the frame memory 34 for the expanded portion, in accordance with the shape information corrected by the shape information correction unit 6. Furthermore, the discrete wavelet transformer 8 selects the output from the object extraction unit 33 for a region inside the object, and computes the discrete wavelet transforms.

At the same time, the discrete wavelet transformer 9 computes the discrete wavelet transforms of the background image. The quantizers 10 and 11 receive and quantize the wavelet transform coefficients output from these discrete wavelet transformers 8 and 9. The bit shift controller 12 determines the bit distribution between the object and background upon composition on the basis of the mask information from the shape information correction unit 6 and the quantization results of the quantizers 10 and 11, and controls the bit plane composition unit 13. At the same time, the controller 12 encodes required information. The bit plane composition unit 13 generates 11-bit bit planes as in the first embodiment. The entropy encoder 14 encodes these bit planes and outputs the encoded data to the multiplexer 15. The multiplexer 15 shapes the encoded data in accordance with the JPEG2000 format, and externally outputs encoded data via the code output unit 16.

As described above, according to the second embodiment, encoded data which can independently process an object can be generated on the basis of the captured image data.

In the second embodiment, quantizers are provided to improve coding efficiency. However, the quantizers may be omitted to obtain reversible codes free from any deterioration.

[Third Embodiment]

Figure 5:
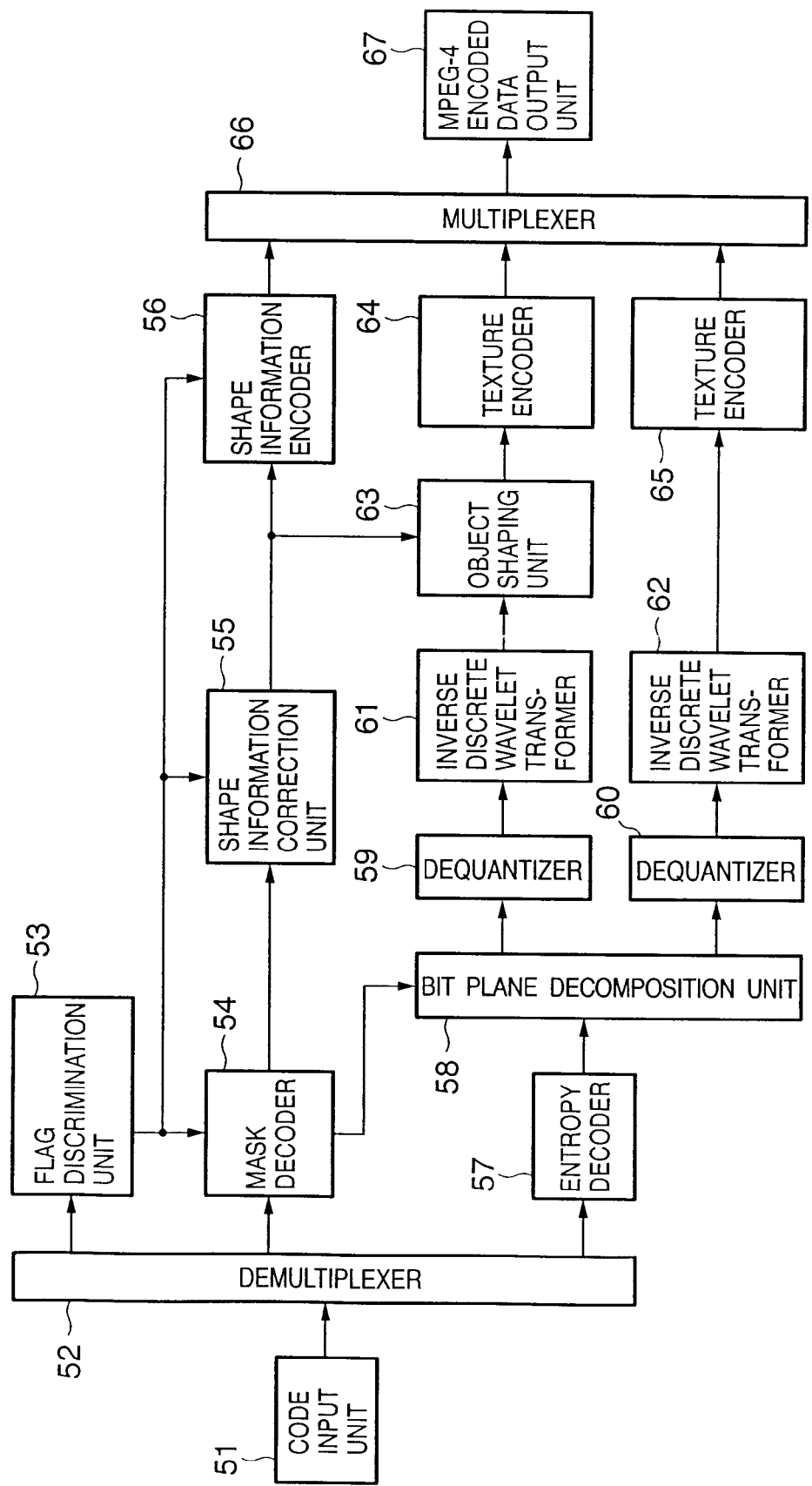
FIG. 5 is a block diagram showing the arrangement of an image processing apparatus according to the third embodiment of the present invention.

FIG. 5 is a block diagram showing the arrangement of an image processing apparatus according to the third embodiment of the present invention. The third embodiment will explain a case wherein JPEG2000 encoded data generated in the first embodiment is input, and MPEG-4 encoded data is output.

Referring to FIG. 5, reference numeral 51 denotes a code input unit for receiving JPEG2000 encoded data generated according to the first embodiment. Reference numeral 52 denotes a demultiplexer for demultiplexing the input encoded data, and inputting demultiplexed data to respective units. Reference numeral 53 denotes a flag discrimination unit for decoding and discriminating a SHIFT code of encoded data. Reference numeral 54 denotes a mask decoder for decoding mask information that represents the shape and position of an ROI, and a BITS code which indicates the number of bits of the whole image and the number of bits of the ROI portion. Reference numeral 55 denotes a shape information correction unit for correcting shape information. Reference numeral 56 denotes a shape information encoder for encoding shape information by MPEG-4. Reference numeral 57 denotes an entropy decoder for decoding in units of bit planes. Reference numeral 58 denotes a bit plane decomposition unit for decomposing encoded data into bit plane data of an object portion and those of a background portion, and outputting them to dequantizers 59 and 60, respectively. The dequantizers 59 and 60 execute dequantization of the aforementioned quantizers 10 and 11. Reference numerals 61 and 62 denote inverse discrete wavelet transformers which execute inverse discrete wavelet transformation of the aforementioned discrete wavelet transformers 8 and 9. Reference numeral 63 denotes an object shaping unit for shaping image data of an object in accordance with shape information corrected by the shape information correction unit 55. Reference numerals 64 and 65 denote texture encoders for respectively texture-encoding the object and background portions by MPEG-4. Reference numeral 66 denotes a multiplexer for forming encoded data based on the outputs from the shape information encoder 56 and texture encoders 64 and 65 in accordance with the MPEG-4 format. Reference numeral 67 denotes an MPEG-4 encoded data output unit for outputting the generated MPEG-4 encoded data.

In such arrangement, the code input unit 51 receives encoded data generated by the first embodiment mentioned above. The input encoded data is input to the demultiplexer 52 to decode a header, thus acquiring required information and inputting such information to respective units. Furthermore, encoded data of a BITS code and mask information are input to the mask decoder 54, a SHIFT code to the flag discrimination unit 53, and the remaining data to the entropy decoder 57.

The flag discrimination unit 53 decodes the SHIFT code to discriminate if information of the background image is present in lower bits of the ROI portion. If it is determined that no background image information is present, a normal ROI process in JPEG2000 coding is done. On the other hand, if it is determined that the background image is present, that background image data is reconstructed.

A case will be explained first wherein the background image is present.

The mask decoder 54 decodes the mask information indicating the ROI shape and position, and the BITS code which indicate the number of bits of the whole image and the number of bits of the ROI portion. Note that the ROI portion represents an object. Since the region of the mask information has been expanded to outside the object shape by the shape information correction unit 6 in the first embodiment described above in consideration of the number of taps of discrete wavelet transformation, the shape information correction unit 55 executes an inverse process. More specifically, the shape information correction unit 55 corrects shape information to that which does not include the range influenced by pixel values within the object by discrete wavelet transformation. The corrected shape information is input to the shape information encoder 56, and is encoded according to MPEG-4 shape information coding.

On the other hand, the entropy decoder 57 decodes bit planes in turn from the MSB side, and inputs the decoding results to the bit plane decomposition unit 58. The bit plane decomposition unit 58 receives data of the bit planes shown in FIG. 2. In FIG. 2, texture data of the object 200 is decomposed in accordance with the shape information decoded by the mask decoder 54, and the number Bo of bits of the object, and is input to the dequantizer 59. Also, "0"s are stuffed in a portion of texture data of the background image 201 in FIG. 2, where the least significant bits of the object are composed, and that texture data is input to the dequantizer 60.

The dequantizers 59 and 60 respectively execute dequantization of the quantizers 10 and 11, and their dequantization results are respectively input to the inverse discrete wavelet transformers 61 and 62. The inverse discrete wavelet transformers 61 and 62 compute the inverse discrete wavelet transforms of the in puts, thus reconstructing texture data.

The output from the inverse discrete wavelet transformer 61 is input to the object shaping unit 63, which receives original shape information of the object as the output from the shape information correction unit 55, and replaces the background portion, which is determined to be a region outside the object on the basis of that shape information, by "0"s. The texture encoder 64 encodes texture data of the object shaped by the object shaping unit 63 by MPEG-4 texture coding. The texture encoder 65 also encodes texture data of the background by MPEG-4 texture coding.

The multiplexer 66 shapes input data to encoded data according to the MPEG-4 core profile format. The shaped encoded data is externally output via the MPEG-4 encoded data output unit 67 as MPEG-4 encoded data containing one object and background image in a core profile.

A case will be explained below wherein the flag discrimination unit 53 determines that no background image is present.

In this case, the flag discrimination unit 53 controls not to operate the shape information correction unit 55, shape information encoder 56, dequantizer 59, inverse discrete wavelet transformer 61, object shaping unit 63, and texture encoder 64. Also, the bit plane decomposition unit 58 is controlled to execute a normal ROI process of JPEG2000.

The mask decoder 54 decodes the mask information indicating the ROI shape and position, and the BITS code which indicate the number of bits of the whole image and the number of bits of the ROI portion. The entropy decoder 57 decodes bit planes in turn from the MSB side, and supplies the decoding results to the bit plane decomposition unit 58. The bit plane decomposition unit 58 receives data of the bit planes like those shown in FIG. 19.

Figure 18:
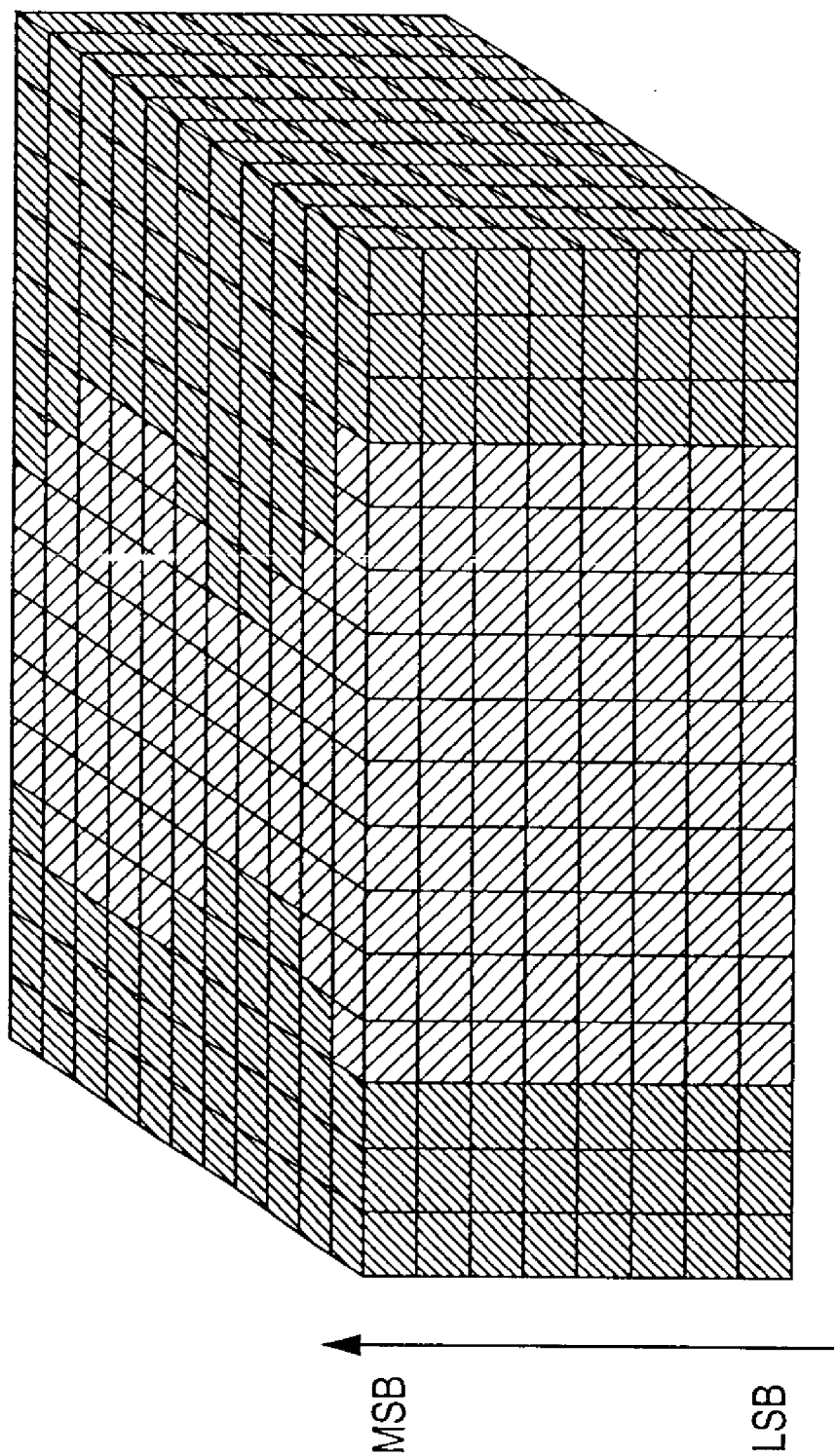
FIG. 18 is a view for explaining an outline of decoding of the ROI process of JPEG2000.
Figure 19:
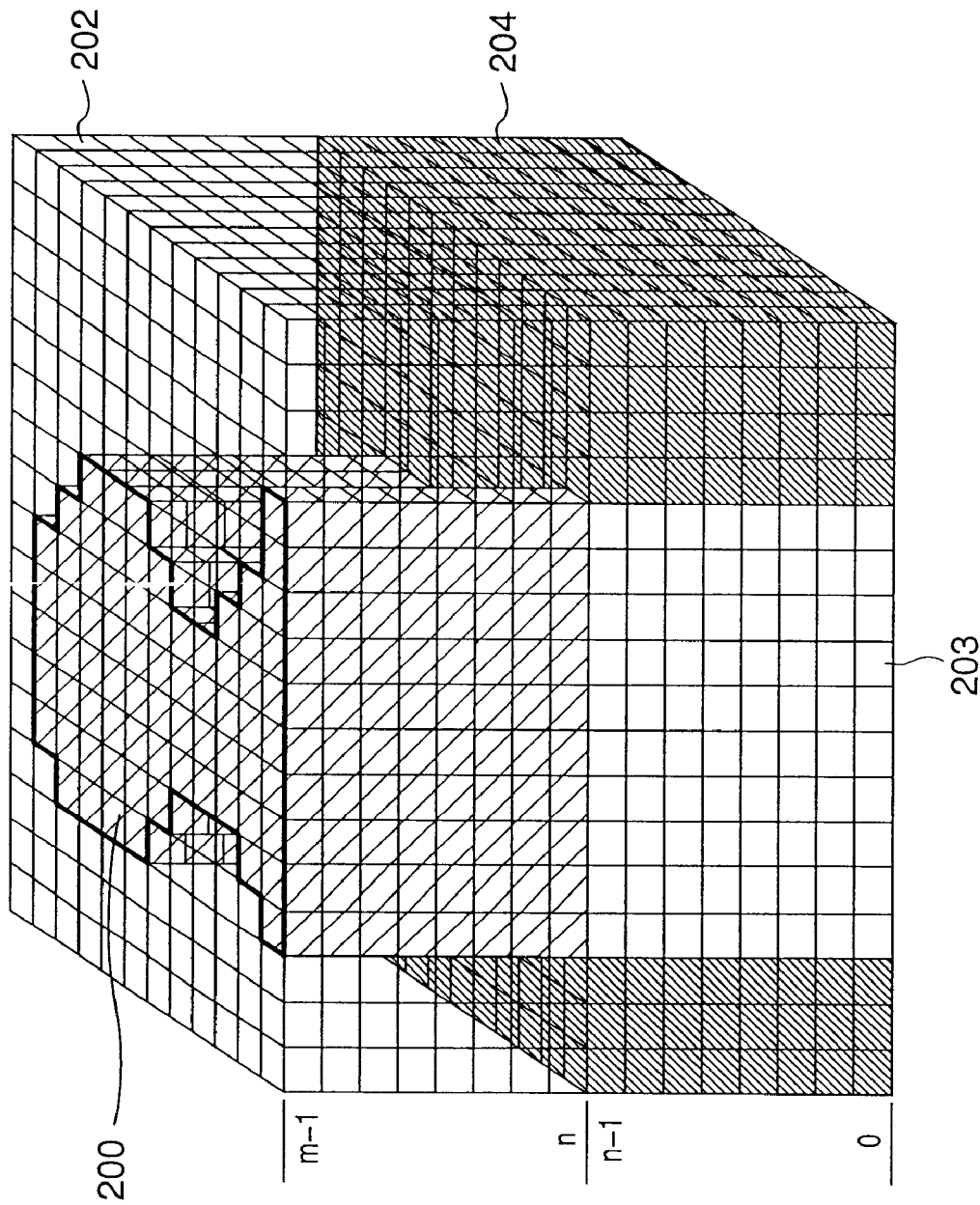
FIG. 19 is a view for explaining an outline of a composition process associated with an ROI in JPEG2000.

Referring to FIG. 19, texture data of the object 200 is demultiplexed in accordance with the shape information decoded by the mask decoder 54 and the number Bo of bits of the object, is shifted to lower bit planes, and is then input to the dequantizer 60. At this time, the bit plane data have the bit plane configuration shown in FIG. 18.

The dequantizer 60 dequantizes the input data, and the inverse discrete wavelet transformer 62 computes the inverse discrete wavelet transforms, thus reconstructing the texture data of the object. The texture encoder 65 encodes the texture data of the object in accordance with MPEG-4 texture coding in the same manner as the background texture data.

The multiplexer 66 shapes input data to encoded data according to an MPEG-4 simple profile format. That is, the encoded data in which the object is shaped as encoded data of a rectangular image is output from the MPEG-4 encoded data output unit 67 as MPEG-4 encoded data containing one object.

With a series of operations mentioned above, encoded data which holds both object and background image data can be converted into object encoded data while maintaining compatibility to the conventional JPEG2000 encoded data.

In the third embodiment, JPEG2000 encoded data is input, and MPEG-4 encoded data is output. However, the present invention is not limited to those specific data.

In the third embodiment, quantizers are provided to improve coding efficiency. However, the quantizers may be omitted to obtain reversible codes free from any deterioration.

[Fourth Embodiment]

Figure 6:
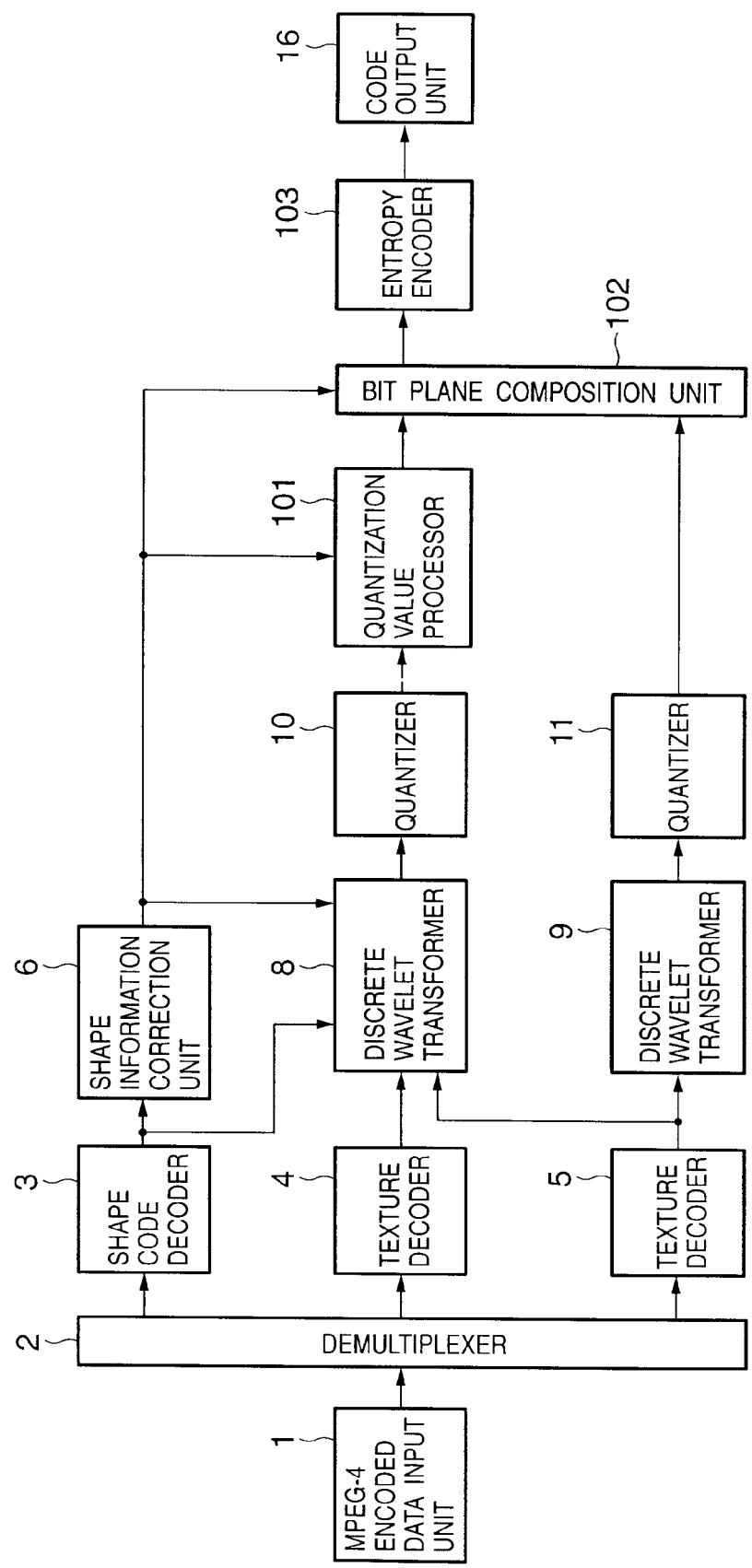
FIG. 6 is a block diagram showing the arrangement of an image processing apparatus according to the fourth embodiment of the present invention.

FIG. 6 is a block diagram showing the arrangement of an image processing apparatus according to the fourth embodiment of the present invention. Note that the same reference numerals denote the same building components as those in the first embodiment (FIG. 1) described above, and a detailed description thereof will be omitted.

Referring to FIG. 6, reference numeral 101 denotes a quantization value processor for partially changing the quantization result. Reference numeral 102 denotes a bit plane composition unit; and numeral 103 denotes an entropy encoder. As in the first embodiment, the MPEG-4 data input unit 1 inputs MPEG-4 encoded data containing one object and background image in a core profile. The input encoded data is supplied to the demultiplexer 2, and is demultiplexed into encoded data that pertains to a shape code of the object, encoded data that pertains to texture, and encoded data that pertains to the background texture. The encoded data that pertains to the shape code of the object is supplied to the shape code decoder 3, the encoded data that pertains to the texture of the object to the texture decoder 4, and the encoded data that pertains to the background texture to the texture decoder 5.

The shape code decoder 3 decodes binary information that represents the object shape, and inputs it to the shape information correction unit 6. The shape information correction unit 6 enlarges a region to the outside the object shape in consideration of the number of taps of discrete wavelet transformation as in the first embodiment. The texture decoder 4 decodes the texture of the object. The texture decoder 5 decodes the texture of the background. The discrete wavelet transformer 8 receives the output from the texture decoder 4 for pixels which are determined based on the shape information decoded by the shape code decoder 3 that they fall within the object, receives the output from the texture decoder 5 for the region corrected and expanded by the shape information correction unit 6, and computes their discrete wavelet transforms.

The quantizer 10 quantizes the output from the discrete wavelet transformer 8 by predetermined quantization coefficients. Likewise, the quantizer 11 quantizes the output from the discrete wavelet transformer 9 by predetermined quantization coefficients. The quantization result of the quantizer 10 is sent to the quantization value processor 101, and the quantization result of the quantizer 11 is sent to the bit plane composition unit 102.

The quantization value processor 101 corrects the quantization result input from the quantizer 10 in accordance with the shape information supplied from the shape information correction unit 6. In this case, the processor 101 replaces a quantization value "0" by "1", so that all quantization values in the object become nonzero. The result is input to the bit plane composition unit 102.

Figure 7:
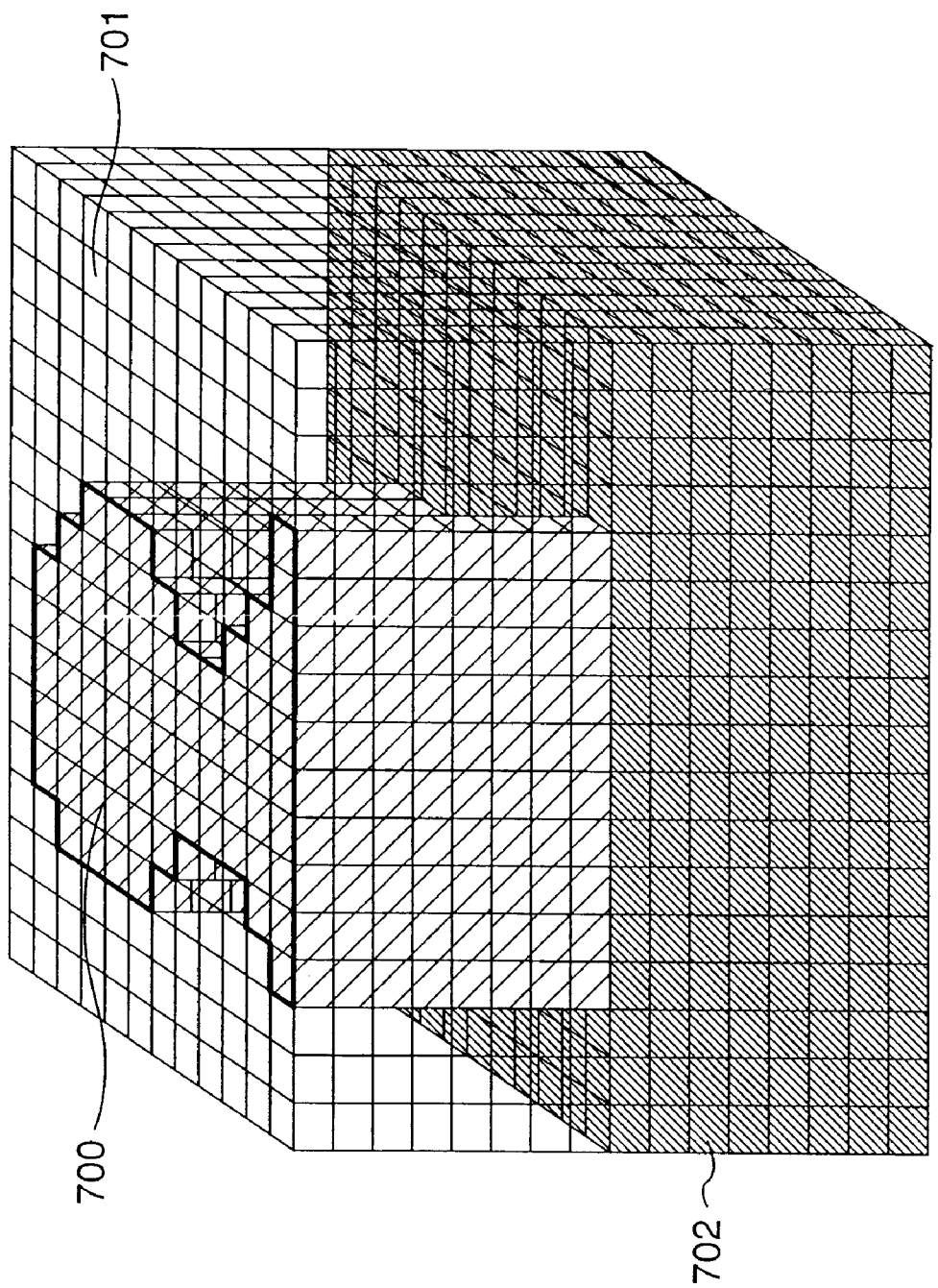
FIG. 7 is a view showing a bit plane composition process in an embodiment of the present invention.

The bit plane composition unit 102 composites bit planes under the control of the shape information correction unit 6. FIG. 7 shows this process.

Referring to FIG. 7, a given portion 700 of the object is stored from the MSB to the 8th bit. At this time, "0"s are stuffed in a portion 701. A portion associated with the background is stored from the 7th bit to the LSB (0th bit), and the object 700 and a background image 702 are composed without being mixed in bit planes. The composition result is input to the entropy encoder 103. The entropy encoder 103 generates codes according to the JPEG2000 format, and outputs them to the code output unit 16.

Figure 8:
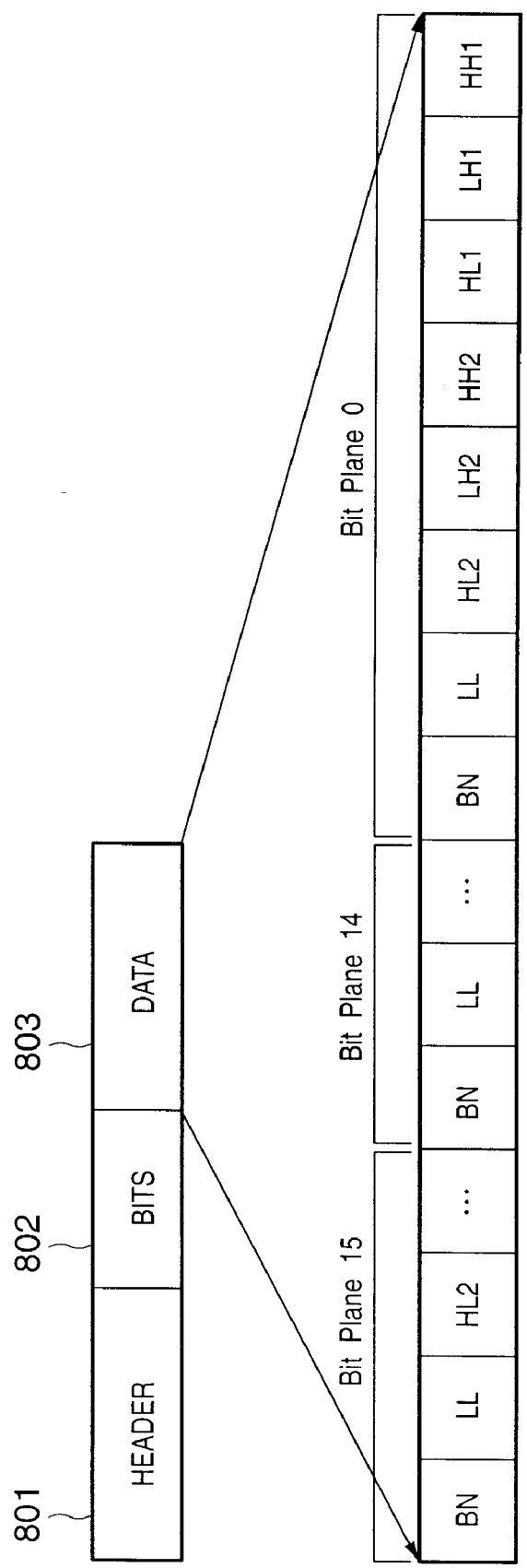
FIG. 8 is a view for explaining encoded data in an embodiment of the present invention.

FIG. 8 shows a generation example of the data. FIG. 8 shows the data format of JPEG2000 encoded data.

Referring to FIG. 8, reference numeral 801 denotes a header containing a code which indicates information of the size of the encoded image or the like. Reference numeral 802 denotes a BITS code as the encoding result of the number of bit planes. Reference numeral 803 denotes data that stores the entropy encoding result of each bit plane. The entropy encoding result is separated into bit planes, each of which consists of encoded data for respective subbands. The generated encoded data is externally output via the code output unit 16.

With a series of operations, encoded data, which preserves background image data lost by stuffing "0"s in the conventional process, can be generated. Since the shape of the object can be discriminated by checking if upper bits are "0"s or "nonzero"s, the coding efficiency can be improved without encoding the shape information of the object.

In the fourth embodiment, MPEG-4 encoded data is input, and JPEG2000 encoded data is output. However, the present invention is not limited to such specific data.

In the fourth embodiment, the quantization value processor 101 replaces a value "0" by a minimum value "1". However, the present invention is not limited to this, and the value "0" may be replaced by a quantization value which never appears. In this case, replaced values are also encoded and sent, and the decoder replaces the substituted values by "0"s, thus preventing information from deteriorating.

Furthermore, in the fourth embodiment, the quantizers 10 and 11 are provided to improve coding efficiency. However, the quantizers may be omitted to obtain reversible codes free from any deterioration.

[Fifth Embodiment]

Figure 9:
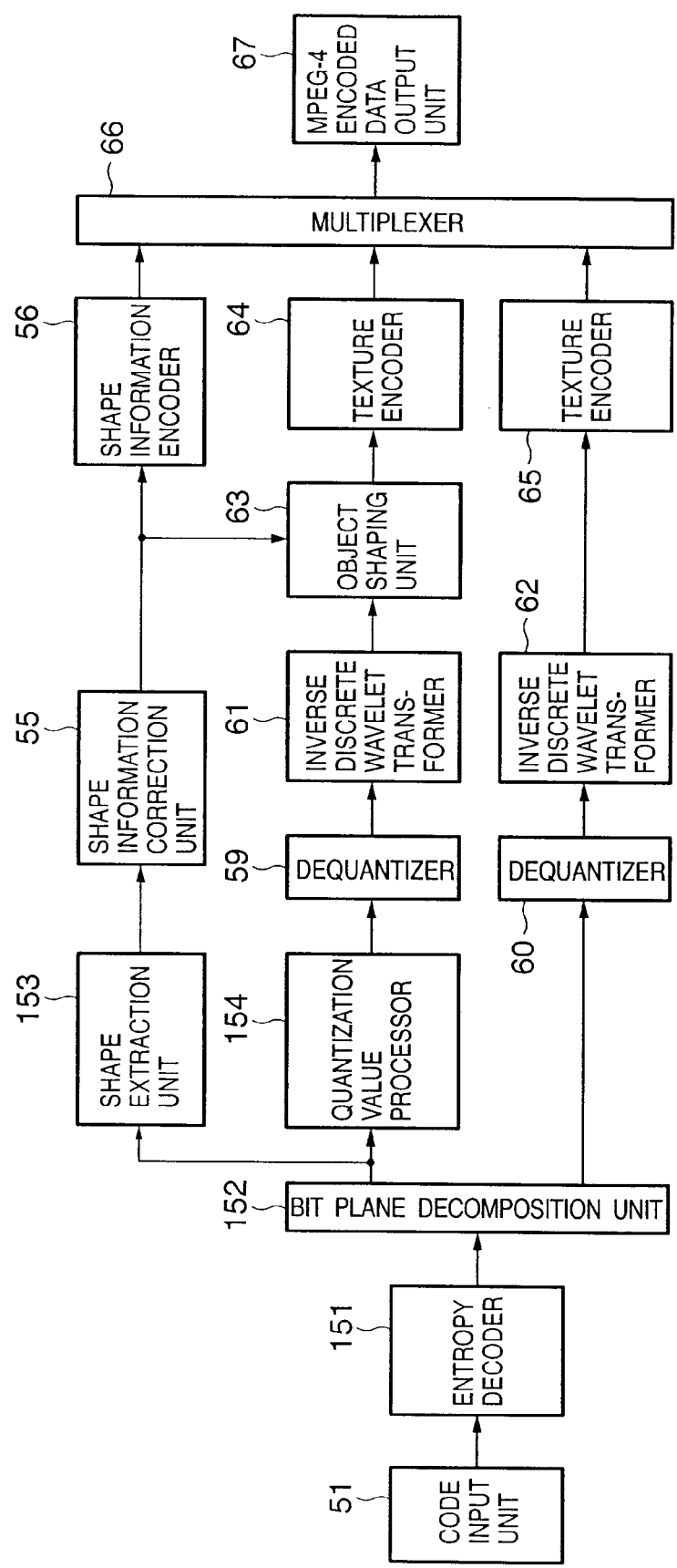
FIG. 9 is a block diagram showing the arrangement of an image processing apparatus according to the fifth embodiment of the present invention.

FIG. 9 is a block diagram showing the arrangement of an image processing apparatus according to the fifth embodiment of the present invention. Note that the same reference numerals denote the same building components as those in the third embodiment (FIG. 5), and a detailed description thereof will be omitted.

Referring to FIG. 9, reference numeral 151 denotes an entropy decoder for decoding JPEG2000 encoded data. Reference numeral 152 denotes a bit plane decomposition unit for decomposing data associated with an object in upper bits, and data associated with the background in lower bits. Reference numeral 153 denotes a shape extraction unit for extracting the shape of the object from the data associated with the object. Reference numeral 154 denotes a quantization value processor for replacing quantization values.

The fifth embodiment will explain a case wherein JPEG2000 encoded data generated in the fourth embodiment is input, and MPEG-4 encoded data is output.

As in the third embodiment described above with reference to FIG. 5, the code input unit 51 receives encoded data generated by the fourth embodiment mentioned above. The input encoded data is sent to the entropy decoder 151. The entropy decoder 151 decodes the header 801 (see FIG. 8) to acquire required information, and inputs the acquired information to respective units. Furthermore, the entropy decoder 151 decodes the BITS code 802 (see FIG. 8), and inputs information to the respective units. Moreover, the entropy decoder 151 decodes the data field 803 (see FIG. 8) in units of bit planes in turn from the MSB side. Note that the decoding result of the BITS code reveals that the upper half bit planes store the data that pertains to the object, and the lower half bit planes store the data that pertains to the background. Therefore, the bit plane decomposition unit 152 supplies the upper bit planes to the shape extraction unit 153 and quantization value processor 154, and the lower bit planes to the dequantizer 60.

The shape extraction unit 153 discriminates each quantization value of the input bit planes. If the quantization value is "0", the unit 153 determines a region outside the object; if the quantization value is "nonzero", it determines a region inside the object, and generates binary shape information using these discrimination results. The generated shape information is input to the shape information correction unit 55. The shape information correction unit 55 corrects the shape information to that which represents the object shape, since the number of taps of discrete wavelet transformation is known, as in the third embodiment. The corrected shape information is supplied to the shape information encoder 56 and object shaping unit 63. The shape information encoder 56 encodes the shape information according to MPEG-4 shape information coding, and supplies encoded data to the multiplexer 66, as in the third embodiment.

On the other hand, the quantization value processor 154 replaces all input quantization values "1" by "0", and outputs them to the dequantizer 59. After that, the dequantizer 59 dequantizes the inputand supplies to the inverse discrete wavelet transformer 61, and the inverse discrete wavelet transformer 61 computes the inverse discrete wavelet transforms, thus reconstructing texture data, as in the third embodiment. The reconstructed texture data is supplied to the object shaping unit 63, which replaces a portion, which is determined to be a region outside the object based on the shape information corrected by the shape information correction unit 55, by "0". The texture encoder 64 encodes the shaped texture data of the object by MPEG-4 texture coding.

The lower bit planes are dequantized by the dequantizer 60, and undergo inverse discrete wavelet transformation by the inverse discrete wavelet transformer 62, thus reconstructing texture data, as in the third embodiment. The background texture data is input to the texture encoder 65, and is encoded by MPEG-4 texture coding.

The multiplexer 66 receives encoded data from the shape information encoder 56 and texture encoders 64 and 65, and shapes these data to encoded data according to the MPEG-4 core profile format. The shaped encoded data is externally output via the MPEG-4 encoded data output unit 67 as MPEG-4 encoded data containing one object and background image in a core profile.

With a series of operations mentioned above, encoded data which holds both object and background image data can be converted into object encoded data while maintaining compatibility to the conventional JPEG2000 encoded data. Also, since the shape information of the object is reconstructed from the quantization values, it need not be sent, and deterioration of image quality upon replacing quantization values can be minimized since the quantization values are replaced by minimum values.

In the fifth embodiment, JPEG2000 encoded data is input, and MPEG-4 encoded data is output. However, the present invention is not limited to those specific data.

In the fifth embodiment, the quantization value processor 154 replaces "0" by another value, and when the replaced value is encoded and sent, information can be prevented from deteriorating by replacing the replaced value by "0".

Furthermore, in the fifth embodiment, quantizers are provided to improve coding efficiency. However, the quantizers may be omitted to obtain reversible codes free from any deterioration.

[Sixth Embodiment]

Figure 10:
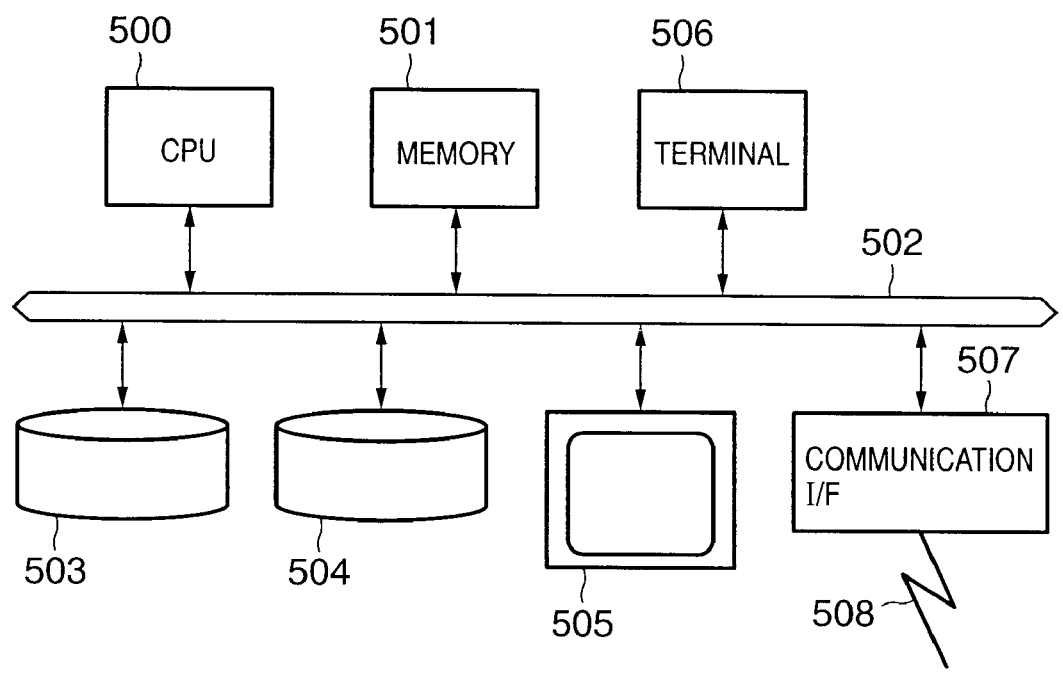
FIG. 10 is a block diagram showing the arrangement of an image processing apparatus according to the sixth embodiment of the present invention.

FIG. 10 is a block diagram showing the arrangement of an image processing apparatus according to the sixth embodiment of the present invention.

Referring to FIG. 10, reference numeral 500 denotes a central processing unit (CPU) for controlling the entire apparatus and executing various processes; and numeral 501 denotes a memory which stores an operating system (OS) and software required for controlling the apparatus of this embodiment, and provides storage areas required for arithmetic operations. Reference numeral 502 denotes a bus for connecting respective units, various controllers, and various devices to exchange data, control signals and the like; numeral 503 denotes a storage unit for storing software; numeral 504 denotes a storage unit for storing moving image data; numeral 505 denotes a monitor (display) for displaying an image, message, and the like; and numeral 508 denotes a communication line which comprises a LAN, public line, radio line, broadcast wave, or the like. Reference numeral 507 denotes a communication interface for sending encoded data onto the communication line 508. Reference numeral 506 denotes a terminal which is used to start up the apparatus, and to set various conditions such as a bit rate, and the like.

The memory 501 has an area which stores the OS that controls the overall apparatus and makes various kinds of software run, and software to run, and an image area which temporally loads image data to be encoded, a code area which temporarily stores code data, and a working area which stores parameters of various arithmetic operations and the like.

In this arrangement, prior to a process, the user selects moving image data to be encoded from those stored in the storage unit 504 and instructs to start up the apparatus at the terminal 506. In response to this instruction, software stored in the storage unit 503 is mapped on the memory 501 via the bus 502 and is launched, thus starting the process.

The operation for converting MPEG-4 encoded data stored in the storage unit 504 into JPEG2000 encoded data in units of frames by the CPU 500 will be described below with reference to the flow chart shown in FIG. 11. Note that this MPEG-4 encoded data is core profile data, and contains a background and one object.

In step S1, MPEG-4 encoded data selected at the terminal 506 is read out from the storage unit 504, and is stored in the code area of the memory 501. The flow advances to step S2 to read and decode encoded data, which pertains to shape information of the object, of the MPEG-4 encoded data, so as to generate a binary image that represents the object shape. The binary image is stored in the image area of the memory 501. The flow advances to step S3 in which an expanded region for expanding the shape information of the object is computed from the number of taps of discrete wavelet transformation used later. In this case, the vertical and horizontal sizes of the expanded region of that object can be uniquely determined based on the number of taps and the number of subbands. A binary image that represents the expanded region and the remaining region is generated, and the flow advances to step S4.

In step S4, a mask that represents the shape of an ROI of JPEG2000 coding is encoded on the basis of a header as encoded data which pertains to the characteristics of an image of the JPEG2000 encoded data to be generated, and the shape information and expanded region information stored in the image area of the memory 501, and is stored in the code area of the memory 501. The flow advances to step S5 to read out and decode encoded data, which pertains to the texture of the object, from the MPEG-4 encoded data stored in the code area of the memory 501, and to store image data generated by decoding in the image area of the memory 501. The flow advances to step S6 to read out and decode encoded data, which pertains to the background texture, from the MPEG-4 encoded data stored in the code area of the memory 501, and to store the generated image data in the image area of the memory 501.

The flow advances to step S7 to compute the discrete wavelet transforms of pixels, which are determined to fall within the object based on the shape information of the object generated in step S2, as texture data of the object, pixels, which belong to the expanded region generated in step S3, as texture data of the background, and other pixels as "0". The computation result is stored in the working area of the memory 501. The flow then advances to step S8 to quantize the object transformation result stored in the working area of the memory 501 in accordance with predetermined quantization coefficients.

The flow advances to step S9 to encode the quantization result of the object stored in the working area of the memory 501 in step S8 in turn from a bit plane on the MSB side, and to store the encoding result after the code that pertains to the mask in the code area of the memory 501. The flow advances to step S10 to compute the discrete wavelet transforms of the background texture data, and to store the result in the working area of the memory 501. The flow then advances to step S11. In step S11, the background transformation result stored in the working area is quantized in accordance with predetermined quantization coefficients. The flow advances to step S12 to encode the background quantization result stored in the working area of the memory 501 in step S11 in turn from a bit plane on the MSB side, and to store the encoding result after the code that pertains to the texture of the object stored in the code area of the memory 501. The JPEG2000 encoded data generated in the code area of the memory 501 in this way is stored at a predetermined location in the storage unit 504. Upon completion of the process in step S12, the encoding process of the frame of interest ends, and the next frame is processed or the process ends.

With a series of operations mentioned above, encoded data which holds both object and background image data can be converted into object encoded data while maintaining compatibility to the conventional JPEG2000 encoded data.

In the sixth embodiment, JPEG2000 encoded data is input, and MPEG-4 encoded data is output. However, the present invention is not limited to those specific data.

[Seventh Embodiment]

Figure 12:
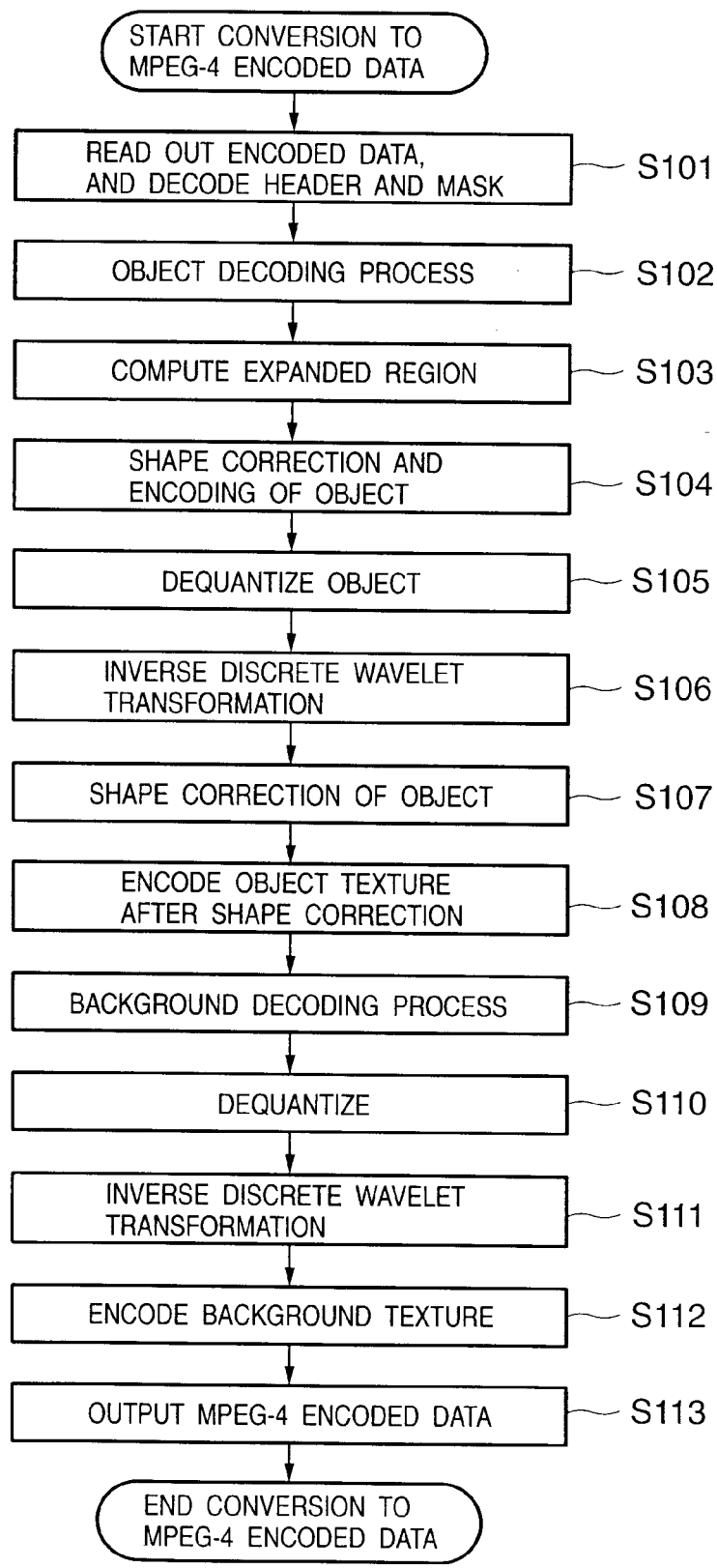
FIG. 12 is a flow chart for explaining an image encoding process according to the seventh embodiment of the present invention.
Figure 13:
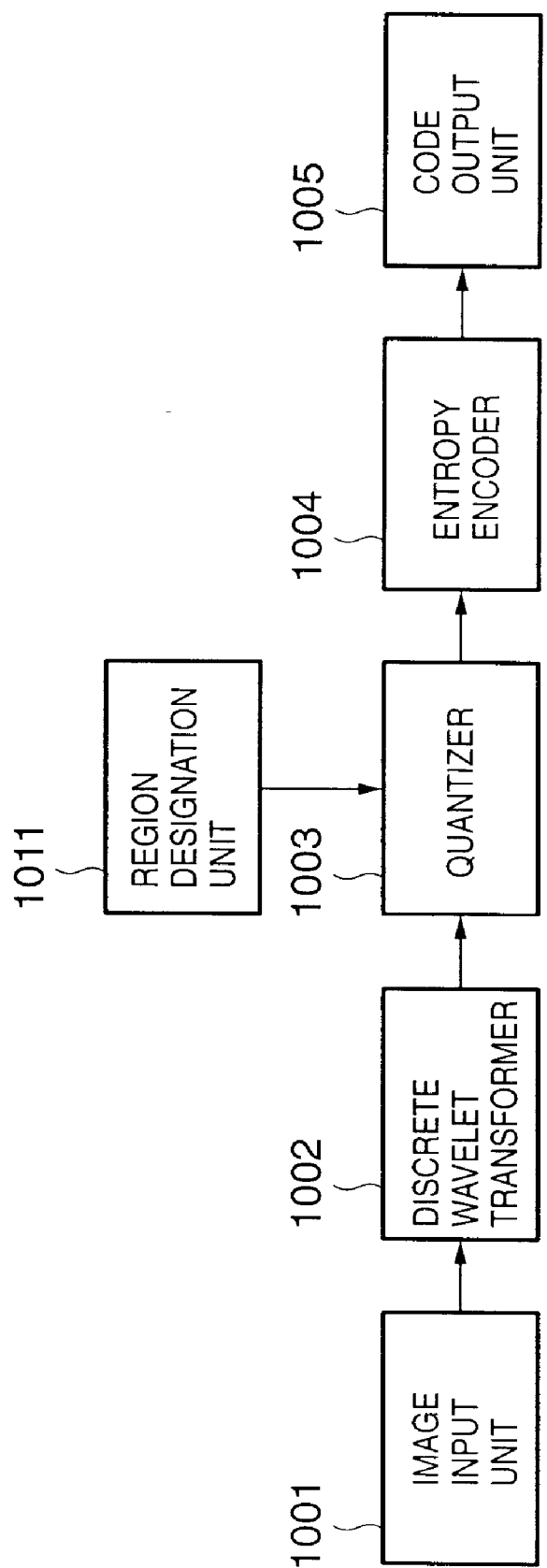
FIG. 13 is a block diagram showing an outline of JPEG2000.
Figure 14:
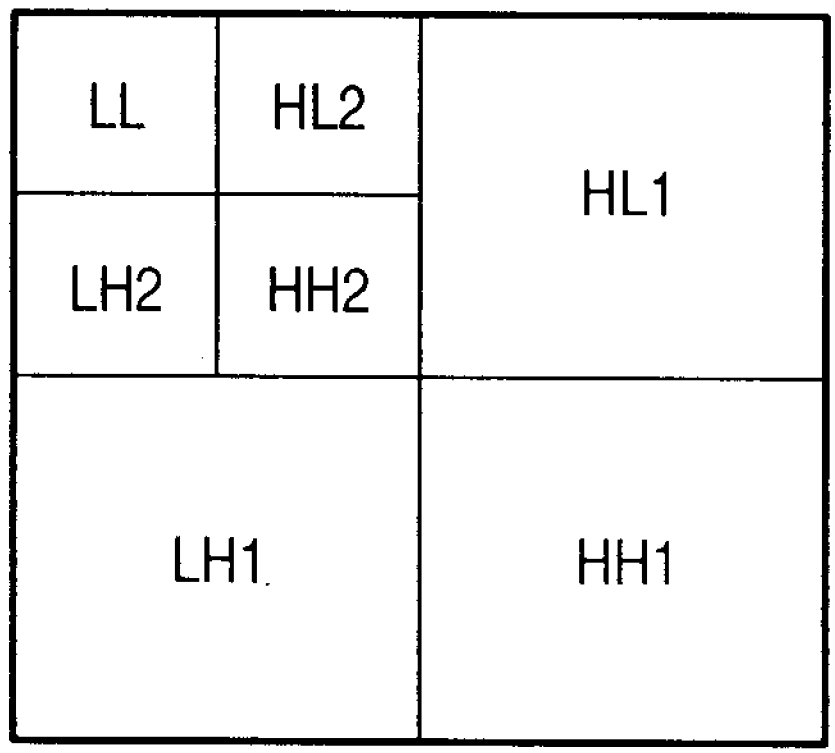
FIG. 14 is a view for explaining the subband configuration of discrete wavelet transformation.
Figure 15A:
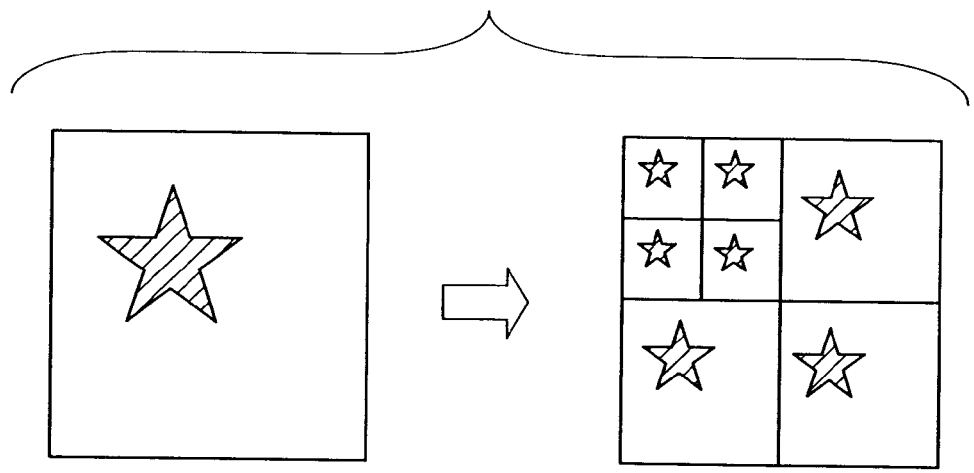
FIGS. 15A to 15C are views for explaining an outline of an ROI process of JPEG2000.
Figure 15B:
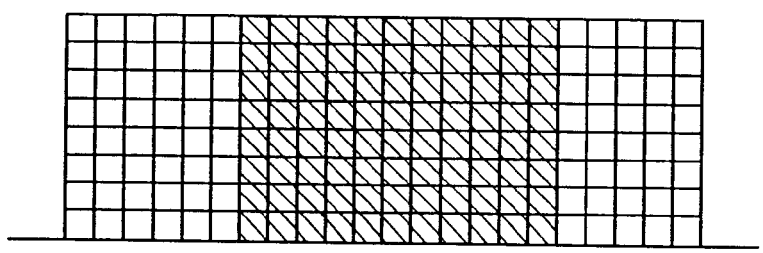
Figure 15C:
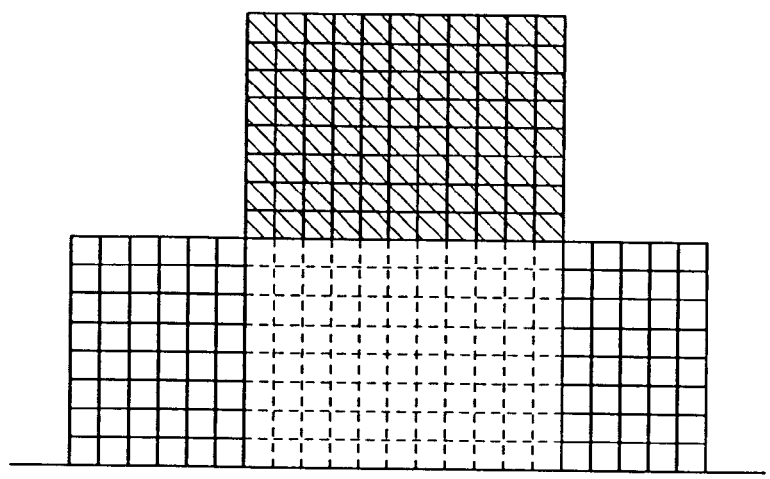
Figure 16:
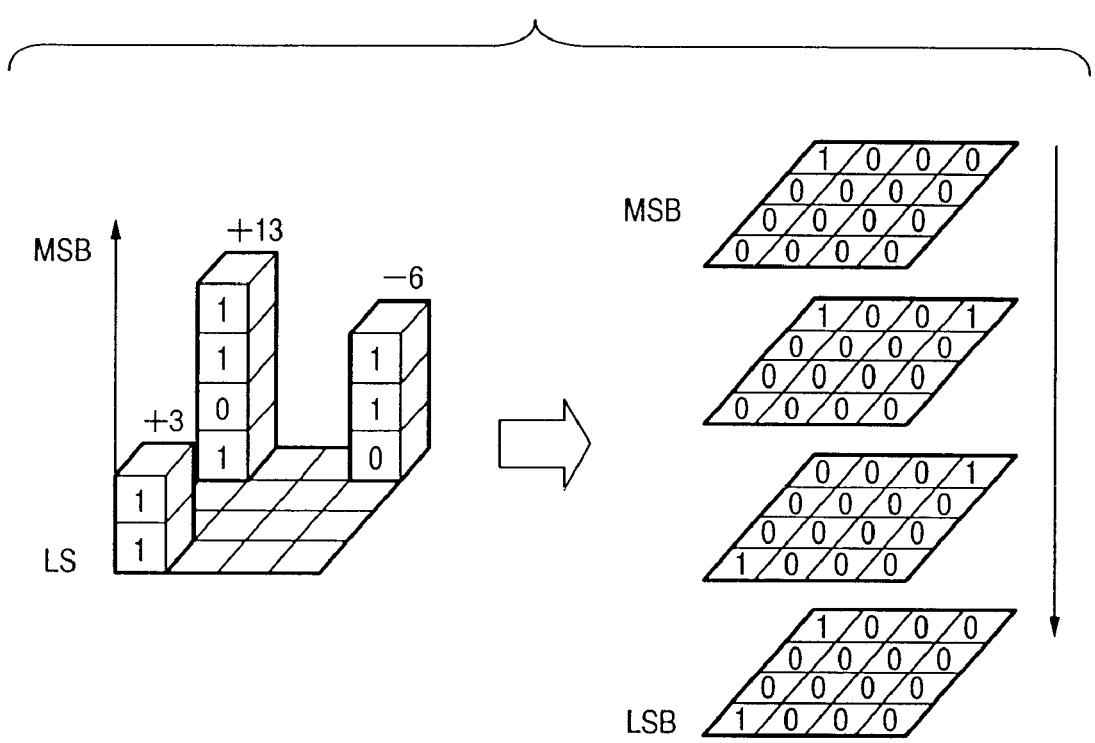
FIG. 16 is a view for explaining an outline of bit plane coding based on JPEG2000.

As the seventh embodiment of the present invention, the operation for converting JPEG2000 encoded data in units of frames, which are generated in the sixth embodiment mentioned above using the arrangement of the image processing apparatus shown in FIG. 10 and are stored in the storage unit 504, into MPEG-4 encoded data will be explained below with reference to the flow chart shown in FIG. 12.

In step S101, JPEG2000 encoded data selected at the terminal 506 is read out from the storage unit 504, and is stored in the code area of the memory 501. The header and mask information of the JPEG2000 encoded data are decoded, and the decoded mask information is stored in the image area of the memory 501. The flow advances to step S102 to read out encoded data of bit planes, which correspond to the ROI, of the JPEG2000 encoded data stored in the code area of the memory 501, to decode that encoded data, and to store the decoded data in the image area of the memory 501. The stored data is the quantization result of the texture data of the object.

Figure 11:
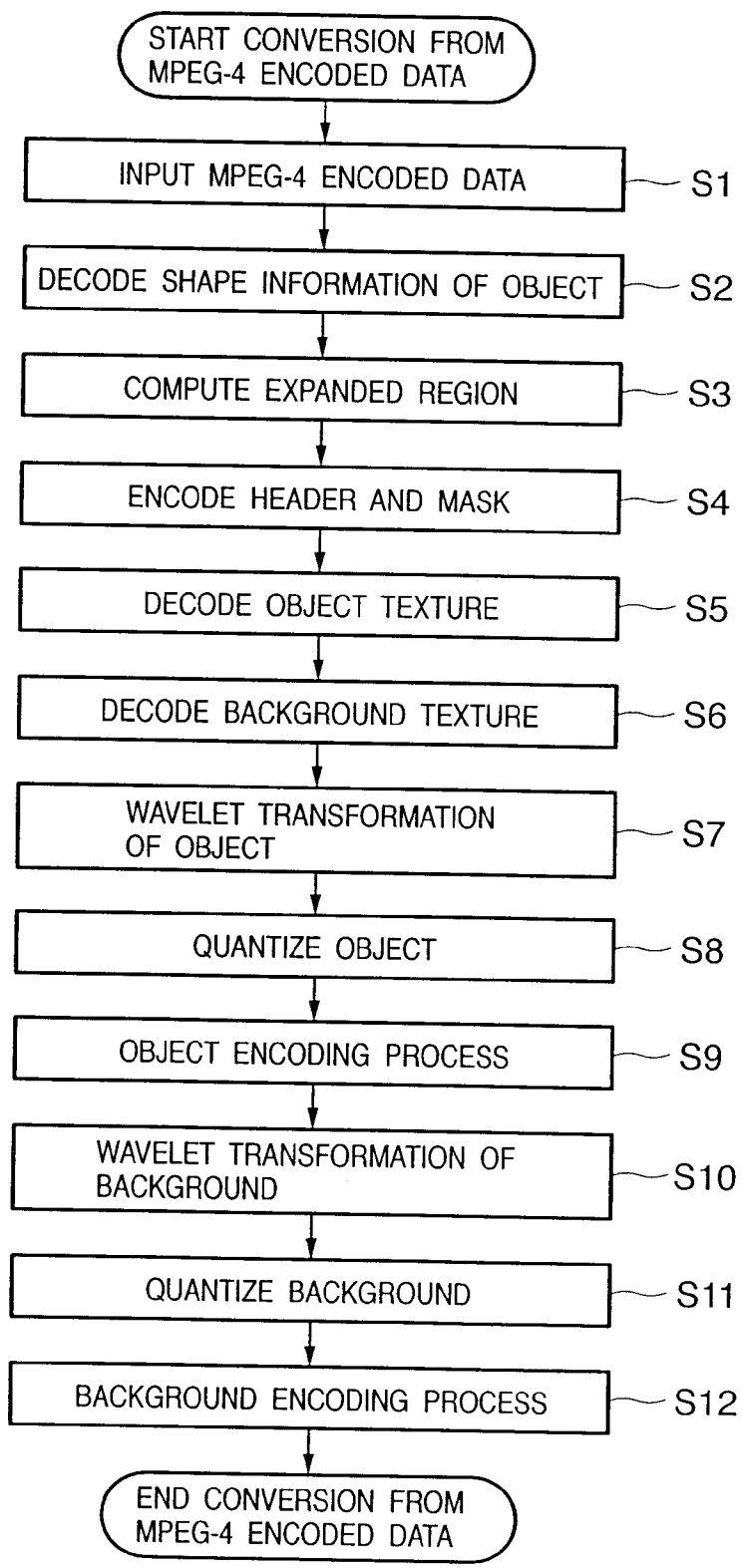
FIG. 11 is a flow chart for explaining an image encoding process according to the sixth embodiment of the present invention.

The flow advances to step S103 to compute the expanded region expanded in step S3 in FIG. 11 on the basis of the mask information stored in the image area of the memory 501 and discrete wavelet transformation used upon encoding, and to store the region in the image area of the memory 501 as a binary image. The flow advances to step S104 to correct the mask information obtained by decoding in step S101 by removing the expanded region computed in step S103 from that mask information, thus generating the shape information of the object. The shape information is encoded and stored in the code area of the memory 501. The flow advances to step S105 to dequantize the quantization result of the object texture stored in the image area of the memory 501 in step S103, and to store the dequantization result in the image area of the memory 501. The flow advances to step S106 to generate image data by computing the inverse wavelet transforms of the dequantization result of the object texture generated in step S105, and to store that image data in the image area of the memory 501. The flow advances to step S107 to replace pixel data corresponding to the expanded area of the object computed in step S103 by "0", and to store them in the image area of the memory 501.

The flow advances to step S108 to generate encoded data by texture-encoding the image data of the object stored in step S107 by MPEG-4, and to store the encoded data after the shape information encoded data in the code area of the memory 501. Since the shape information encoded data and texture encoded data are MPEG-4 encoded data of the object, they are stored at a predetermined location in the storage unit 504.

The flow advances to step S109 to decode lower bit planes which are stored in the code area of the memory 501 and remain undecoded, and to store the decoded data in the image area of the memory 501. The flow advances to step S110. The stored data is the quantization result of the background texture. In step S110, the quantization result of the background texture stored in the image area of the memory 501 in step S109 is dequantized, and the dequantization result is stored in the image area of the memory 501. The flow advances to step S111 to generate image data by computing the inverse discrete wavelet transforms of the dequantization result of the background texture generated in step S110, and to store the image data in the image area of the memory 501. The flow advances to step S112 to generate encoded data by encoding the background image data stored in step S111 by MPEG-4 texture coding, and to save the encoded data at a predetermined location of the storage unit 504 as encoded data of the texture of the background image. The flow then advances to step S113 to output the stored data as MPEG-4 encoded data.

With a series of operations mentioned above, encoded data which holds both object and background image data can be converted into object encoded data while maintaining compatibility to the conventional JPEG2000 encoded data.

In the seventh embodiment, JPEG2000 encoded data is input, and MPEG-4 encoded data is output. However, the present invention is not limited to those specific data.

In the seventh embodiment, MPEG-4 encoding in units of frames has been exemplified, but motion compensation may be done.

Furthermore, the background image and object image may be composed in accordance with the shape information, and the composite image may be displayed on the monitor 506, stored in the storage unit 504, or output onto the communication line 508 via the communication interface 507.

[Eighth Embodiment]

Figure 20:
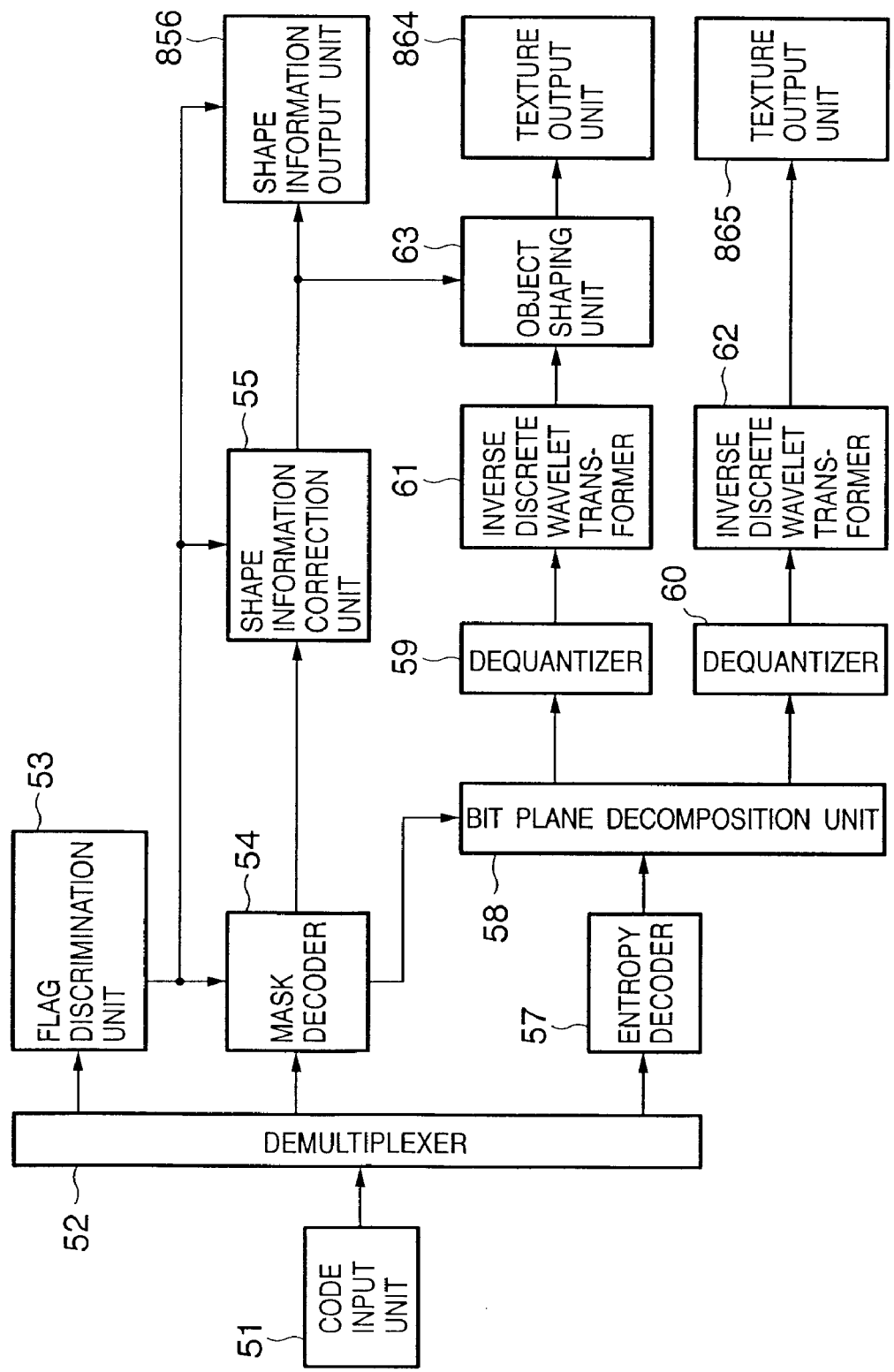
FIG. 20 is a block diagram showing the arrangement of an image processing apparatus according to the eighth embodiment of the present invention.

FIG. 20 is a block diagram showing the arrangement of an image processing apparatus according to the eighth embodiment of the present invention.

In FIG. 20, the shape information encoder 56 and texture encoders 64 and 65 in FIG. 5 are replaced by a shape information output unit 856 and texture output units 864 and 865, respectively, and the multiplexer 66 and MPEG-4 encoded data output unit 67 are omitted. Note that the same reference numerals denote the same building components as those in the third embodiment (FIG. 5) mentioned above, and a detailed description thereof will be omitted.

Referring to FIG. 20, reference numeral 856 denotes a shape information output unit for outputting generated shape information. Reference numeral 864 denotes a texture output unit for outputting generated image data of the object. Reference numeral 865 denotes a texture output unit for outputting generated image data of the background.

The eighth embodiment will explain a case wherein JPEG2000 encoded data generated by the first embodiment described above is input and reconstructed.

The code input unit 51 receives encoded data generated by the aforementioned first embodiment, as in the third embodiment described previously with reference to FIG. 5. The input encoded data is input to the demultiplexer 52 to decode a header, and respective encoded data are input to the flag discrimination unit 53, mask decoder 54, and entropy decoder 57. The flag discrimination unit 53 checks the presence/absence of the background, and the mask decoder 54 decodes mask information as in the third embodiment. The decoded mask information is corrected by the shape information correction unit 55, and is supplied to the object shaping unit 63. Also, the mask information is externally output via the shape information output unit 856.

The entropy decoder 57 decodes respective bit planes, and the bit plane decomposition unit 58 decomposes and outputs bit plane data to the dequantizers 59 and 60 in accordance with an instruction from the mask decoder 54.

After that, as in the third embodiment, the object encoded data undergoes dequantization and inverse discrete wavelet transformation to reconstruct image data, and the image data is shaped by the object shaping unit 63. The shaped image data is externally output via the texture output unit 864. Also, the background encoded data undergoes dequantization and inverse discrete wavelet transformation to reconstruct image data, and that image data is externally output via the texture output unit 865. With a series of operations mentioned above, object and background image data can be reconstructed from the conventional JPEG2000 encoded data.

[Ninth Embodiment]

Figure 21:
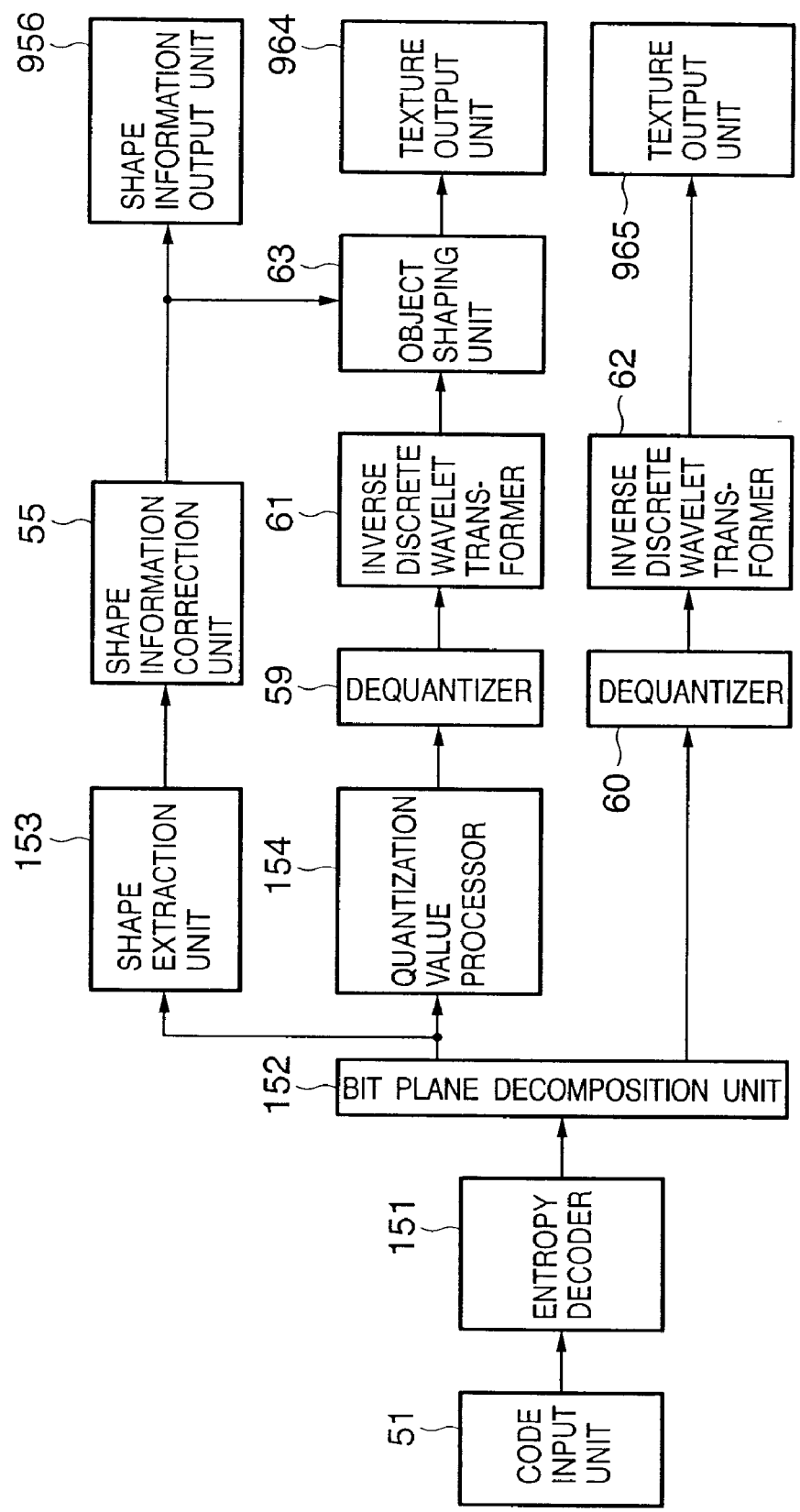
FIG. 21 is a block diagram showing the arrangement of an image processing apparatus according to the ninth embodiment of the present invention.

FIG. 21 is a block diagram showing the arrangement of an image processing apparatus according to the ninth embodiment of the present invention. Note that the same reference numerals denote the same building components as in the fifth embodiment (FIG. 9) mentioned above, and a detailed description thereof will be omitted.

Referring to FIG. 21, reference numeral 956 denotes a shape information output unit for outputting generated shape information. Reference numeral 964 denotes a texture output unit for outputting generated object image data. Reference numeral 965 denotes a texture output unit for outputting generated background image data.

The ninth embodiment will explain a case wherein JPEG2000 encoded data generated by the fourth embodiment is input and reproduced.

As in the fifth embodiment that has been explained above with reference to FIG. 9, the code input unit 51 receives encoded data generated by the fourth embodiment mentioned above. The input encoded data is supplied to the entropy decoder 151 to decode a header, BITS code, and data portion (see FIG. 8), and to decode respective bit planes. The bit plane decomposition unit 152 decomposes upper and lower bit planes, and supplies the upper bit planes to the shape extraction unit 153 and quantization value processor 154, and the lower bit planes to the dequantizer 60.

The shape extraction unit 153 generates shape information by discriminating regions inside and outside the object on the basis of the quantization values as in the fifth embodiment. The generated shape information is corrected by the shape information correction unit 55, and is input to the object shaping unit 63. Also, the shape information is externally output via the shape information output unit 956.

As in the fifth embodiment mentioned above, the quantization values of the object encoded data are replaced by the quantization value processor 154, and the replaced data undergoes dequantization and inverse discrete wavelet transformation to reconstruct image data. The image data is then shaped by the object shaping unit 63, and is externally output via the texture output unit 964. Also, the background encoded data undergoes dequantization and inverse discrete wavelet transformation to reconstruct image data, and the image data is externally output via the texture output unit 965. With a series of operations mentioned above, object and background image data can be reconstructed from the JPEG2000 encoded data.

[10th Embodiment]

Figure 22:
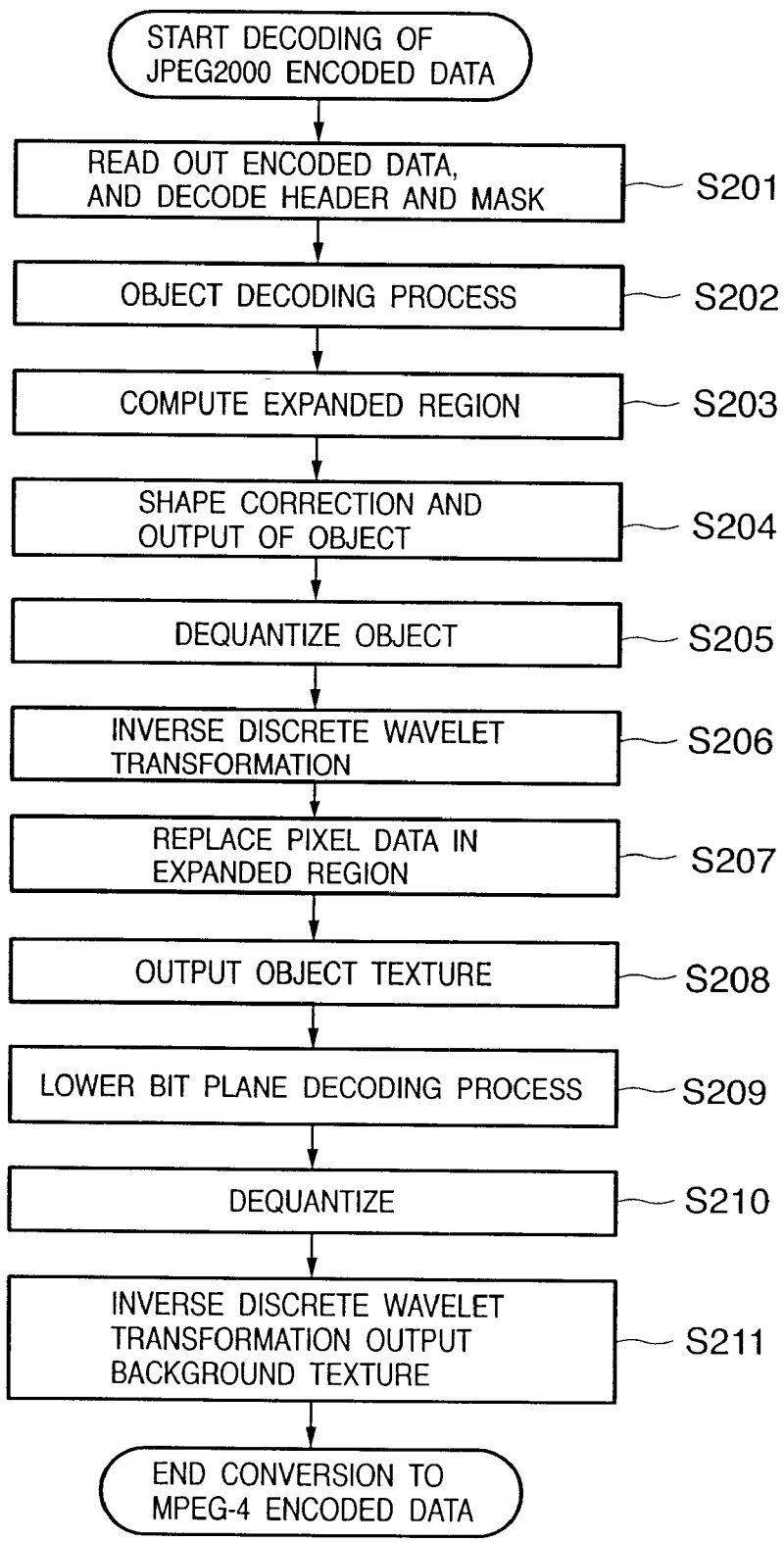
FIG. 22 is a flow chart for explaining an image decoding process according to the 10th embodiment of the present invention.

As the 10th embodiment of the present invention, the operation for reconstructing image data from JPEG2000 encoded data in units of frames, which are generated by the sixth embodiment mentioned above using the arrangement of the image processing apparatus shown in FIG. 10, and are stored in the storage unit 504, will be described below with reference to the flow chart shown in FIG. 22.

In step S201, JPEG2000 encoded data selected at the terminal 506 is read out from the storage unit 504, and is stored in the code area of the memory 501. A header and mask information of the JPEG2000 encoded data are decoded, and the decoded mask information is stored in the image area of the memory 501. The flow then advances to step S202 to read out and decode encoded data of bit planes corresponding to an ROI of the JPEG2000 encoded data stored in the code area of the memory 501, and to store the quantization result of texture of the object in the image area of the memory 501.

The flow advances to step S203 to compute the expanded region expanded in step S3 in FIG. 11 on the basis of the mask information stored in the image area of the memory 501 and discrete wavelet transformation used upon encoding, and to store the region in the image area of the memory 501 as a binary image. The flow advances to step S204 to generate shape information of the object by correcting the mask information obtained by decoding in step S201, i.e., by removing the expanded region computed in step S203 from that mask information. The generated shape information is stored in the image area of the memory 501, and is output to an external device, e.g., the monitor 505.

The flow then advances to step S205 to dequantize the quantization result of the object texture stored in the image area of the memory 501 in step S202, and to store the dequantization result in the image area of the memory 501. The flow advances to step S206 to generate image data by computing the inverse discrete wavelet transforms of the dequantization result of the object texture generated in step S205, and to store that image data in the image area of the memory 501. The flow advances to step S207 to replace pixel data corresponding to the expanded region of the object computed in step S203 by "0", and to store them in the image area of the memory 501. The flow then advances w to step S208 to output the stored data to an external device, e.g., the monitor 505.

The flow advances to step S209 to decode lower bit planes which are stored in the code area of the memory 501 and remain undecoded, and to store the decoded data in the image area of the memory 501. The flow advances to step S210. In step S210, the quantization result of the background texture stored in the image area of the memory 501 in step S209 is dequantized, and the dequantization result is stored in the image area of the memory 501. The flow advances to step S211 to generate image data by computing the inverse discrete wavelet transforms of the dequantization result of the background texture generated in step S210, and to store the image data in the image area of the memory 501. The image data is then output to an external device, e.g., the monitor 505.

Since the monitor 505 displays composite data of these image data, a composite image of background and object images can be displayed.

With a series of operations mentioned above, object and background image data can be reconstructed from the JPEG2000 encoded data.

[11th Embodiment]

Figure 24:
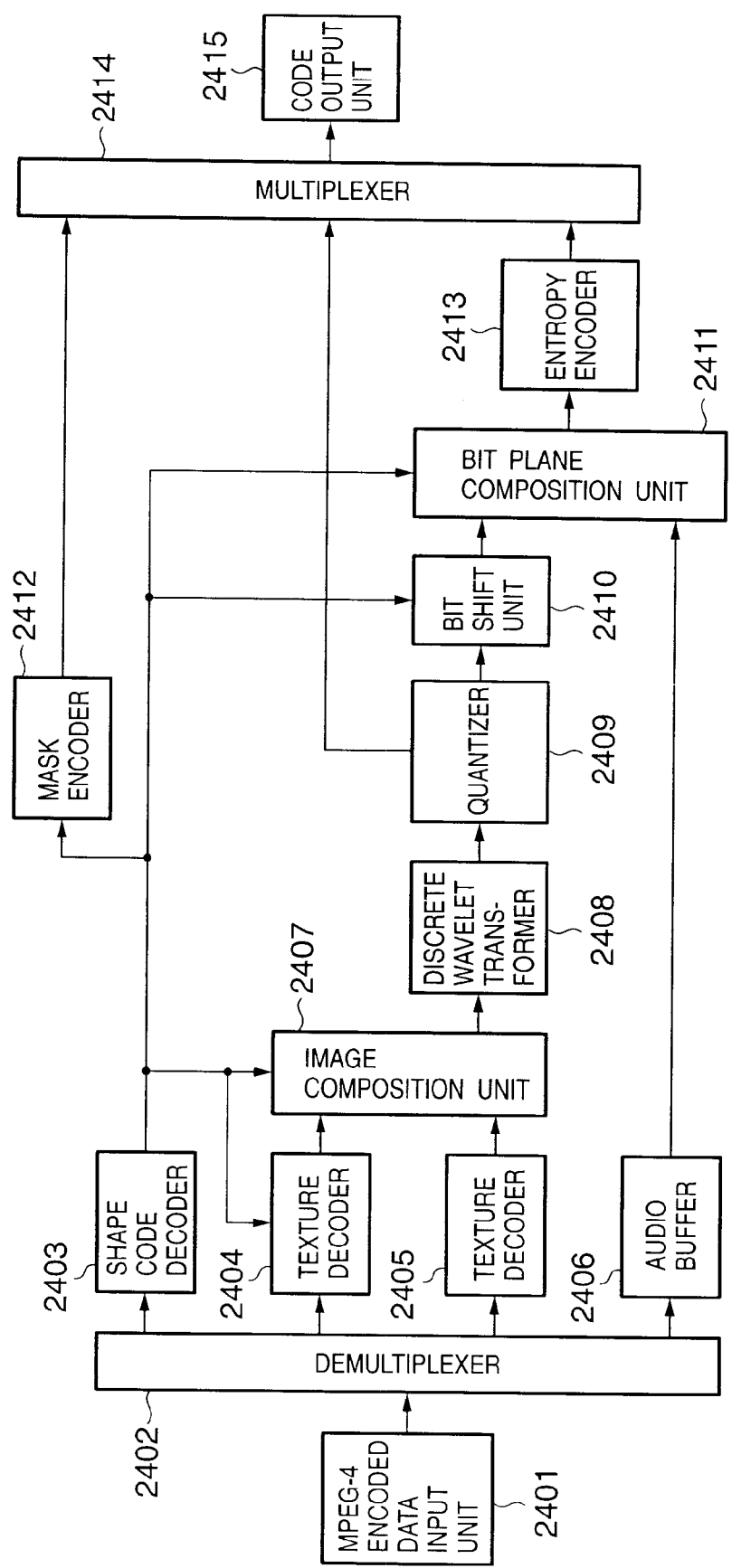
FIG. 24 is a block diagram showing the arrangement of an image processing apparatus according to the 11th embodiment of the present invention.

FIG. 24 is a block diagram showing the arrangement of an image processing apparatus according to the 11th embodiment of the present invention. Note that the 11th embodiment will explain a case wherein MPEG-4 encoded data is input and encoded, and is output as JPEG2000 encoded data.

Referring to FIG. 24, reference numeral 2401 denotes an encoded data input unit for inputting MPEG-4 encoded data. Reference numeral 2402 denotes a demultiplexer for demultiplexing the input MPEG-4 encoded data, and supplying the demultiplexed data to respective units. Reference numeral 2403 denotes a shape code decoder for receiving and decoding shape encoded data of an object, which is encoded by MPEG-4 and is demultiplexed by the demultiplexer 2402. Reference numeral 2404 denotes a texture decoder for decoding the texture of the object demultiplexed by the demultiplexer 2402. Reference numeral 2405 denotes a texture decoder for decoding the texture of encoded data of a background image demultiplexed by the demultiplexer 2402. Reference numeral 2406 denotes an audio buffer for storing audio encoded data. In this embodiment, the audio encoded data is encoded by HVXC, i.e., has undergone very low-bit encoding. Reference numeral 2407 denotes an image composition unit for superposing the object texture decoded by the texture decoder 2404 on the background image texture decoded by the texture decoder 2405 in accordance with the shape information decoded by the shape code decoder 2403. Reference numeral 2408 denotes a discrete wavelet transformer for computing the discrete wavelet transforms of input image data. Reference numeral 2409 denotes a quantizer for receiving and quantizing transform coefficients computed by the discrete wavelet transformer 2408. Reference numeral 2410 denotes a bit shift unit for shifting bit planes on the basis of the quantization result of the quantizer 2409 in accordance with the number of bits that form the bit planes and the mask information decoded by the shape code decoder 2403. Reference numeral 2411 denotes a bit plane composition unit for composing the contents of the audio buffer 2406 by stuffing them in the order of bits in lower bits of a region designated as an object by the mask information in accordance with the number of bits that form the bit planes and the mask information decoded by the shape code decoder 2403. Reference numeral 2412 denotes a mask encoder for encoding mask information that represents the ROI shape and position. Reference numeral 2413 denotes an entropy encoder for encoding data composed by the bit plane composition unit 2411 in units of bit planes. Reference numeral 2414 denotes a multiplexer for shaping the outputs from the mask encoder 2412 and entropy encoder 2413 to encoded data according to the JPEG2000 format. Reference numeral 2415 denotes a code output unit for outputting the generated encoded data.

The operation of the aforementioned arrangement will be explained below. In this embodiment, a process of MPEG-4 encoded data for each frame will be explained. By repeating this process in correspondence with the number of frames, all data can be processed.

The encoded data input unit 2401 inputs MPEG-4 encoded data consisting of one object, background image, and audio encoded data in a core profile. The input encoded data is supplied to the demultiplexer 2402, and is demultiplexed into encoded data which pertains to a shape code of the object, encoded data that pertains to the texture of the object, encoded data that pertains to the texture of the background, and audio encoded data. The encoded data that pertains to the shape code of the object is supplied to the shape code decoder 2403, the encoded data that pertains to the object texture to the texture decoder 2404, the encoded data that pertains to the background texture to the texture decoder 2405, and the audio encoded data to the audio buffer 2406.

Figure 25A:
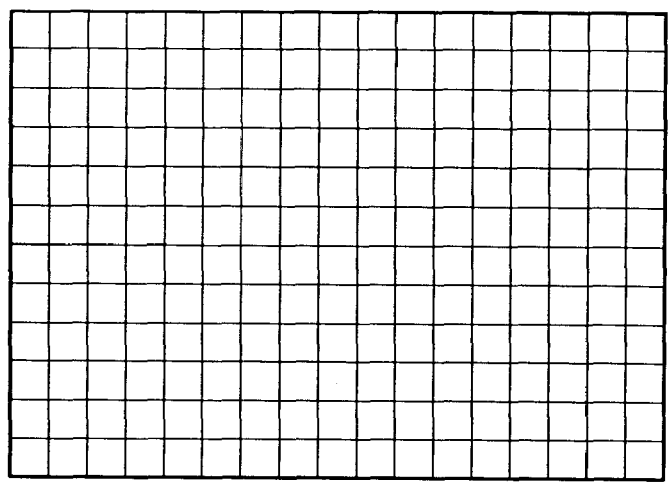
FIGS. 25A to 25C are views for explaining bit plane states in an embodiment of the present invention.
Figure 25B:
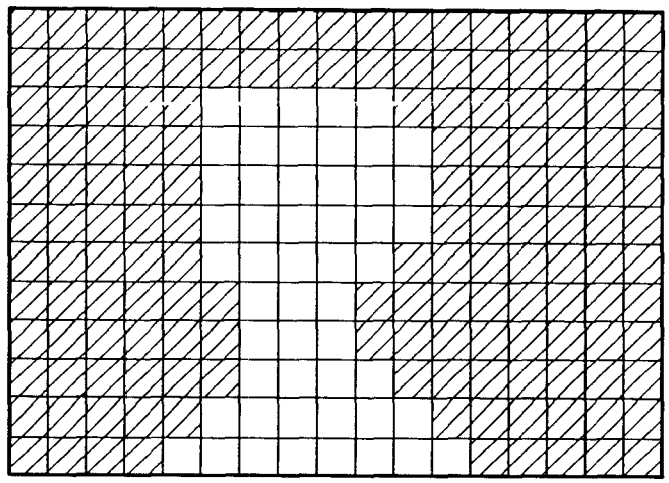

The shape code decoder 2403 decodes binary information that represents the object shape. In this embodiment, shape data shown in, e.g., FIG. 25B will be exemplified as such shape information.

Since the decoded shape information serves as ROI mask information, it is input to the mask encoder 2412, and is encoded according to the JPEG2000 format.

Figure 25C:
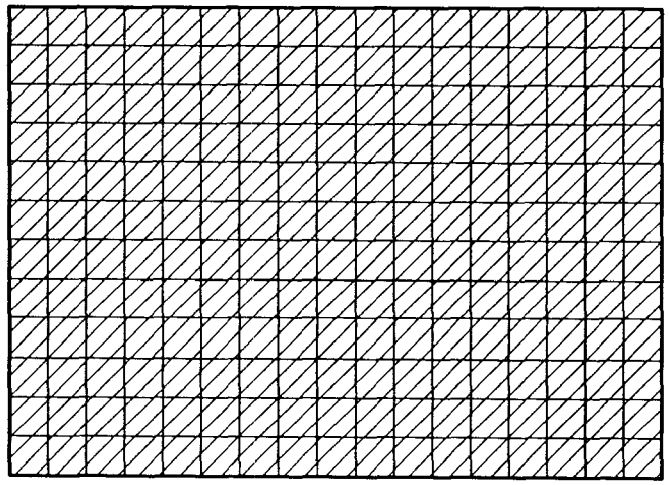

The texture decoder 2404 decodes the object texture. In this embodiment, texture shown in FIG. 25A will be exemplified as an example of the shape information. The texture decoder 2405 decodes the background texture. In this embodiment, texture shown in FIG. 25C will be exemplified as an example of the shape information. The image composition unit 2407 composites the object texture with the background image texture in accordance with the shape information decoded by the shape code decoder 2403.

FIG. 18 mentioned previously shows this process. The discrete wavelet transformer 2408 computes the discrete wavelet transforms of the composite image data.

The quantizer 2409 receives the output from the discrete wavelet transformer 2408, and quantizes it by predetermined quantization coefficients. The quantization result of the quantizer 2409 is input to the bit shift unit 2410. Also, the number of bits required to express the quantization result is input to the multiplexer 2414.

The bit shift unit 2410 prepares bit planes, the number of which is twice the number of bits computed by the quantizer 2409, while setting the region of the background texture corresponding to the object as a region of interest on the basis of the quantization result input from the quantizer 2409 and the shape information input from the shape code decoder 2403, and shifts the object portion to upper bits in accordance with the shape information from the shape code decoder 2403. FIG. 19 shows this process taking an LL frequency band as an example.

In this manner, the bit shift unit 2410 stuffs the quantization result of the background texture in the lower bits of a region that does not overlap the object, and stuffs "0"s in their upper bits on the basis of the shape information. Also, the bit shift unit 2410 outputs the quantization result of the object to the upper bits of the overlapping region, and stuffs "0"s in their lower bits.

The bit plane composition unit 2411 reads out the audio encoded data for one frame interval from the audio buffer to the lower bits at the position of the object on the basis of the image data input from the bit shift unit 2410 and the shape information decoded by the shape code decoder 2403, and replaces the lower bits by the audio encoded data for each bit in the order of scan lines.

A process until the bit data shown in FIG. 19 is generated will be briefly explained below. In order to encode both the object and background, the object and background texture corresponding to a region outside the object region are composed, and the composite data undergoes frequency transformation to generate transform coefficients. Of these transform coefficients, bits corresponding to the object region are shifted to upper bit plane, and "0" bits are stuffed in the blank fields 202 outside the object region, which are generated by the bit shift process. In addition, the audio encoded data for one frame time is stuffed in the blank fields 203 within the object region, which are generated by the bit shift process.

The entropy encoder 2413 encodes bit planes in turn from the MSB side, and supplies the encoding result to the multiplexer 2414. The multiplexer 2414 shapes the input data to encoded data according to the JPEG2000 format.

Figure 26:
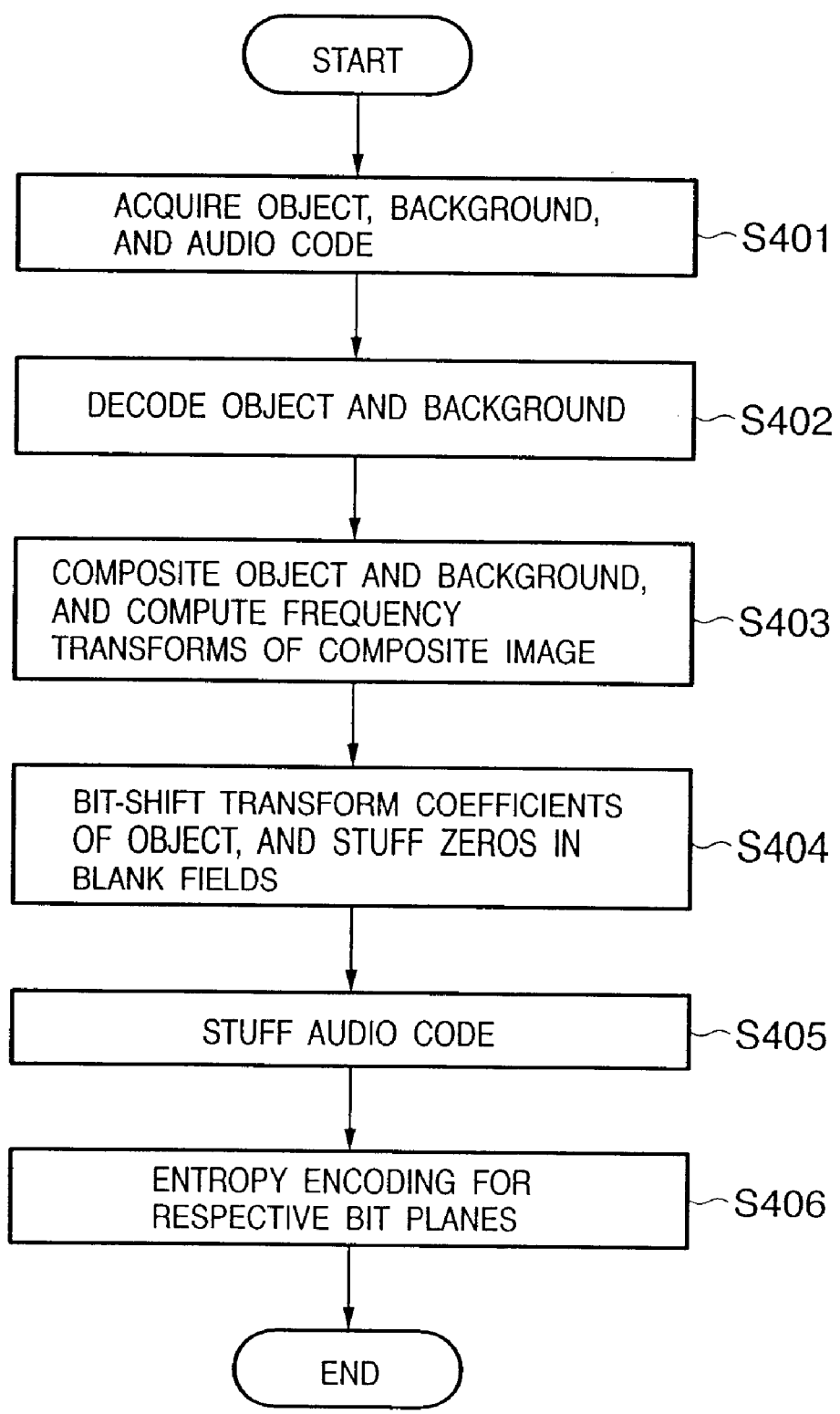
FIG. 26 is a flow chart for explaining an image encoding process according to the 11th embodiment of the present invention.

The process until encoding according to the 11th embodiment of the present invention will be explained below with reference to the flow chart shown in FIG. 26.

In step S401, the object, background, and audio encoded data are acquired to decode the MPEG-4 encoded data. The flow advances to step S402 to decode these object, background. In step S403, the object and background are composed, and the composite image undergoes frequency transformation to generate transform coefficients. The flow advances to step S404 to bit-shift bits corresponding to the object region of these transform coefficients to upper bit planes, and to stuff "0" bits in the blank fields 202 (FIG. 19) outside the object region, which are generated by the w bit shift process. The flow advances to step S405 to stuff the audio encoded data in the blank fields 203 (FIG. 19) within the object region, which are generated by the bit shift process. Finally, the flow advances to step S406 to encode the bit data shown in FIG. 19 obtained in this way in turn from a bit plane on the MSB side by entropy coding.

Figure 27:
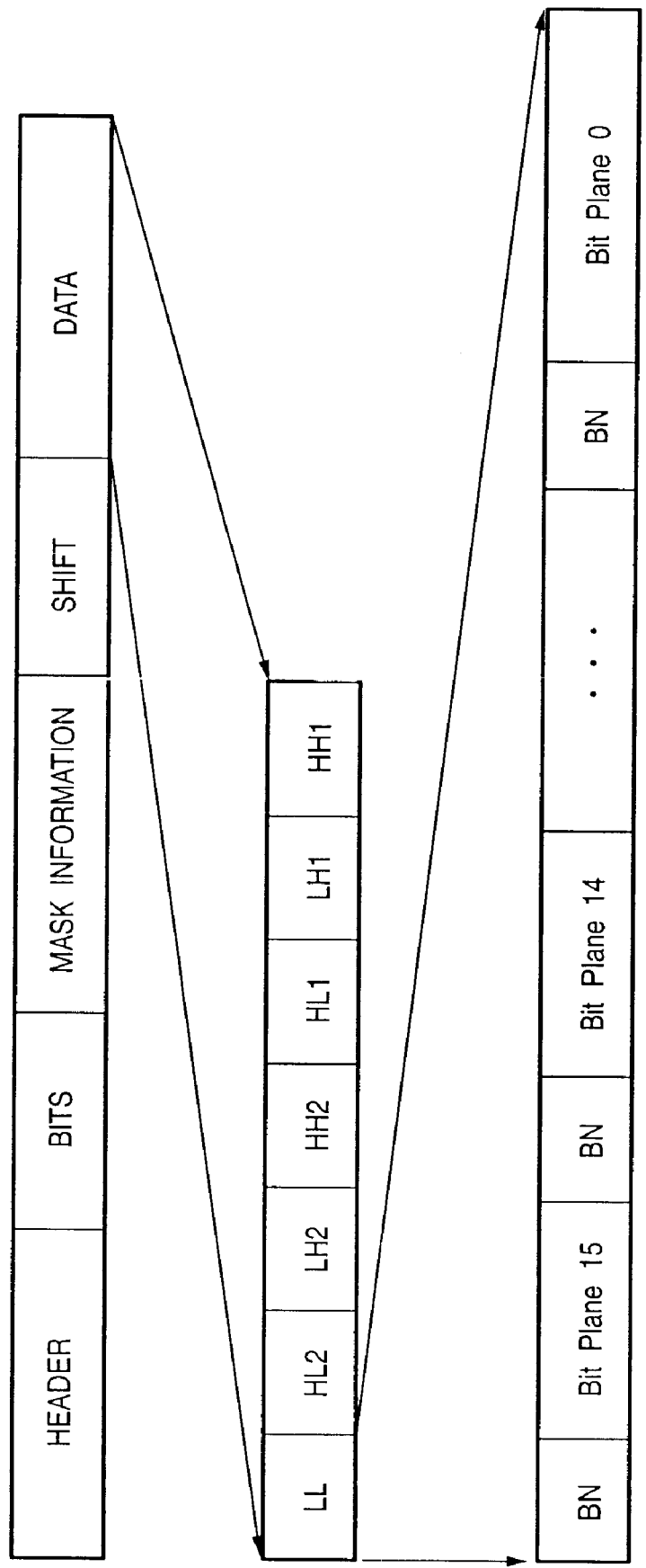
FIG. 27 is a view for explaining encoded data in an embodiment of the present invention.

FIG. 27 shows an output example of the encoded data obtained by the aforementioned encoding process.

In FIG. 27, a header including a code which indicates information of the size of the encoded image or the like is followed by a BITS code indicating the number of bit planes. Then, the encoding result of the mask information output from the mask encoder 2412 appears, and a SHIFT code indicating the presence of audio encoded data in the lower bits of the object then follows. The entropy encoding result is separated into subbands (LL to HH1), each of which consists of encoded data for 16 bit planes. The multiplexed encoded data is externally output via the code output unit 2415.

With a series of operations mentioned above, audio encoded data can be appended to image data in which only "0"s are stuffed in the conventional process, and the audio information can be reproduced in synchronism with a reproduced moving image.

In the 11th embodiment, MPEG-4 encoded data is input, and JPEG2000 encoded data is output. However, the present invention is not limited to such specific data.

Furthermore, in the 11th embodiment, the quantizer 2409 is provided to improve coding efficiency. However, the quantizer may be omitted to obtain reversible codes free from any deterioration.

In the 11th embodiment, audio data is exemplified as data to be appended, but other kinds of information may be appended.

In the aforementioned arrangement, some or all functions may be implemented by software or the like.

[12th Embodiment]

Figure 28:
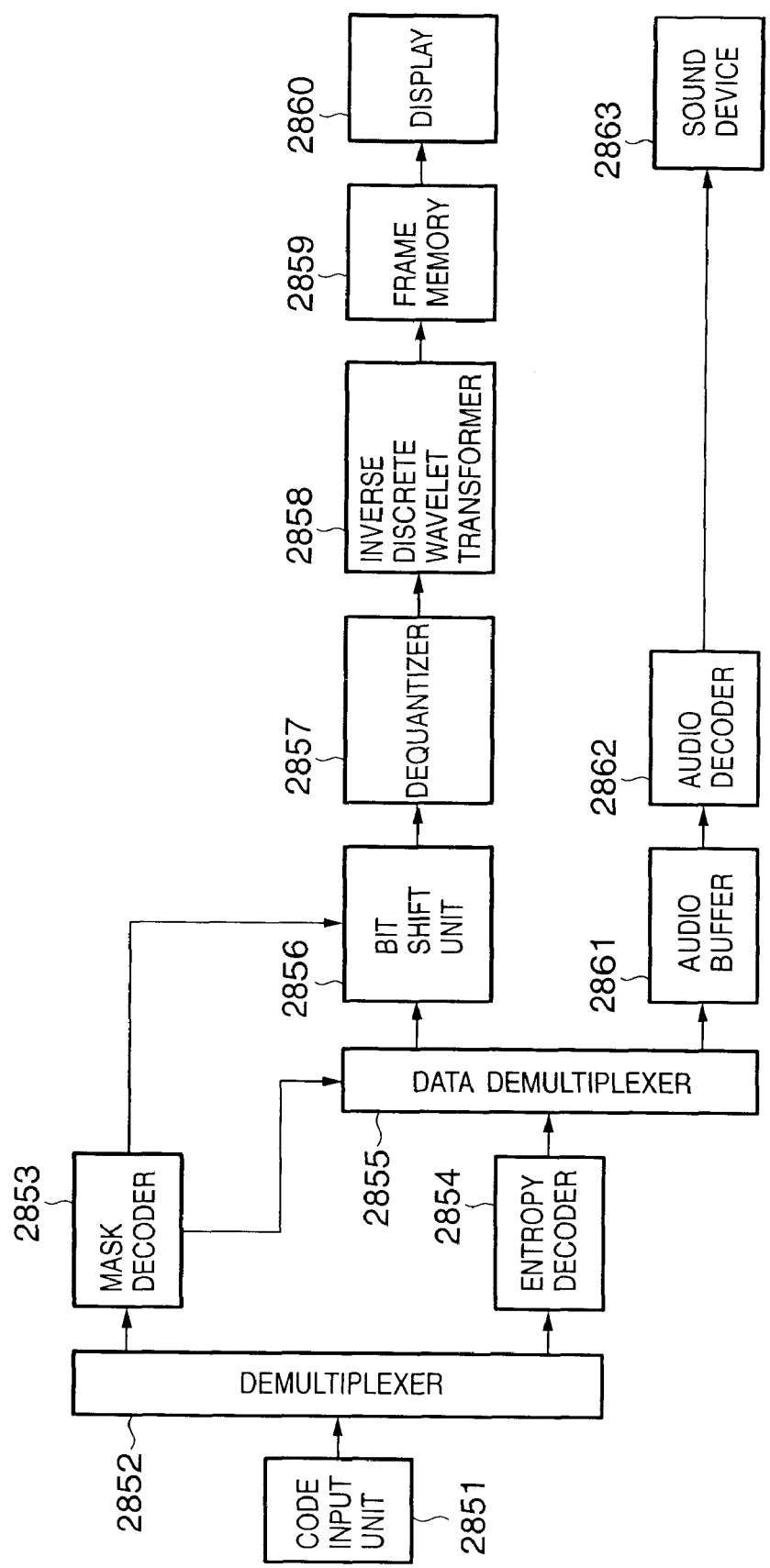
FIG. 28 is a block diagram showing the arrangement of an image processing apparatus according to the 12th embodiment of the present invention.

FIG. 28 is a block diagram showing the arrangement of an image processing apparatus according to the 12th embodiment of the present invention. The 12th embodiment will explain a case wherein JPEG2000 encoded data generated by the 11th embodiment is input, and a moving image is reproduced.

Referring to FIG. 28, reference numeral 2851 denotes a code input unit for inputting JPEG2000 encoded data generated by the 11th embodiment. Reference numeral 2852 denotes a demultiplexer for demultiplexing the input encoded data, and supplying the demultiplexed data to respective units. Reference numeral 2853 denotes a mask decoder for decoding mask information which represents the ROI shape and position, a BITS code that indicates the number of bits of the entire data, and a SHIFT code. Reference numeral 2854 denotes an entropy decoder for decoding encoded data in units of bit planes. Reference numeral 2855 denotes a data demultiplexer for demultiplexing encoded data into bit planes of the ROI portion, bit planes of the remaining portion (background portion), and audio encoded data, and outputting them to a bit shift unit 2856 and audio buffer 2861. The bit shift unit 2856 bit-shifts the ROI portion in the lower (LSB) direction. A dequantizer 2857 dequantizes the quantization result of the quantizer 2409. Reference numeral 2858 denotes an inverse discrete wavelet transformer for making inverse discrete wavelet transformation of the discrete wavelet transformation in the discrete wavelet transformer 2408. Reference numeral 2859 denotes a frame memory for storing decoded image data. Reference numeral 2860 denotes a display for displaying the contents of the frame memory 2859. Reference numeral 2861 denotes an audio buffer for storing the audio encoded data demultiplexed by the data demultiplexer 2855. Reference numeral 2862 denotes an audio decoder for decoding audio data. Reference numeral 2863 denotes a sound device for converting the decoded audio data into audible sound, and reproducing the sound.

In the aforementioned arrangement, the code input unit 2851 inputs encoded data generated by the 11th embodiment. The input encoded data is input to the demultiplexer 2852 to decode a header, thus acquiring required information and supplying such information to respective units. Furthermore, encoded data of a BITS code, SHIFT code, and mask information are input to the mask decoder 2853, and the remaining data is input to the entropy decoder 2854.

The mask decoder 2853 decodes the SHIFT code to check if audio encoded data is appended to the lower bits of the ROI portion. If it is determined that no audio encoded data is appended, a normal ROI process of JPEG2000 is executed. On the other hand, if it is determined that audio encoded data is appended, that audio encoded data is demultiplexed to reproduce audio.

A case will be explained first wherein audio encoded data is appended.

The mask decoder 2853 decodes mask information indicating the ROI shape and position, and the BITS code indicating the number of bits of the entire data.

On the other hand, the entropy decoder 2854 decodes bit planes in turn from the MSB side, and inputs the decoding result to the data demultiplexer 2855. FIG. 19 shows bit plane data decoded in this way. In FIG. 19, texture data of the object 200 and data 202 stuffed with "0"s are input to the bit shift unit 2856.

The texture data 204 of the background image in FIG. 19, and stuffed audio encoded data 203 are demultiplexed in accordance with the shape information decoded by the mask decoder 2853, and are respectively supplied to the bit shift unit 2856 and audio buffer 2861.

The bit shift unit 2856 shifts the bits of the ROI portion to the LSB side to generate bit data shown in FIG. 18, and inputs that data to the dequantizer 2857. The dequantizer 2857 executes dequantization of the quantization of the quantizer 2409 (FIG. 24), and its dequantization result is supplied to the inverse discrete wavelet transformer 2858. The inverse discrete wavelet transformer 2858 reconstructs texture data by computing the inverse discrete wavelet transforms of the inputs, and stores it in the frame memory 2859. The image data stored in this manner is displayed on the display 2860. At the same time, the audio encoded data stored in the audio buffer 2861 is decoded by the audio decoder 2862 and is reproduced by the sound device 2863.

A case will be described below wherein the mask decoder 2853 determines that no audio encoded data is appended.

In this case, the mask decoder 2853 controls not to operate the data demultiplexer 2855, audio buffer 2861, audio decoder 2862, and sound device 2863. The bit shift unit 2856 is controlled to execute a normal ROI process of JPEG2000.

The mask decoder 2853 decodes mask information indicating the ROI shape and position, and the BITS code indicating the number of bits of the entire data. The entropy decoder 2854 decodes bit planes in turn from the MSB side, and inputs the decoding result to the bit shift unit 2856 via the data demultiplexer 2855. The bit shift unit 2856 receives the bit plane data similar to that shown in FIG. 19. In this case, "0"s are stuffed in place of the audio encoded data 203 in FIG. 19.

In FIG. 19, the texture data 200 of the object is shifted to the lower bits in accordance with the shape information and the number of bits decoded by the mask decoder. The bit plane data at that time has the bit plane configuration shown in FIG. 18.

The dequantizer 2857 dequantizes the input that has undergone the bit shift process toward the LSB side, and the inverse wavelet transformer 2858 computes the inverse discrete wavelet transforms. The image data that has undergone the inverse discrete wavelet transformation is stored in the frame memory 2859. The image data stored in the frame memory 2859 in this way is displayed by the display 2860.

As the characteristic feature of the ROI, even when this decoding process is aborted, an image can be reclaimed by decoding only upper bits irrespective of the presence/absence of audio data.

The aforementioned process until reproduction will be explained below with reference to the flow chart shown in FIG. 29.

Figure 29:
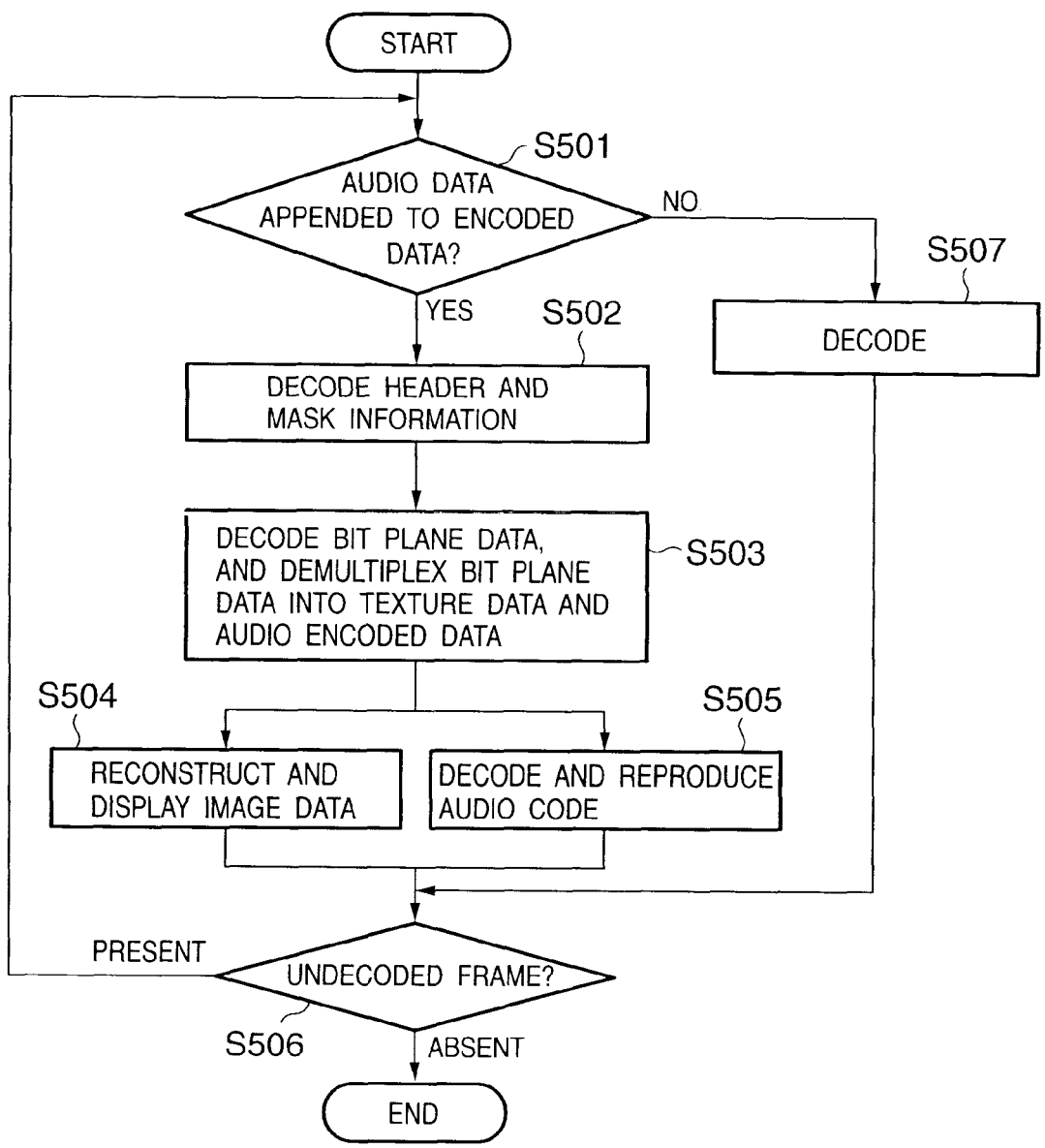
FIG. 29 is a flow chart showing a decoding process according to the 12th embodiment of the present invention.

Referring to FIG. 29, in step S501 JPEG2000 encoded data is read out to decode the SHIFT code, and to check if audio encoded data is appended. If it is determined that no audio encoded data is appended, the flow advances to step S507 to execute a normal decoding process of JPEG2000 encoded data, thus reclaiming image data.

On the other hand, if it is determined in step S501 that audio encoded data is appended, the flow advances to step S502 to decode a header and mask information contained in that encoded data. The flow advances to step S503 to decode bit plane data, and to demultiplex them into texture data and audio encoded data. The flow advances to step S504 to reconstruct and display the texture data on the display 2860. At the same time, the audio encoded data is decoded and the audio data is reproduced by the sound device 2863 in step S505. Finally, it is checked in step S506 if all frames have been processed. If frame data to be decoded still remain, the flow returns to step S501 to repeat the aforementioned process; if all frame data have been decoded, this process ends.

With a series of operations mentioned above, both image and audio data can be reproduced while maintaining compatibility to the conventional JPEG2000 encoded data.

In the 12th embodiment, JPEG2000 encoded data is input, but the present invention is not limited to such specific data. In the above arrangement, some or all functions may be implemented by software or the like.

[13th Embodiment]

Figure 30:
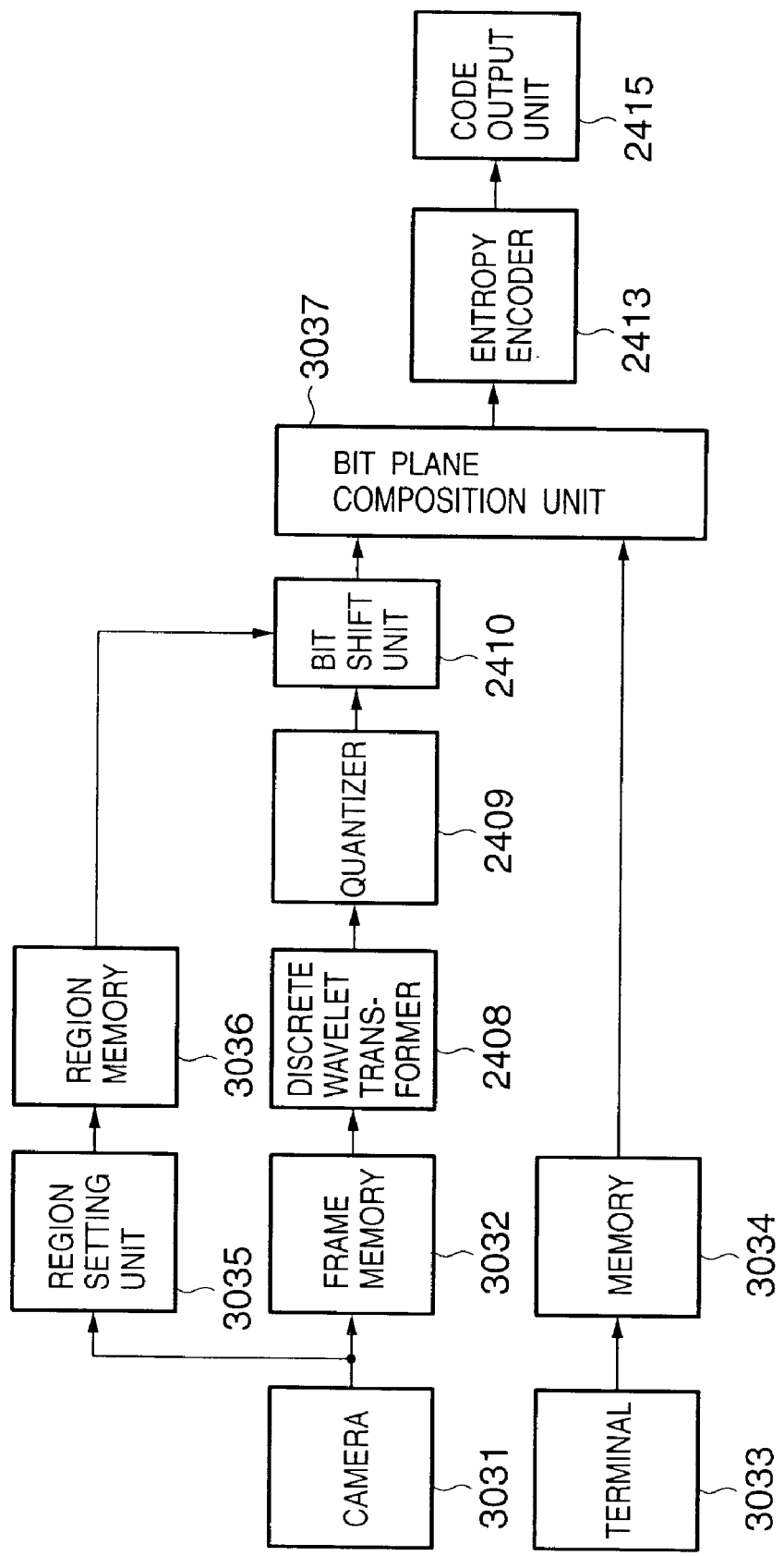
FIG. 30 is a block diagram showing the arrangement of an image processing apparatus according to the 13th embodiment of the present invention.

FIG. 30 is a block diagram showing the arrangement of an image processing apparatus according to the 13th embodiment of the present invention. Note that the same reference numerals denote the same building components as in the 11th embodiment above, and a detailed description thereof will be omitted. The 13th embodiment will exemplify a case wherein image data sensed by a camera 3031 is input and encoded, information which is helpful in, e.g., search is appended to the encoded data, and that encoded data is output.

Referring to FIG. 30, reference numeral 3031 denotes a camera for generating an image signal by capturing an image. Reference numeral 3032 denotes a frame memory for storing the captured image data in units of frames. Reference numeral 3033 denotes a terminal at which the user inputs information helpful in search. The user can input from this terminal 3033 meta information such as information that pertains to the image sensing date, place, photographer, image sensing condition, and object upon sensing an image using the camera 3031. Reference numeral 3034 denotes a memory for storing information input from the terminal 3033. Reference numeral 3035 denotes a region setting unit for displaying image data captured by the camera 3031 and allowing the user to set a region of interest (ROI) using an input device such as a digitizer or the like. The ROI is an image region which is to be preferentially encoded/decoded. Reference numeral 3036 denotes a region memory for holding ROI information set by the region setting unit 3035. Reference numeral 3037 denotes a bit plane composition unit for composing the contents of the memory 3034 with image data by stuffing the contents in the lower bits of the ROI in accordance with the number of bits which form bit planes, and the contents of the region memory 3036.

The operation of the image processing apparatus with the above arrangement will be described below.

Image data captured by the camera 3031 is temporarily stored in the frame memory 3032, and that image is displayed on the region setting unit 3035. When the user designates the region of interest (ROI) using the region setting unit 3035 with reference to the displayed image, data indicating the ROI is stored in the region memory 3036. The discrete wavelet transformer 2408 computes the discrete wavelet transforms of the contents of the frame memory 3032, and the quantizer 2409 quantizes the computed transform coefficients. The bit shift unit 2410 bit-shifts the transform coefficients contained inside the ROI to the MSB side in accordance with the region information which is set and stored in the region memory 3036.

At the same time, the user inputs from the terminal 3033 information that pertains to the date, place, photographer, image sensing condition, and object upon sensing the image using the camera 3031, and stores that information in the memory 3034.

The bit plane composition unit 3037 writes the meta information supplied from the memory 3034 in the lower bits, which are left blank after the transform coefficients contained in the ROI are shifted, bit by bit in the order of scan lines, thus generating composite data of the transform coefficients of image data and meta information, as in the 11th embodiment. The entropy encoder 2413 encodes these data, and externally outputs the encoded data via the code output unit 2415.

An output example of the encoded data obtained by the aforementioned encoding process is the same as that shown in FIG. 8.

Referring to FIG. 8, reference numeral 801 denotes a header containing a code which indicates information of the size of the encoded image or the like. Reference numeral 802 denotes a BITS code as the encoding result of the number of bit planes. Reference numeral 803 denotes data that stores the entropy encoding result of each bit plane. The entropy encoding result is separated into bit planes, each of which consists of encoded data for respective subbands.

As described above, according to the 13th embodiment, encoded data obtained by appending information required for search to captured image data can be generated while maintaining compatibility to the conventional JPEG2000 encoded data.

In the 13th embodiment, the quantizer 2409 is provided to improve coding efficiency. However, the quantizer 2409 may be omitted to obtain reversible codes free from any deterioration.

In the 13th embodiment, meta information is exemplified as data to be appended. However, the present invention is not limited to such specific data. For example, audio data may be appended as in the 11th embodiment, or other kinds of information may be appended. In the aforementioned arrangement, some or all functions may be implemented by software or the like.

[14th Embodiment]

Figure 31:
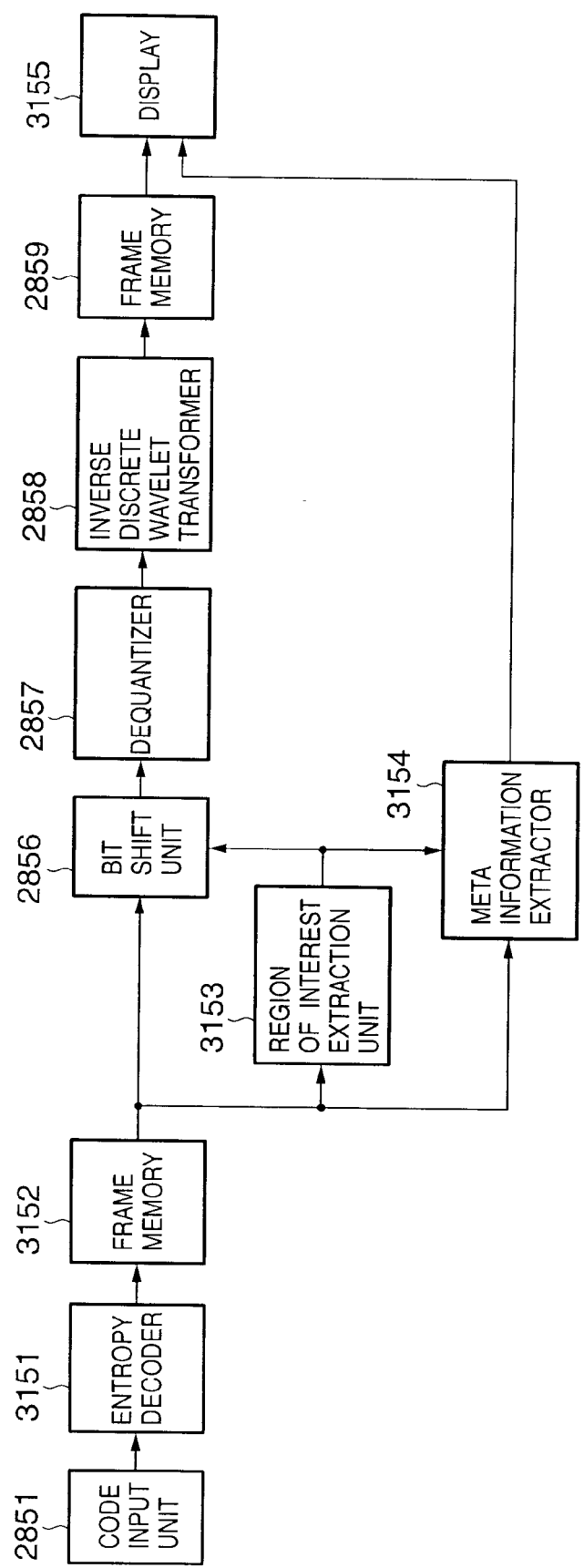
FIG. 31 is a block diagram showing the arrangement of an image processing apparatus according to the 14th embodiment of the present invention.

FIG. 31 is a block diagram showing the arrangement of an image processing apparatus according to the 14th embodiment of the present invention. Note that the same reference numerals denote the same building components as in the 12th embodiment (FIG. 28), and a detailed description thereof will be omitted. The 14th embodiment will explain a case wherein JPEG2000 encoded data generated by the 13th embodiment is input, and an image is reproduced.

Referring to FIG. 31, reference numeral 3151 denotes an entropy decoder for decoding encoded data of a header and bit planes. Reference numeral 3152 denotes a frame memory for storing image data decoded by the entropy decoder 3151. Reference numeral 3153 denotes an ROI extraction unit for extracting an ROI from the contents of the frame memory 3152. Reference numeral 3154 denotes a meta information extractor for extracting meta information from the contents of the frame memory 3152. Reference numeral 3155 denotes a display for displaying image data and meta information.

In such arrangement, the code input unit 2851 inputs encoded data generated by the 13th embodiment above. The input encoded data is supplied to the entropy decoder 3151 to decode a header and BITS code, thus obtaining required information. Then, the encoded data is decoded into bit plane data, which are stored in the frame memory 3152.

The ROI extraction unit 3153 reads out bit planes obtained by encoding the ROI on the basis of the number of bits obtained by decoding the BITS code, and determines the ROI by collecting pixels with nonzero values. Therefore, by replacing pixels with nonzero values by "1", and pixels with values "0" by "0", binary information indicating the ROI can be extracted. The extracted ROI information is input to the bit shift unit 2856 and metal information extractor 3154.

The bit shift unit 2856 shifts the ROI data toward the LSB side as in the 12th embodiment, the dequantizer 2857 dequantizes the shifted data, and the inverse discrete wavelet transformer 2858 reconstructs image data. The reconstructed image data is stored in the frame memory 2859.

On the other hand, the meta information extractor 3154 reconstructs meta information by reading out the meta information in the lower bits of the ROI in the order of bit planes and scan lines. The reconstructed image data and meta information are input to the display 3155, which displays the image and meta information.

As a characteristic feature of the ROI, even when this decoding process is aborted, an image can be reproduced by decoding only upper bits irrespective of the presence/absence of audio data. With a series of operations mentioned above, both image data and meta information can be reconstructed while maintaining compatibility to the conventional JPEG2000 encoded data. In this way, many kinds of information can be provided to the user, and search can be easily made using, e.g., keywords.

In the 14th embodiment, JPEG2000 encoded data is input, but the present invention is not limited to such specific data. In the 14th embodiment, text information is input from the terminal, but the present invention is not limited to such specific information. For example, meta information specified by MPEG-7 may be input. In the aforementioned arrangement, some or all functions may be implemented by software or the like.

[15th Embodiment]

An image processing apparatus according to the 15th embodiment of the present invention will be explained below. This image processing apparatus has the same arrangement as that shown in FIG. 10.

The operation for converting still image data stored in the storage unit 504 into JPEG2000 encoded data by the CPU 500 will be explained below with reference to the flow chart shown in FIG. 32.

In step S601, image data selected at the terminal 506 is read out from the storage unit 504, and is stored in the image area of the memory 501. The flow advances to step S602 to display an image based on the image data on the monitor 505, and make the user set an ROI of that image from the terminal 506 using, e.g., a digitizer or the like. As the ROI, a shape data field is assured on the memory 501, and shape data which assumes "1" for pixels inside the ROI and "0" for other pixels is stored as binary shape information. The flow advances to step S603 to make the user input security information such as copyright information or the like from the terminal 506. This security information is, e.g., a password, based on which an encryption key is generated. Also, the copyright information is encrypted, and that encrypted data is stored in a data area assured on the memory 501 for respective bits. Let bs (bits) be the information volume at that time.

The flow advances to step S604 to assure ROI and BG fields on the image area on the memory 501, and to store image data contained in the ROI in the ROI field in accordance with the shape data field. Also, image data outside the ROI is stored in the BG field. As a result, a composite image of the texture data 200 in FIG. 19 and the blank fields 202 outside the ROI is obtained.

The flow advances to step S605 to scramble the image data in the BG field in accordance with the aforementioned password. The flow advances to step S606 to encode the entire image data by JPEG2000. The encoded data is saved or sent in step S607.

Figure 32:
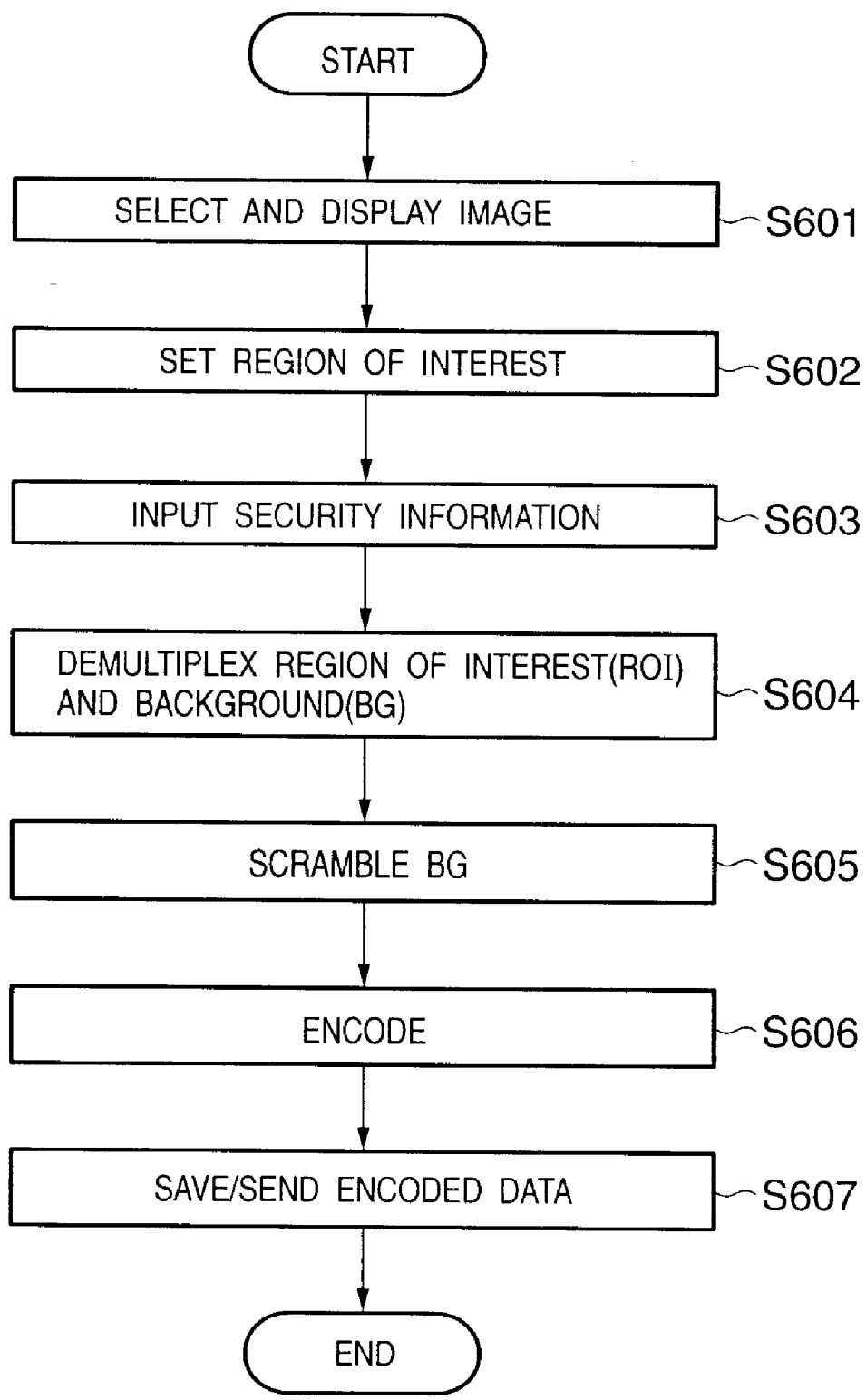
FIG. 32 is a flow chart for explaining an image encoding process according to the 15th embodiment of the present invention.
Figure 33:
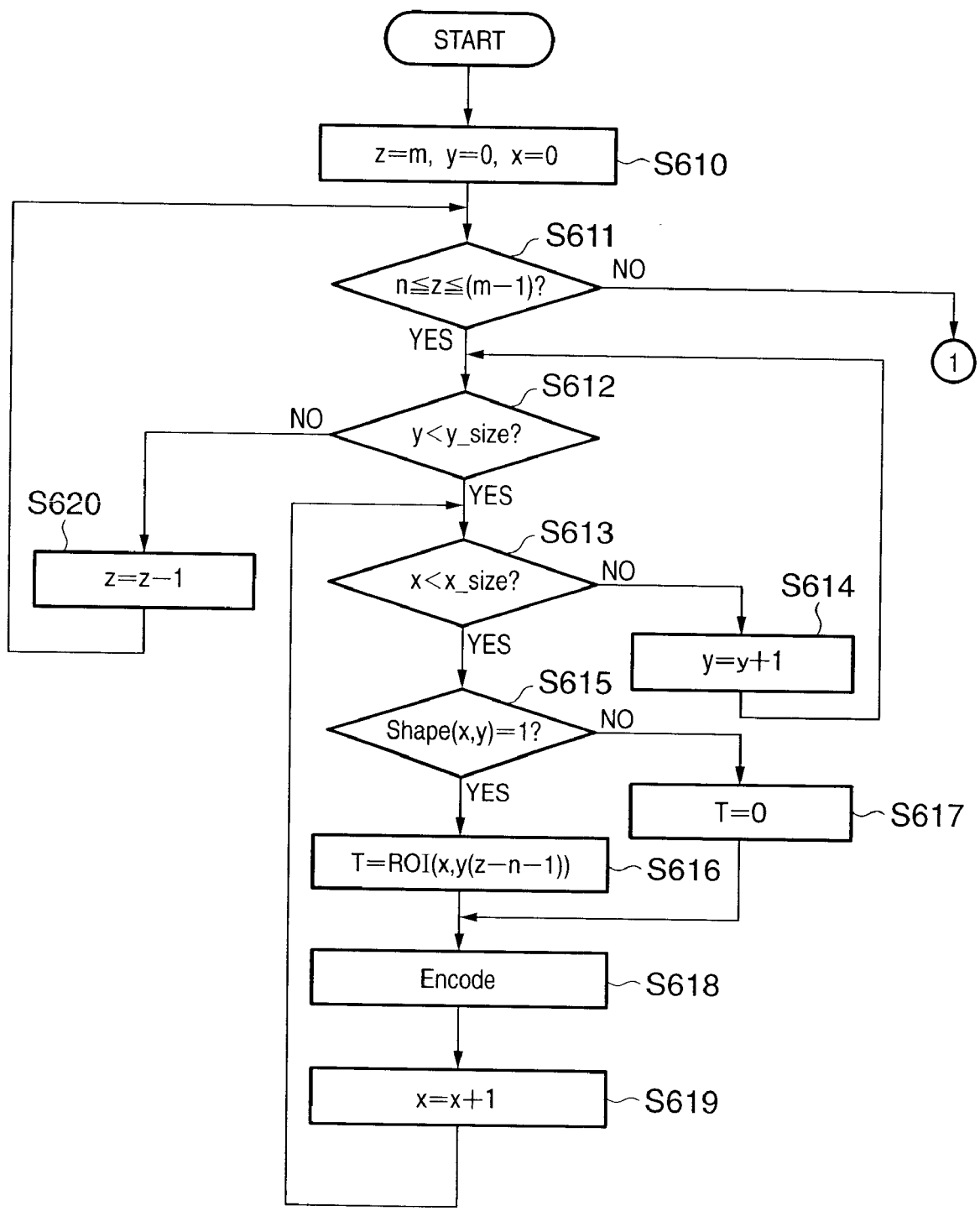
FIGS. 33 and 34 are flow charts showing the process in step S606 in FIG. 32.
Figure 34:
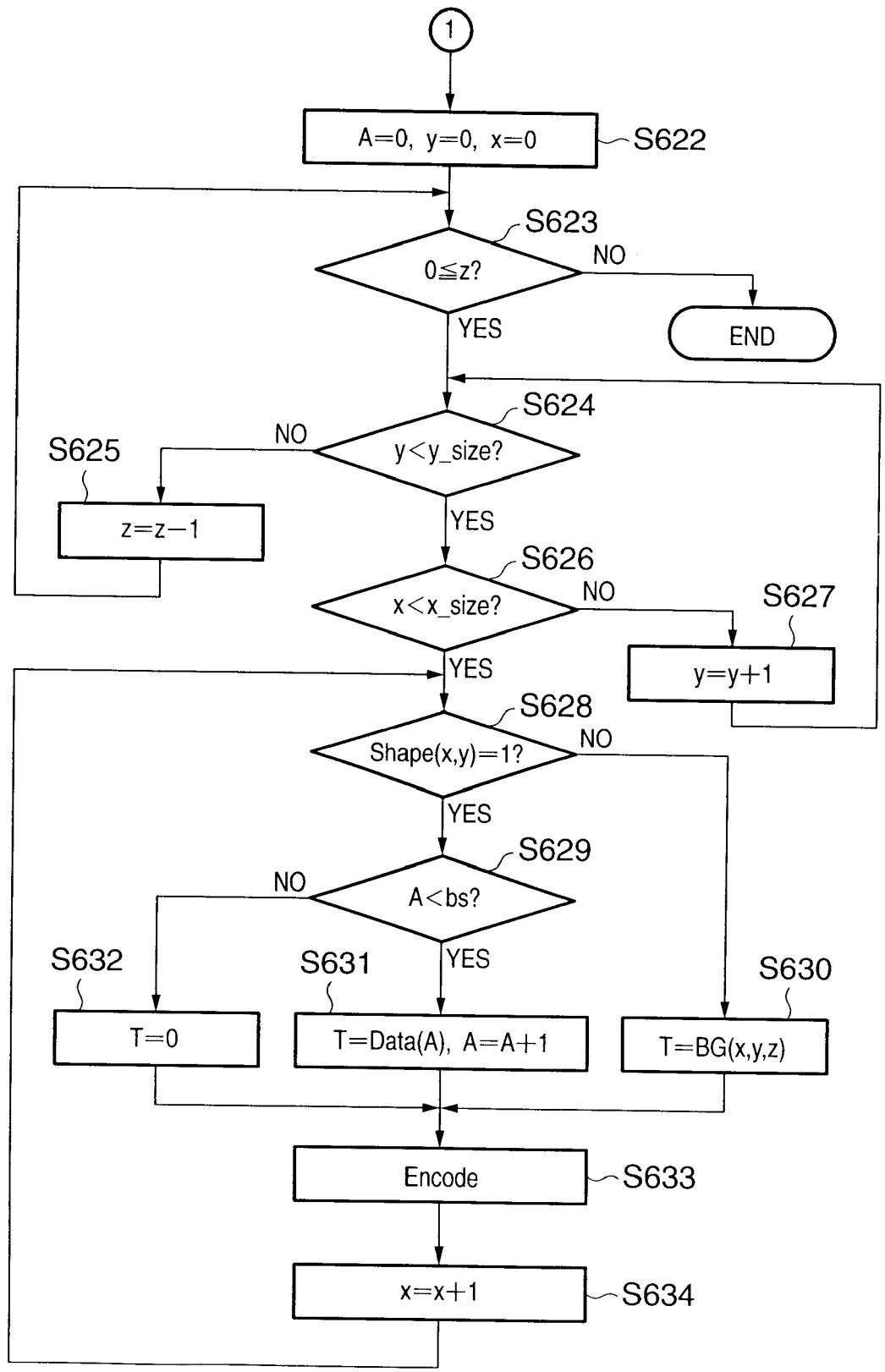

FIGS. 33 and 34 are flow charts showing the encoding process in step S606 in FIG. 32. Let n be the bit depth of the BG field, and m be the bit depth of the entire image data in the BG and ROI fields (see FIG. 19). Also, let x_size and y_size be the sizes of the image in the main scan and sub-scan directions.

In step S610, "m" is substituted in a variable z for counting the bit depth, "0" in a variable x that indicates the pixel position in the main scan direction, and "0" in a variable y indicating the pixel position in the sub-scan direction. The flow advances to step S611 to check if the variable z falls within the range between "n" and "m−1". If the variable z falls within this range, the flow advances to step S612; otherwise, it is determined that the ROI process ends, and the flow advances to step S622 (FIG. 34).

It is checked in step S612 if y<y_size. If NO in step S612, the flow advances to step S620. Since the process for all the bits of the bit plane to be processed is complete, z is decremented by "1", and the flow returns to step S611.

If y≧y_size in step S612, the flow advances to step S613 to check if x<x_size. If YES in step S613, the flow advances to step S615; otherwise, the flow advances to step S614. In step S614, since the process for all the bits of the bit plane to be processed in the main scan direction is complete, y is incremented by "1", and the flow returns to step S612.

On the other hand, if y<y_size in step S612, corresponding pixel information in the shape data field (Shape(x, y)) on the memory 501 is read out in step S615. If that pixel data is "1", the flow advances to step S616; otherwise, the flow advances to step S617. In step S616, since the pixel to be processed falls within the ROI, the corresponding bit of the corresponding pixel in the ROI is substituted in a variable T. In step S617, since the pixel to be processed falls outside the ROI, "0" is substituted in the variable T.

Upon completion of step S616 or S617, the flow advances to step S618 to encode the pixel by JPEG2000. The flow advances to step S619, and x is incremented by "1". The flow then returns to step S613 to compare x with x_size.

If the variable z falls outside the range from "n" to "m−1" in step S611, the flow advances to step S622 to substitute "0" in x and y, and a variable A for counting the number of bits of the data field on the memory 501. The flow advances to step S623 to check if z≧"0". If YES in step S623, the flow advances to step S624; otherwise, it is determined that the encoding process for the entire image is complete, and the operation ends.

If y<y_size in step S624, the flow advances to step S626; otherwise, the flow advances to step S625. Since the process for all the bits of the bit plane to be processed is complete, z is decremented by "1", and the flow returns to step S623. It is checked in step S626 if x<x_size. If YES in step S626, the flow advances to step S628; otherwise, the flow advances to step S627. Since the process for all the bits of the bit plane to be processed in the main scan direction is complete, y is incremented by "1", and the flow returns to step S624.

In step S628, the corresponding pixel information (Shape (x, y)) of the shape data field is read out. If that information is "1", the flow advances to step S629; otherwise, the flow advances to step S630. In step S630, since the pixel to be processed falls outside the ROI, the corresponding bit (BG (x, y, z)) of the corresponding pixel in the BG field is substituted in the variable T. It is checked in step S629 if A<bs. If YES in step S629, the flow advances to step S631; otherwise, the flow advances to step S632. In step S631, since the bit to be processed is encrypted data, the A-th bit of the data field is substituted in the variable T, and the variable A is incremented by +1. If A≧bs, the flow advances to step S632, and since the encrypted data has been processed, "0" is substituted in the variable T.

Upon completion of the process in step S630, S631, or S632, the flow advances to step S633 to encode the pixel by JPEG2000. The flow advances to step S634 to increment the variable x by "1", and the flow returns to step S628 to compare the variable x with x_size.

If it is determined in step S623 that the process for all the bits is complete, the encoding process ends. The encoded data generated in this way is stored or saved in the storage unit 504, and is output onto the communication line 508 via the communication interface 507 in accordance with a user's instruction.

With a series of operations mentioned above, copyright information can be efficiently appended to image data while maintaining compatibility to the conventional JPEG2000 encoded data. In this way, many kinds of information can be provided to the user, and copyright protection and security management of information can be easily implemented.

In the 15th embodiment, JPEG2000 encoded data is output as an encoding result. However, the present invention is not limited to such specific data. In the aforementioned arrangement, some or all functions may be implemented by hardware or the like.

[16th Embodiment]

Figure 35:
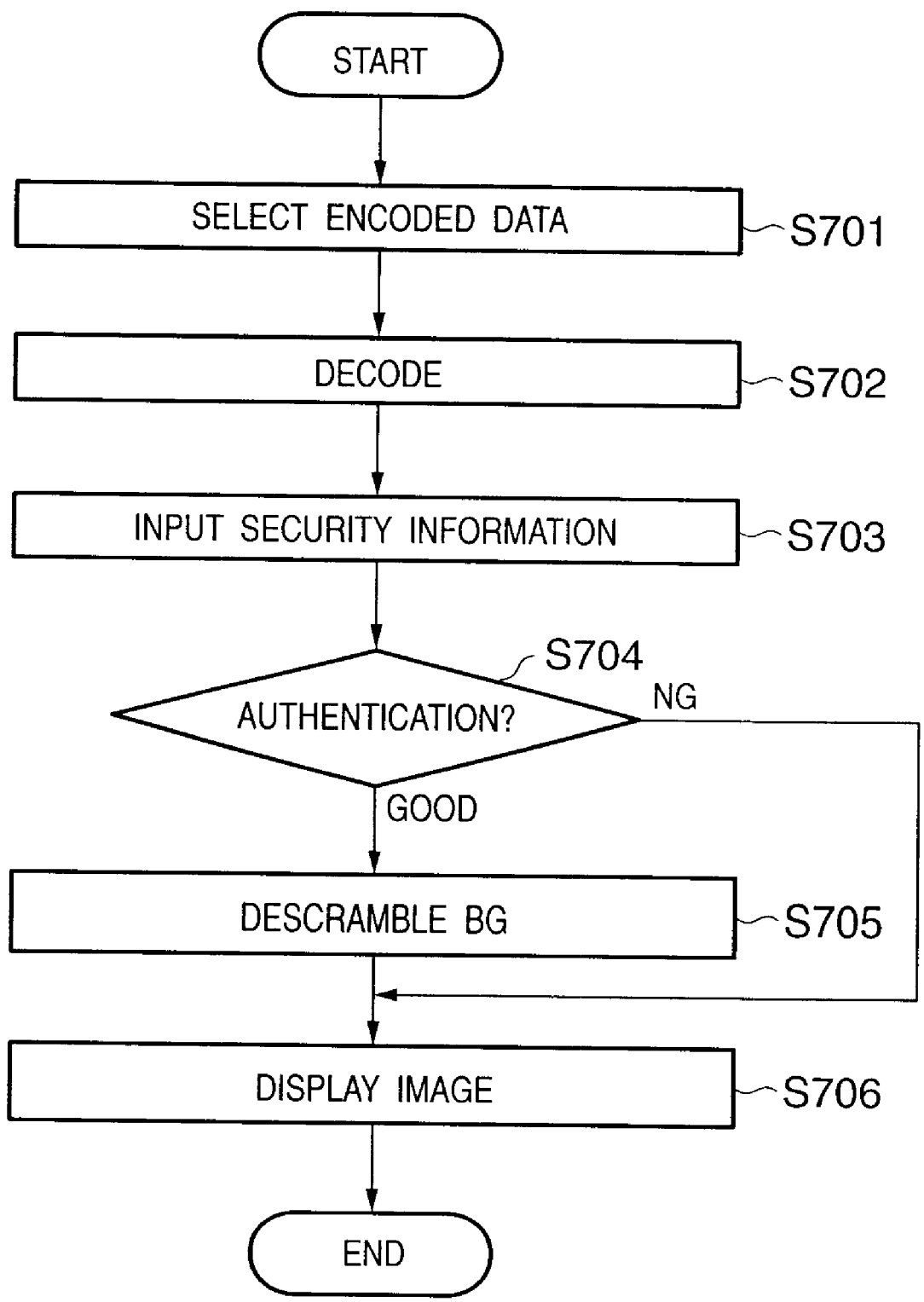
FIG. 35 is a flow chart for explaining an image encoding process according to the 17th embodiment of the present invention.

As the 16th embodiment of the present invention, the operation for decoding JPEG2000 encoded data, which is generated by the 15th embodiment using the arrangement of the image processing apparatus shown in FIG. 10, and is stored in the storage unit 504 will be described below with reference to the flow chart shown in FIG. 35.

In step S701, JPEG2000 encoded data selected at the terminal 506 is read out from the storage unit 504, and is stored in the code area of the memory 501. The flow advances to step S702 to decode the encoded data stored in the code area by JPEG2000.

Figure 36:
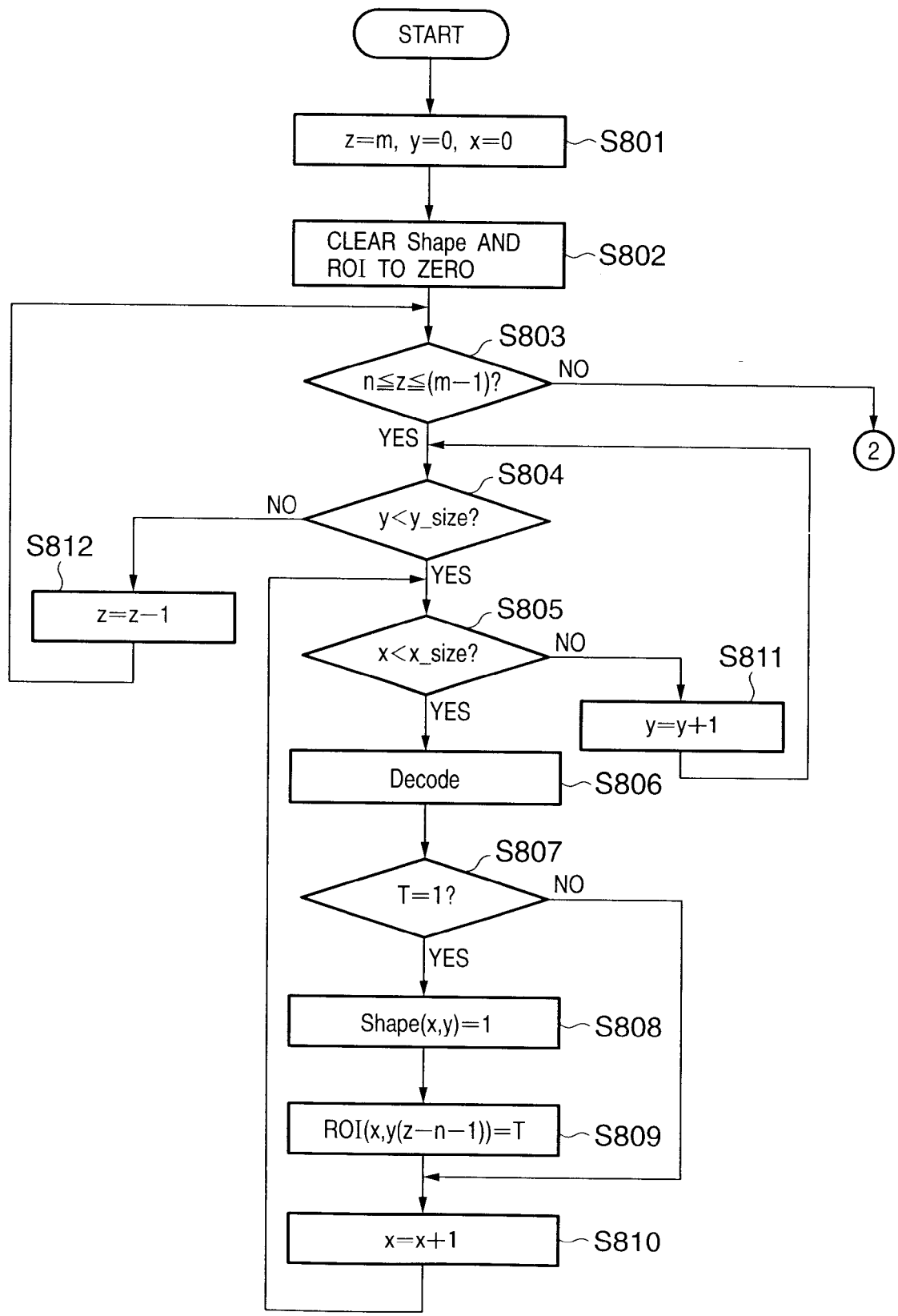
FIGS. 36 and 37 are flow charts showing a decoding process in step S702 in FIG. 35.
Figure 37:
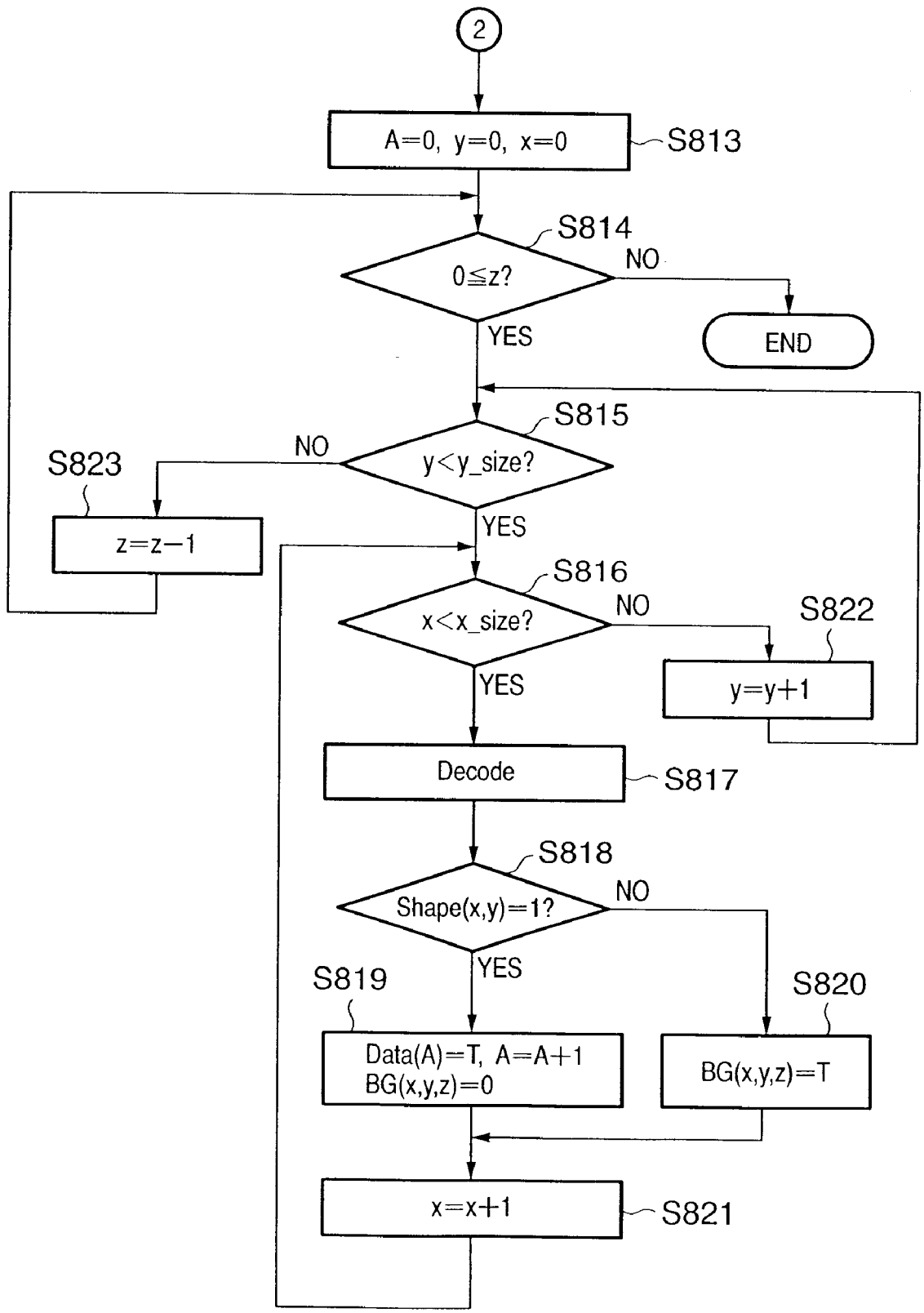

The decoding process in step S702 will be described below with reference to the flow charts shown in FIGS. 36 and 37.

In step S801, "m", "0", and "0" are respectively substituted in variables z, x, and y. The flow advances to step S802 to clear the shape data field and ROI field on the memory 501 to "0". The flow advances to step S803 to check if the variable z falls within the range from "n" to "m−1". If YES in step S803, the flow advances to step S804; otherwise, it is determined that the process of the ROI is complete, and the flow advances to step S813 (FIG. 37).

It is checked in step S804 if y<y_size. If YES in step S804, the flow advances to step S805; otherwise, the flow advances to step S812. Since the process for all the bits of the bit plane to be processed is complete, the variable z is decremented by "1", and the flow returns to step S803.

It is checked in step S805 if x<x_size. If YES in step S805, the flow advances to step S806; otherwise, the flow advances to step S811. Since the process for all the bits of the bit plane to be processed in the main scan direction is complete, the variable y is incremented by "1", and the flow returns to step S804. In step S806, T as 1-bit data is decoded by JPEG2000.

The flow advances to step S807, and if T="1", the flow advances to step S808 to write "1" in a bit of the corresponding pixel in the shape data field. On the other hand, if T≠"1", the flow advances to step S810. After step S808, the flow advances to step S809 to write "1" in bit information of the corresponding pixel in the ROI field. The flow then advances to step S810 to increment the variable x by "1", and the flow returns to step S805 to repeat the aforementioned process for comparing the variable x with x_size.

It is determined in step S803 that the variable z falls outside the range from "n" to "m−1", the flow advances to step S813 to substitute "0" in variables A, x, and y. The flow advances to step S814 to check if z≧"0". If YES in step S814, the flow advances to step S815; otherwise, it is determined that the decoding process for the entire image is complete, and the process ends.

It is checked in step S815 if y<y_size. If YES in step S815, the flow advances to step S816 to check if x<x_size. If y≧y_size in step S815, the flow advances to step S823 to decrement the variable z by "1" since the process for all the bits of the bit plane to be processed is complete. The flow then returns to step S814.

If x<x_size in step S816, the flow advances to step S817 to execute the decoding process; otherwise, the flow advances to step S822 to increment the variable y by "1", since the process for all the bits of the bit plane to be processed in the main scan direction is complete. The flow then returns to step S815.

After T as 1-bit data is decoded by JPEG2000 in step S817, the flow advances to step S818 to read out the corresponding pixel information of the data shape field of the memory 501. If the value of that information is "1", the flow advances to step S819. Since the pixel to be processed falls within the ROI, T is substituted in the A-th bit of the data field of the memory 501, the variable A is incremented by +1, and "0" is substituted in the corresponding bit of the corresponding pixel in the BG field. If the corresponding pixel information of the data shape field is not "1" in step S818, the flow advances to step S820. Since the pixel to be processed falls outside the ROI, T is substituted in the corresponding bit of the corresponding pixel of the BG field. Upon completion of the process in step S819 or S820, the flow advances to step S821 to increment the variable x by "1", and the flow returns to step S816 to compare the variable x with x_size, In this way, if it is determined in step S814 that the process for all the bits is complete, the decoding process ends.

Referring back to FIG. 35, security information (password in this example) is input in step S703. The flow then advances to step S704 to authenticate the decoded data. If the authentication result is GOOD, the flow advances to step S705. In step S705, the image in the BG field is descrambled, and the descrambled image data is stored in the BG field. On the other hand, if the authentication result is NG in step S704, the flow jumps to step S706 to display the scrambled image in the BG field.

In this manner, the decoded image data in the ROI and BG field can be displayed on the monitor 505, stored or saved in the storage unit 504, or output onto the communication line 508 via the communication interface 507 in accordance with the information in the shape data field.

With a series of operations mentioned above, copyright information can be efficiently appended to image data while maintaining compatibility to the conventional JPEG2000 encoded data. Since security information is appended, image data can be easily reconstructed in correspondence with the required security level.

In the 16th embodiment, JPEG2000 encoded data is input, but the present invention is not limited to such specific data. In the aforementioned arrangement, some or all functions may be implemented by hardware or the like.

Note that the present invention may be applied to either a system constituted by a plurality of devices (e.g., a host computer, interface device, reader, video camera, video cassette recorder, printer, and the like), or an apparatus consisting of a single equipment (e.g., a copying machine, facsimile apparatus, video camera, video cassette recorder, or the like).

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

For the sake of simplicity in the description of the present invention, each embodiment has explained a case wherein one object is contained. However, a plurality of objects can be processed by executing the same process for each object.

In the descriptions of the above embodiments, the respective embodiments have been independently explained. However, the present invention is not limited to such specific embodiments, and these embodiments may be implemented solely or in combination as needed.

To restate, according to the above embodiments, since data of an occluded portion of the background image is inserted in lower bit planes of encoded data having an ROI function like JPEG2000, data can be encoded while maintaining both the object and background.

Also, re-conversion to object encoded data such as MPEG-4 can be easily done.

The present invention is not limited to the above embodiments and various changes and modifications can be made within the spirit and scope of the present invention. Therefore, to apprise the public of the scope of the present invention, the following claims are made.

What is claimed is:

1. An image processing apparatus comprising:
   image input means for inputting image data;
   information input means for inputting information data;
   region of interest setting means for setting a region of interest on the basis of the image data;
   transformation means for generating transform coefficients by computing frequency transforms of the image data; and
   control means for bit-shifting transform coefficients, which correspond to the region of interest, of the transform coefficients generated by said transformation means to upper bit planes, stuffing zeros in blank fields outside the region of interest, which are generated by the bit shift process, and stuffing the information data in blank fields within the region of interest, which are generated by the bit shift process.

2. The apparatus according to claim 1, further comprising quantization means for quantizing the transform coefficients generated by said transformation means.

3. The apparatus according to claim 1, wherein said transformation means executes discrete wavelet transformation.

4. The apparatus according to claim 1, wherein the information data is audio information.

5. The apparatus according to claim 1, wherein the information data is meta data which pertains to a description of the image data.

6. The apparatus according to claim 1, wherein the information data includes an Intellectual Property right information.

7. The apparatus according to claim 1, further comprising encoding means for decomposing the transform coefficients stuffed by said control means into bit planes, and encoding the bit planes.

8. An image processing apparatus comprising:
  encoded data input means for inputting encoded data;
  decoding means for decoding the encoded data input by said encoded data input means;
  region of interest extraction means for extracting a region of interest from a decoding result decoded by said decoding means; and
  information data extraction means for extracting information data from lower bit planes of the region of interest extracted by said region of interest extraction means.

9. An image processing method comprising:
  an image input step of inputting image data;
  an information input step of inputting information data;
  a region of interest setting step of setting a region of interest on the basis of the image data;
  a transformation step of generating transform coefficients by computing frequency transforms of the image data; and
  a control step of bit-shifting transform coefficients, which correspond to the region of interest, of the transform coefficients to upper bit planes, stuffing zeros in blank fields outside the region of interest, which are generated by the bit shift process, and stuffing the information data in blank fields within the region of interest, which are generated by the bit shift process.

10. The method according to claim 9, further comprising a quantization step of quantizing the transform coefficients generated in said transformation step.

11. The method according to claim 9, wherein in said transformation step, a discrete wavelet transformation is executed.

12. The method according to claim 9, wherein the information data is audio information.

13. The method according to claim 9, wherein the information data is meta data which pertains to a description of the image data.

14. The method according to claim 9, wherein the information data is an Intellectual Property right information.

15. The method according to claim 9, further comprising an encoding step of decomposing the transform coefficients output in said control step into bit planes, and encoding the bit planes.

16. A computer readable storage medium storing a program for implementing an image processing method according to claim 9.

17. An image processing method comprising:
  an encoded data input step of inputting encoded data;
  a decoding step of decoding the encoded data;
  a region of interest extraction step of extracting a region of interest from a decoding result decoded in said decoding step; and
  an information data extraction step of extracting information data from lower bit planes of the extracted region of interest.

18. A computer readable storage medium storing a program for implementing an image processing method according to claim 17.

19. An image processing apparatus comprising:
  generation means for generating object image data which represents an object image, and background image data to be composed in a background of the object image;
  transformation means for generating first transform coefficients by computing frequency transforms of the object image data and the background image data corresponding to a region outside a region of the object image, and generating second transform coefficients by computing frequency transforms of the background image data corresponding to at least the region of the object image; and
  control means for bit-shifting bits, which correspond to the region of the object image, of the first transform coefficients to upper bit planes, stuffing zeros in blank fields outside the region, which are generated by the bit shift process, and stuffing the second transform coefficients corresponding to the interior of the region in blank fields within the region, which are generated by the bit shift process.

20. An image processing apparatus comprising:
  generation means for generating object image data which represents an object image, and background image data to be composed in a background of the object image;
  first transformation means for computing frequency transforms of the object image data and the background image data corresponding to a region outside a region of the object image;
  second transformation means for computing frequency transforms of the background image data corresponding to at least the region of the object image; and
  control means for bit-shifting bits, which correspond to the region of the object image, of the transform coefficients obtained by said first transformation means to upper bit planes, stuffing zeros in blank fields outside the region, which are generated by the bit shift process, and stuffing the transform coefficients, which are obtained by said second transformation means and correspond to the interior of the region, in blank fields within the region, which are generated by the bit shift process.

21. An image processing apparatus comprising:
  shape information extraction means for extracting shape information of an object from image data;
  object texture information extraction means for extracting texture information of the object from the image data;
  background texture information extraction means for extracting texture information of a background from the image data;
  first frequency transformation means for computing frequency transforms of the texture information of the object and the texture information of the background on the basis of the shape information extracted by said shape information extraction means;
  second frequency transformation means for computing frequency transforms of the texture information of the background;
  stuffing means for stuffing zeros in a region outside a region of the object on the basis of an output from said first frequency transformation means, and the shape information; and
  bit plane encoding means for decomposing an output from said stuffing means into bit planes and encoding the bit planes, and decomposing an output from said second frequency transformation means into bit planes and encoding the bit planes.

22. The apparatus according to claim 21, further comprising quantization means for quantizing transform coefficients computed by said first and second frequency transformation means.

23. The apparatus according to claim 21, further comprising image input means for inputting the image data on the basis of a captured image.

24. The apparatus according to claim 21, wherein the image data is encoded data encoded by MPEG-4.

25. The apparatus according to claim 21, wherein at least one of said first and second frequency transformation means executes discrete wavelet transformation.

26. The apparatus according to claim 21, further comprising shape correction means for expanding the shape information on the basis of the shape information extracted by said shape information extraction means, and a frequency transformation scheme of said first frequency transformation means.

27. An image processing apparatus comprising:
input means for inputting encoded data;
first bit plane decoding means for decoding a first group of bit planes;
shape information extraction means for extracting shape information of an object from a decoding result of said first bit plane decoding means;
first inverse frequency transformation means for computing inverse frequency transforms of the decoding result of said first bit plane decoding means;
object texture information extraction means for extracting texture information of the object from a transformation result of said first inverse frequency transformation means;
second bit plane decoding means for decoding a second group of bit planes;
second inverse frequency transformation means for computing inverse frequency transforms of a decoding result of said second bit plane decoding means;
background texture information extraction means for extracting texture information of a background from a transformation result of said second inverse frequency transformation means;
object shape information encoding means for generating object shape information encoded data by encoding the shape information of the object;
object encoding means for generating texture encoded data of the object by encoding an output from said first inverse frequency transformation means;
background encoding means for generating texture encoded data of the background by encoding a transformation result of said second inverse frequency transformation means; and
output means for outputting, as object encoded data, the object shape encoded data, the texture encoded data of the object, and the texture encoded data of the background.

28. The apparatus according to claim 27, further comprising dequantization means for dequantizing the decoding results of said first and second bit plane decoding means.

29. The apparatus according to claim 27, wherein said first and second inverse frequency transformation means execute inverse discrete wavelet transformation.

30. The apparatus according to claim 27, further comprising shape information correction means for reducing the shape information on the basis of the shape information extracted by said shape information extraction means, and a transformation scheme of said first and second inverse frequency transformation means.

31. The apparatus according to claim 27, wherein the object encoded data is encoded data encoded by MPEG-4.

32. An image processing apparatus comprising:
input means for inputting encoded data;
first bit plane decoding means for decoding a first group of bit planes;
shape information extraction means for extracting shape information of an object from a decoding result of said first bit plane decoding means;
first inverse frequency transformation means for computing inverse frequency transforms of the decoding result of said first bit plane decoding means;
second bit plane decoding means for decoding a second group of bit planes;
object texture information extraction means for extracting texture information of the object from a transformation result of said first inverse frequency transformation means;
second inverse frequency transformation means for computing inverse frequency transforms of a decoding result of said second bit plane decoding means; and
background texture extraction means for extracting texture information of a background from a transformation result of said second inverse frequency transformation means.

33. The apparatus according to claim 32, further comprising dequantization means for dequantizing the decoding results of said first and second bit plane decoding means.

34. The apparatus according to claim 32, wherein said first and second inverse frequency transformation means execute inverse discrete wavelet transformation.

35. The apparatus according to claim 32, further comprising shape information correction means for reducing the shape information on the basis of the shape information extracted by said shape information extraction means, and a transformation scheme of said first and second inverse frequency transformation means.

36. The apparatus according to claim 32, wherein the object encoded data is encoded data encoded by MPEG-4.

37. An image processing method comprising:
a generation step of generating object image data which represents an object image, and background image data to be composed in a background of the object image;
a transformation step of generating first transform coefficients by computing frequency transforms of the object image data and the background image data corresponding to a region outside a region of the object image, and generating second transform coefficients by computing frequency transforms of the background image data corresponding to at least the region of the object image; and
a control step of bit-shifting bits, which correspond to the region of the object image, of the first transform coefficients to upper bit planes, stuffing zeros in blank fields outside the region, which are generated by the bit shift process, and stuffing the second transform coefficients corresponding to the interior of the region in blank fields within the region, which are generated by the bit shift process.

38. A computer readable storage medium storing a program for implementing an image processing method according to claim 37.

39. An image processing method comprising:
a generation step of generating object image data which represents an object image, and background image data to be composed in a background of the object image;
a first transformation step of computing frequency transforms of the object image data and the background image data corresponding to a region outside a region of the object image;
a second transformation step of computing frequency transforms of the background image data corresponding to at least the region of the object image; and
a control step of bit-shifting bits, which correspond to the region of the object image, of the transform coefficients obtained in the first transformation step to upper bit planes, stuffing zeros in blank fields outside the region, which are generated by the bit shift process, and stuffing the transform coefficients, which are obtained in the second transformation step and correspond to the interior of the region, in blank fields within the region, which are generated by the bit shift process.

40. A computer readable storage medium storing a program for implementing an image processing method according to claim 39.

41. An image processing method comprising:
a shape information extraction step of extracting shape information of an object from image data;
an object texture information extraction step of extracting texture information of the object from the image data;
a background texture information extraction step of extracting texture information of a background from the image data;
a first frequency transformation step of computing frequency transforms of the texture information of the object and the texture information of the background on the basis of the shape information extracted in said shape information extraction step;
a second frequency transformation step of computing frequency transforms of the texture information of the background;
a stuffing step of stuffing zeros in a region outside a region of the object on the basis of an output by said first frequency transformation step, and the shape information; and
a bit plane encoding step of decomposing an output of the stuffing step into bit planes and encoding the bit planes, and decomposing an output of the second frequency transformation step into bit planes and encoding the bit planes.

42. The method according to claim 41, further comprising a quantization step of quantizing transform coefficients computed in said first and second frequency transformation steps.

43. The method according to claim 41, further comprising an image input step of inputting the image data on the basis of a captured image.

44. The method according to claim 41, wherein the image data is encoded data encoded by MPEG-4.

45. The method according to claim 41, wherein at least one of said first and second frequency transformation steps, a discrete wavelet transformation is executed.

46. The method according to claim 41, further comprising a shape correction step of expanding the shape information on the basis of the shape information extracted in said shape information extraction step, and a frequency transformation scheme in said first frequency transformation step.

47. A computer readable storage medium storing a program for implementing an image processing method according to claim 41.

48. An image processing method comprising:
an input step of inputting encoded data;
a first bit plane decoding step of decoding a first group of bit planes;
a shape information extraction step of extracting shape information of an object from a decoding result of the first bit plane decoding step;
a first inverse frequency transformation step of computing inverse frequency transforms of the decoding result of the first bit plane decoding step;
an object texture information extraction step of extracting texture information of the object from a transformation result of the first inverse frequency transformation step;
a second bit plane decoding step of decoding a second group of bit planes;
a second inverse frequency transformation step of computing inverse frequency transforms of a decoding result in said second bit plane decoding step;
a background texture information extraction step of extracting texture information of a background from a transformation result in said second inverse frequency transformation step;
an object shape information encoding step of generating object shape information encoded data by encoding the shape information of the object;
an object encoding step of generating texture encoded data of the object by encoding an output from said first inverse frequency transformation step;
a background encoding step of generating texture encoded data of the background by encoding a transformation result in said second inverse frequency transformation step; and
an output step of outputting, as object encoded data, the object shape encoded data, the texture encoded data of the object, and the texture encoded data of the background.

49. The method according to claim 48, further comprising a dequantization step of dequantizing the decoding results in said first and second bit plane decoding steps.

50. The method according to claim 48, wherein in said first and second inverse frequency transformation steps, an inverse discrete wavelet transformation is executed.

51. The method according to claim 48, further comprising a shape information correction step of reducing the shape information on the basis of the shape information extracted in said shape information extraction step, and a transformation scheme at said first and second inverse frequency transformation steps.

52. The method according to claim 48, wherein the object encoded data is encoded data encoded by MPEG-4.

53. An image processing method comprising:
a step of inputting encoded data;
a first bit plane decoding step of decoding a first group of bit planes;
a shape information extraction step of extracting shape information of an object from a decoding result in said first bit plane decoding step;
a first inverse frequency transformation step of computing inverse frequency transforms of the decoding result in said first bit plane decoding step;
an object texture information extraction step of extracting texture information of the object from a transformation result in said first inverse frequency transformation step;

a second bit plane decoding step of decoding a second group of bit planes;

a second inverse frequency transformation step of computing inverse frequency transforms of a decoding result in said second bit plane decoding step; and a background texture extraction step of extracting texture information of a background from a transformation result in said second inverse frequency transformation step.

54. A computer program comprising:

an image input program code for inputting image data;

an information input program code for inputting information data;

a region of interest setting program code for setting a region of interest on the basis of the image data;

a transformation program code for generating transform coefficients by computing frequency transforms of the image data; and a control program code for bit-shifting transform coefficients, which correspond to the region of interest, of the transform coefficients to upper bit planes, stuffing zeros in blank fields outside the region of interest, which are generated by the bit shift process, and stuffing the information data in blank fields within the region of interest, which are generated by the bit shift process.

55. A computer program comprising:

an encoded data input program code for inputting encoded data;

a decoding program code for decoding the encoded data;

a region of interest extraction program code for extracting a region of interest from the decoding result; and an information data extraction program code for extracting information data from lower bit planes of the extracted region of interest.

56. A computer program comprising:

a generation program code for generating object image data which represents an object image, and background image data to be composited in a background of the object image;

a transformation program code for generating first transform coefficients by computing frequency transforms of the object image data and the background image data corresponding to a region outside a region of the object image, and generating second transform coefficients by computing frequency transforms of the background image data corresponding to at least the region of the object image; and a control program code for bit-shifting bits, which correspond to the region of the object image, of the first transform coefficients to upper bit planes, stuffing zeros in blank fields outside the region, which are generated by the bit shift process, and stuffing the second transform coefficients corresponding to the interior of the region in blank fields within the region, which are generated by the bit shift process.

57. A computer program comprising:

a generation program code for generating object image data which represents an object image, and background image data to be composited in a background of the object image;

a first transformation program code for computing frequency transforms of the object image data and the background image data corresponding to a region outside a region of the object image;

a second transformation program code for computing frequency transforms of the background image data corresponding to at least the region of the object image; and a control program code for bit-shifting bits, which correspond to the region of the object image, of the obtained transform coefficients to upper bit planes, stuffing zeros in blank fields outside the region, which are generated by the bit shift process, and stuffing the transform coefficients, which are obtained by executing the second transformation program code and correspond to the interior of the region, in blank fields within the region, which are generated by the bit shift process.

58. A computer program comprising:

a shape information extraction program code for extracting shape information of an object from image data;

an object texture information extraction program code for extracting texture information of the object from the image data;

a background texture information extraction program code for extracting texture information of a background from the image data;

a first frequency transformation program code for computing frequency transforms of the texture information of the object and the texture information of the background on the basis of the shape information extracted by the shape information extraction program code;

a second frequency transformation program code for computing frequency transforms of the texture information of the background;

a stuffing program code for stuffing zeros in a region outside a region of the object on the basis of an output of the first frequency transformation program code, and the shape information; and a bit plane encoding program code for decomposing an output of the stuffing program code into bit planes and encoding the bit planes, and decomposing an output of the second frequency transformation program code into bit planes and encoding the bit planes.

59. A computer program comprising:

an input program code for inputting encoded data;

a first bit plane decoding program code for decoding first bit planes;

a shape information extraction program code for extracting shape information of an object from a decoding result of the first bit planes;

a first inverse frequency transformation program code for computing inverse frequency transforms of the decoding result of the first bit plane decoding program code;

an object texture information extraction program code for extracting texture information of the object from a transformation result of the first inverse frequency transformation program code;

a second bit plane decoding program code for decoding second bit planes;

a second inverse frequency transformation program code for computing inverse frequency transforms of a decoding result of the second bit plane decoding program code;

a background texture information extraction program code for extracting texture information of a background from a transformation result of the second inverse frequency transformation program code;

an object shape information encoding program code for generating object shape information encoded data by encoding the shape information of the object;

an object encoding program code for generating texture encoded data of the object by encoding an output of the first inverse frequency transformation program code;

a background encoding program code for generating texture encoded data of the background by encoding an output of the second inverse frequency transformation program code; and an output program code for outputting, as object encoded data, the object shape encoded data, the texture encoded data of the object, and the texture encoded data of the background.

60. A computer program comprising:

a program code for inputting encoded data;

a first bit plane decoding program code for decoding first bit planes;

a shape information extraction program code for extracting shape information of an object from a decoding result of the first bit plane decoding program code;

a first inverse frequency transformation program code for computing inverse frequency transforms of the decoding result of the first bit plane decoding program code;

an object texture information extraction program code for extracting texture information of the object from a transformation result of the first inverse frequency transformation program code;

a second inverse frequency transformation program code for computing inverse frequency transforms of a decoding result of a second bit plane decoding program code; and a background texture extraction program code for extracting texture information of a background from a transformation result of the second inverse frequency transformation program code.

* * * * *

UNITED STATES PATENT AND TRADEMARK OFFICE
CERTIFICATE OF CORRECTION

PATENT NO. : 6,909,810 B2
DATED : June 21, 2005
INVENTOR(S) : Mitsuru Maeda

It is certified that error appears in the above-identified patent and that said Letters Patent is hereby corrected as shown below:

Title page,
Item [56], References Cited, OTHER PUBLICATIONS,
"Outline of MPEG-4 International Standars" should read -- Outline of MPEG-4 International Standards --.

Column 1,
Line 55, "mark" should read -- mask --.

Column 4,
Line 24, "comprising" should read -- comprises --.

Column 11,
Line 67, "in puts," should read -- inputs, --.

Column 15,
Line 15, "inputand supplies" should read -- input and supplies the result --.

Column 30,
Line 61, "It" should read -- If it --.

Signed and Sealed this

Twenty-fourth Day of January, 2006

JON W. DUDAS
*Director of the United States Patent and Trademark Office*